US012374469B2

(12) United States Patent
Crichlow

(10) Patent No.: US 12,374,469 B2
(45) Date of Patent: Jul. 29, 2025

(54) HIGH LEVEL NUCLEAR WASTE DISPOSAL CAPSULE

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 1065 days.

(21) Appl. No.: 17/364,715

(22) Filed: Jun. 30, 2021

(65) Prior Publication Data

US 2021/0343437 A1 Nov. 4, 2021

Related U.S. Application Data

(63) Continuation-in-part of application No. 15/936,245, filed on Mar. 26, 2018, now Pat. No. 11,289,234.

(51) Int. Cl.

*G21F 5/008* (2006.01)
*G21F 5/08* (2006.01)
*G21F 9/36* (2006.01)

(52) U.S. Cl.

CPC ................ *G21F 5/008* (2013.01); *G21F 5/08* (2013.01); *G21F 9/36* (2013.01)

(58) Field of Classification Search

None

See application file for complete search history.

(56) References Cited

U.S. PATENT DOCUMENTS 4,535,250 A * 8/1985 Fields .................... G21F 5/005 250/507.1
4,787,458 A 11/1988 Langer
6,323,131 B1 11/2001 Obeng
7,524,535 B2 4/2009 Kim
10,161,198 B2 12/2018 Kiess
10,427,191 B2 10/2019 Crichlow
10,878,972 B2 * 12/2020 Muller .................... G21F 5/008
2011/0158372 A1 * 6/2011 Saito ...................... G21F 5/012 267/141

(Continued)

OTHER PUBLICATIONS

"Trace Fossils from the Athabasca Oil Sands, Alberta, Canada", Sep. 1982,Science 217(4562):825-7. DOI: 10.1126/science.217.4562.825 (Source PubMED).

(Continued)

*Primary Examiner* — Eliza W Osenbaugh-Stewart
(74) *Attorney, Agent, or Firm* — Eric Kelly

(57) ABSTRACT

A nuclear waste-capsule may include: an outer shell; an inner tube, located in that outer shell; and one or more spent nuclear fuel (SNF) assemblies (or portions thereof), with particular structure(s) attached thereto, within that inner tube. The particular structure(s) may be one or more spring-loaded receptacles (SLRs), such that each of the one or more SNF assemblies (or portions thereof), within the given inner tube, may have circumferentially attached thereto at least one SLR. Each such SLR may act as shock absorbing suspension means and may structurally support and centralize its associated SNF assembly (or portion thereof) within the given inner tube. Additionally, the one or more SNF assemblies (or portions thereof), along with the associated SLRs, may be immersed within a protective/preventative medium, within the given inner tube. The so loaded waste-capsule may be deposited within a wellbore that is located within a repository geological formation.

28 Claims, 14 Drawing Sheets

NOT TO SCALE

(56) References Cited

U.S. PATENT DOCUMENTS

| | | | | |
|---|---|---|---|---|
| 2013/0319690 | A1* | 12/2013 | Levie | E21B 17/1028 166/241.6 |
| 2019/0295735 | A1 | 9/2019 | Crichlow | |
| 2020/0027605 | A1 | 1/2020 | Crichlow | |
| 2021/0174980 | A1 | 6/2021 | Crichlow | |

OTHER PUBLICATIONS

"Nuclear Waste Containment Materials", Papers related to the SKB waste disposal programme presented at the Materials Research Society, Spring Meeting, Apr. 19, 200, Svensk Kärnbränslehantering AB., Aug. 2001.

Nuclear Wastes: Technologies for Separations and Transmutation (1996) 592 pages | 8.5x11 | Hardback, ISBN 978-0-309-05226-9 | DOI 10.17226/4912.

TR-07-12, RD&D Programme 2007, Programme for research, development and demonstration of methods for the management and disposal of nuclear waste. Sep. 2007.

Hydra Semi Premium Flush Joint, Precision LLC, 11200 Mesa Dr., Huston, TX. 77078. Precision-llc.com.

"Conditions contributing to Underground Copper Corrosion", James Myers, Arthur Cohen, American Water Works Association Journal., Research and Technology, Journal AWWA Aug. 1984. p. 69.

"Formation, investigation and characterization of self-assembled monolayers of 5-methyl-1,3,4-thiadiazole-2-thiol in corrosion protection of copper in neutral media", A. Rajalakshmi Devi, S. Ramesh and V. Periasamy Department of Chemistry, Gandhigram Rural Institute, Deemed University, Gandhigram, India.

Casing Accessories, www.weatherford.com.

"API Spec 10D, Casing bow-spring centralizers and centralizer subs"., API Specification 10D, 5th edition, Jan. 1995.

"Design and analysis of centralizer used in wellbore", Money Tuli1, Balvinder Singh2, Dr Rahul Malhotra3 1 M.Tech, Mechanical Engineering, Adesh Institute of Technology, Punjab Technical University, Ghauran, Chandigarh, Punjab, India 2 Guide, Head of Department (Mechanical), Adesh Institute of Technology, Ghauran, Chandigarh, Punjab, India 3 Director/Principal, GTB Group of Institutions, Chhapianwali, Malout, Punjab, India.

* cited by examiner

NOT TO SCALE

NOT TO SCALE

HIGH LEVEL NUCLEAR WASTE DISPOSAL CAPSULE

PRIORITY NOTICE

The present patent application is a continuation-in-part (CIP) of U.S. non-provisional patent application Ser. No. 15/936,245 filed on Mar. 26, 2018, and claims priority to said U.S. non-provisional patent application under 35 U.S.C. § 120. The above-identified patent application is incorporated herein by reference in its entirety as if fully set forth below.

CROSS REFERENCE TO RELATED PATENT

Note, prior U.S. utility patent Ser. No. 10/427,191 by the same inventor (Henry Crichlow) is incorporated by reference in its entirety as if fully set forth below with respect to this patent application.

TECHNICAL FIELD OF THE INVENTION

The present invention relates in general to containment, storage, and/or disposal of radioactive materials (e.g., nuclear waste); and more specifically to the containment, storage, and/or disposal of radioactive materials (e.g., nuclear waste) within deeply located geological formations utilizing a waste-capsule with one or more spring-loaded receptacles (SLRs).

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2021) there is a massive quantity of nuclear waste accumulating across the world, including the United States (U.S.). There are basically two major sources for such nuclear waste. High-level waste (HLW) in the form of Spent Nuclear Fuel (SNF) from the generation of electric power in nuclear power plants and HLW from nuclear weapons grade plutonium (WGP) production. Both sources of nuclear waste should be addressed, controlled, and disposed of safely. This patent application addresses these sources of HLW and how to safely dispose of that HLW utilizing a particular waste-capsule system described herein.

With respect to the nuclear power plants, the nuclear waste is derived from spent nuclear fuel (SNF) assemblies which are initially used in the nuclear power plants to generate electric power (before becoming "spent"), but later after use become spent and not useful with respect to generating electrical power and thus become nuclear waste (in the SNF form). This type of HLW (i.e., (SNF) assemblies) is normally stored on the surface (e.g., Earth's terrestrial surface as opposed to subterranean), in cooling ponds or special casks, until a final repository is available. That is, the surface storage is/was intended to be temporary. In (2020) in the United States (U.S.) alone there are more than 80,000 metric tons (MT) of this high-level solid waste (HLW) being stored in cooling pools and in concrete casks on the surface. These surface storage operations are very costly, typically costing hundreds of millions of dollars annually to maintain. This type of HLW is generally called spent nuclear fuel (SNF) and consists of thousands of nuclear fuel assemblies which have been removed from operating nuclear power plants. These fuel assemblies are highly radioactive and also thermally active and continue to generate sensible heat, though the heat rate declines over time, however, the SNF must be safely controlled by maintaining these assemblies in cooling tanks for years at the onsite surface storage sites.

There are approximately 80,000 MT of SNF assemblies being stored today in the U.S. and about 15,000 MT being added annually. There is a significant need for new mechanisms and processes to safely get rid of the surface storage of this radioactive waste and to finally sequester this SNF waste in a safe manner. In this patent application HLW and SNF may be used interchangeably to describe the solid nuclear waste product(s). Current scientific knowledge teaches that the conversion of nuclear waste to an acceptable waste form requires either, (a) separation technologies for products like americium, *curium, neptunium*, and additional fission products which are very demanding technology processes; or (b) that the radioactive wastes together with the other constituents be processed together.

Both processes present a variety of technical challenges. Due to the radioactivity and toxicity of the wastes, separation can be both hazardous, expensive, and prone to human-induced accidental problems.

Several methods for providing an acceptable final form for nuclear waste are known in the art, two of which are: (a) vitrification and/or (b) ceramification.

The cost associated with these two primary methodologies (vitrification and ceramification) is and/or has been cost prohibitive. For example, published information from the U.S. Hanford Nuclear facility which is designed for vitrification operations has a projected cost level of $16 billion in U.S. dollars. For example, published information from the ANSTO (ANSTO—Australia's Nuclear Science and Technology Organisation) facility which is designed for ceramification operations has a projected cost of hundreds of millions of dollars. Commercial revenues are expected to pay for such costs.

Both of these processes (e.g., vitrification and/or ceramification) also have another major problem, in that both processes increase a volume of waste product to be stored. Thus, use of these processes may be counter-intuitive with a goal of minimizing amounts of nuclear waste. That is, use of these processes creates even more nuclear waste volumes that need to be safely handled and stored.

Based on the inherent shortcomings of the prior art, there exists a critical need for an effective, economical method for developing and utilizing an acceptable nuclear waste process for nuclear waste products; a process that precludes the need for all the expensive, time-consuming, and dangerous intermediate operations that are currently being used or contemplated to render the nuclear waste in a form that eventually, still has to be buried in deep underground repositories.

An approach is needed that minimizes these prior art intermediate steps. To solve the above-described problems, the present invention provides parts, components, devices, apparatus, assemblies, systems, methods, steps, means, and/ or mechanisms to dispose of the nuclear waste currently accumulating on the surface using novel waste-capsule systems.

The novel approaches taught as part of this patent application provides parts, components, devices, apparatus, assemblies, systems, methods, steps, means, and/or mechanisms wherein the HLW/SNF waste disposal operations may go directly from the existing fuel assembly surface storage systems to the underground disposal repository in deep geological formations utilizing a waste-capsule system and methods that allow for safe and effective disposal of the HLW/SNF with minimal additional effort and without the afore-listed intermediary steps of vitrification and ceramification.

In the past, it has been challenging, dangerous, and expensive to try to store radioactive and/or nuclear materials (such as waste materials) in near surface repositories.

There is a long felt, but unmet, needs for parts, components, devices, apparatus, assemblies, systems, methods, steps, means, and/or mechanisms that would allow high-level nuclear waste (HLW), including, but not limited to, SNF, to be disposed safely and with relative ease in deep geological formations via wellbore systems.

A need, therefore, exists for new parts, components, devices, apparatus, assemblies, systems, methods, steps, means, and/or mechanisms to safely dispose of radioactive/nuclear waste in a controlled manner along with depositing these radioactive/nuclear wastes in parts, components, devices, apparatus, assemblies, systems, methods, steps, means, and/or mechanisms that are designed to meet the requirements of public acceptance along with regulatory guidelines/requirements.

It is to these ends that the present invention has been developed to dispose of the HLW/SNF products in deep geological formations thus allowing safe long-term disposal of that deposited waste for a minimum of 10,000 years. It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe parts, components, devices, apparatus, assemblies, systems, methods, steps, means, and/or mechanisms for the long-term disposal of high level nuclear and radioactive waste products/materials (HLW/SNF), along with, or in the alternative with, other radioactive waste forms, within deep geological formation(s) of predetermined characteristics.

In some embodiments, a waste-capsule for housing and disposal of nuclear waste, such as, but not limited to HLW/SNF, may be described herein. In some embodiments, such a waste-capsule may comprise at least: a first spring-loaded receptacle (first SLR), an inner tube, and an outer shell. In some embodiments, the first SLR may be an elongate hollow member. In some embodiments, the first SLR may be disposed circumferentially around (and attached to) a length of a first SNF assembly or portion thereof. In some embodiments, the first SLR may comprise a first spring bow and two first collars. In some embodiments, the first spring bow may be disposed between and attached to both of the two first collars with the two first collars on both axial terminal ends of the first spring bow. In some embodiments, the first spring bow may comprise at least three first elongate linear spring element members. In some embodiments, the first spring bow (e.g., the first elongate linear spring element members of the first spring bow) may be configured to: act as shock absorbing suspension means to the first SNF assembly or portion thereof that is disposed within the first SLR and/or structurally support and centralize the first SNF assembly or portion thereof that is disposed within the first SLR, with respect to the inner tube.

In some embodiments, the inner tube may be a first elongate hollow cylindrical member with at least one initial open-end. In some embodiments, the first SLR that is disposed circumferentially around the first SNF assembly or portion thereof may be located within an internal cavity of the inner tube. In some embodiments, the first elongate linear spring element members of the first SLR may be in (removable) physical contact with interior wall portions of the inner tube. In some embodiments, the outer shell may be a second elongate hollow cylindrical member. In some embodiments, the inner tube with the first SLR that may be disposed circumferentially around the first SNF assembly or portion thereof may all be disposed within the outer shell. In some embodiments, lengths of the first SLR, the inner tube, and the outer shell, may all be substantially parallel with each other, with respect to the waste-capsule in an assembled and loaded configuration.

In some embodiments, the (loaded or partially loaded) waste-capsule may be configured for being received into a wellbore that is located within a repository geological formation. In some embodiments, the repository geological formation may be a rock formation that may be located at least five thousand (5,000) feet below the Earth's surface. In some embodiments, one or more SLR(s) may be associated (e.g., circumferentially attached thereto) with a given SNF assembly. In some embodiments, such wellbore(s) may be drilled out from the Earth's surface using a given drill rig system. In some embodiments, one or more SNF assemblies (or portions thereof) may be loaded into a given inner tube; and each such SNF assembly (or portion thereof) may have one or more SLR(s) may be associated (e.g., circumferentially attached thereto) with a given SNF assembly.

Because of drilling design improvements in the oilfield development industries, it is now possible to resolve previous wellbore challenges involved in disposing of nuclear waste in deep geological formations via wellbore systems that extend from the Earth's surface and into one or more repository geological formation(s). Some of the technical drivers that have allowed at least some of the embodiments of present invention herein to be implemented are as follows: drilling rig design features have improved; increased hydraulic pressure availability at the drill bit; available drilling rig horsepower (e.g., up to as much as 4,000 hydraulic horsepower); available pump horsepower; available rig capacity (e.g., up to 2,000,000 pounds of dead weight lift is presently available); high downhole drilling fluid pressures can be maintained; drilling rig ability to pump slurries of high density, pounds per gallon (ppg) have increased considerably; and remote and automatic control software and artificial intelligence (AI)/machine learning (ML) programs/algorithms for rig operations have become increasingly effective and viable.

In light of the continued problems associated with the known methods of disposing of nuclear waste, including SNF assemblies, it may be an object of some embodiments, to provide nuclear waste-capsule systems, containing nuclear waste, which may be sequestered in horizontal (lateral) wellbores in repository geological formation(s) (i.e., deep geological formation(s)).

Some embodiments may specifically address technical considerations, such as, but not limited to, disposal of HLW materials in waste-capsule systems in human-made repositories implemented in deep geological formations. This patent application is directed at the utilization of these waste-capsule systems for the disposal of a variety of HLW forms in deep, naturally occurring geologic formations that are capable of becoming HLW repositories. The disposal repositories may be horizontal (lateral) wellbore systems and/or other human-made systems in such deeply located geological formations.

It is an objective of the present invention to provide waste-capsule systems and methods to dispose of radioactive material(s), such as, but not limited to, SNF assemblies (and/or portions thereof), HLW, WGP parts, components, portions thereof, combinations thereof, and/or the like.

It is another objective of the present invention to provide waste-capsule systems and methods that are configured to dispose of a variety of radioactive material(s) in various/different waste forms, such as, but not limited to, SNF assemblies (and/or portions thereof, HLW, WGP parts/components, portions thereof, combinations thereof, and/or the like.

It is another objective of the present invention to provide waste-capsule systems and methods that may comprise a protected operating volume (e.g., an internal cavity/volume of a given inner tube) capable of holding one or more combined-assembly-of-SNF-with-SLR-and-with-stop-collar(s) units firmly and/or securely in place inside the operating volume.

It is another objective of the present invention to provide waste-capsule systems and methods wherein the protected operating volume is surrounded by the inner tube (made of copper) that is capable of holding the one or more combined-assembly-of-SNF-with-SLR-and-with-stop-collar(s) units therein.

It is another objective of the present invention to provide waste-capsule systems and methods that comprise components including spring-loaded receptacle(s) (SLR(s)) apparatus capable of positioning and holding the SNF assembly (or portions thereof) units firmly and/or securely in place inside the operating volume of the inner tube.

It is another objective of the present invention to provide waste-capsule systems and methods that can be configured such that the SLR(s) apparatus is capable of positioning and holding a single or multiple and different SNF assemblies (or portions thereof) types firmly inside the operating volume (e.g., the internal cavity/volume) of a given inner tube.

It is another objective of the present invention to provide waste-capsule systems and methods that can be configured such that the waste-capsule has a means (e.g., an injection port) for injecting a protective/preventative medium into the operating volume (e.g., the internal cavity/volume) of a given inner tube.

It is another objective of the present invention to provide waste-capsule systems and methods that can be configured such that the SLR(s) apparatus is immersed in and fully surrounded by the protective/preventative medium that is injected into and fills the operating volume (e.g., the internal cavity/volume) of a given inner tube.

It is another objective of the present invention to provide such waste-capsule systems and methods that are designed to dispose of the radioactive material(s), wherein implementation of such waste-capsule system components (e.g., a steel outer shell) provide for structural competency and rigidity of the waste-capsule undergoing large compressive, tensile, and high pressure loads present under deep wellbore down-hole situations.

It is another objective of the present invention to provide such waste-capsule systems and methods that are designed to dispose of the radioactive material(s), wherein implementation of such waste-capsule system components (e.g., [passivated] copper inner tube, the protective/preventative medium, and the surrounding repository geological formation) may serially and sequentially continue to protect the SNF components from external corrosion and degradation after the (steel) outer shell may have deteriorated over time.

It is another objective of the present invention to provide such waste-capsule systems and methods that are designed to dispose of the radioactive material(s), wherein implementation of such waste-capsule system components may further protect the copper components from corrosion by implementing a copper surface protective means such as a Self-Assembling Monolayer (SAM) layer, which further treats and modifies the copper surface material and further enhances the protection of the SNF assemblies (or portions thereof) located within the passivated copper inner tube from corrosion and degradation after the (steel) outer shell may have deteriorated.

It is another objective of the present invention to provide such waste-capsule systems and methods systems that are designed to dispose of the radioactive material(s), wherein implementation of such waste-capsule systems may serially and sequentially continue to protect the SNF assemblies (or portions thereof) from corrosion and degradation after the (steel) outer shell and the (copper) inner tube may deteriorate by the use of very long-term protective/preventative medium inside the inner tube and surrounding the SNF assemblies (or portions thereof), such as but not limited to, bitumen tars and/or other pumpable (flowable) injectable media.

It is another objective of the present invention to provide such waste-capsule systems and methods that are designed to dispose of the radioactive material(s), wherein implementation of such waste-capsule systems and means may allow the SNF assembly (or portion thereof) components to be assembled into the waste-capsules while the SNF assembly (or portion thereof) components are still on location at the cooling ponds sites.

It is another objective of the present invention to provide such waste-capsule systems and methods that are designed to dispose of the radioactive material(s), wherein implementation of such waste-capsule systems may allow the assembling and loading of the waste-capsule systems to be readily achieved (effected) by at least mostly (substantially) non-human, robotic, means at specific points along the disposal process; thus, providing for safety and health protection to workers and/or equipment, in packaging, transport, and/or at well site disposal.

It is another objective of the present invention to provide waste-capsule systems and methods that can be configured and implemented by utilization of various existing parts and existing industrial supply chain infrastructure (e.g., no new industry or specialized technologies that need to be developed for implementation).

It is another objective of the present invention to provide such waste-capsule systems and methods that are designed to dispose of the radioactive material(s) utilizing industry-grade materials and components (such as, but not limited to, steel and copper) in such a manner that is much more affordable (cheaper) than prior art technologies.

It is another objective of the present invention to provide waste-capsule systems and methods and that are configured to dispose of the radioactive material(s) in manner that is safe to human health and to the environment (e.g., ecosphere).

It is another objective of the present invention to provide waste-capsule systems and methods, such that the HLW radioactive material(s) are disposed in a manner that meets applicable regulatory requirements and/or guidelines.

It is another objective of the present invention to provide waste-capsule systems and methods such that the disposal methodologies are configured to dispose of the radioactive material(s) in manner that generally meets with public acceptance (as compared to prior art systems for nuclear waste disposal).

It is another objective of the present invention to provide waste-capsule systems and methods such that the SNF/HLW disposal means may be configured to dispose of the radioactive material(s), wherein the methods and systems provide simpler and more structurally robust waste-capsule mechanisms as compared against the prior art systems.

It is another objective of the present invention to provide waste-capsule systems and methods such that the SNF/HLW disposal means may be configured to dispose of the radioactive material(s) for not only the 10,000 year regulatory requirement of longevity; but in addition, being able to be safely disposed of for hundreds of thousands of years to millions of years, without corrosion, degradation, and/or radionucleotide migration issues, by virtue of location and properties of the given repository geological formation and the entombing protective/preventative medium. Rather than utilization of expensive and rare metals like titanium and other exotic alloys for protection as taught by some near surface disposal embodiments like Yucca Mountain (Mt.) facility in the U.S.

It is another objective of the present invention to provide such waste-capsule systems and methods such that the repository geological formation becomes the predominant safety system and continues to be effective after the (steel) outer shell and/or the (copper) inner tube might have deteriorated; thus, providing for the extended long-term protection of the entombed HLW/SNF over geological time scales.

It is another objective of the present invention to provide waste-capsule systems and methods that are configured to dispose of the radioactive material(s), wherein the waste-capsule systems and/or the methods may accommodate relatively large quantities of radioactive waste. For example, and without limiting the scope of the present invention, in some embodiments, such nuclear waste disposal systems may be capable of disposing of hundreds of thousands of SNF assemblies (or portions thereof) in the repository geological formation located below/within a nominal surface area of only a few square miles.

It is another objective of the present invention to provide such waste-capsule systems and methods that are designed to dispose of the radioactive material(s), wherein implementing the waste-capsule systems and/or the methods requires minimal infrastructure and/or accessory upgrades (e.g., existing SNF assemblies/subassemblies and readily available steel and copper tubular goods may be utilized).

It is another objective of the present invention to provide such waste-capsule systems and methods that are designed to dispose of the radioactive material(s), wherein implementation the waste-capsule systems and/or the methods may be readily scaled up, as needed/desired to dispose of widely distributed accumulated SNF assemblies across the country (e.g., the U.S.).

It is another objective of the present invention to provide waste-capsule systems and methods that are designed to dispose of the radioactive material(s), wherein implementation of the waste-capsule systems and/or the methods may be readily developed at multiple sites operating simultaneously, as needed/desired to dispose of widely distributed accumulated SNF assemblies across the country (e.g., the U.S.).

It is another objective of the present invention to provide waste-capsule systems and methods that can be configured and implemented to allow the mass production of selected elements of the waste-capsule, such as, the SLRs in large volumes, rapidly and, relatively inexpensively (e.g., inexpensive as compared to prior art systems).

It is another objective of the present invention to provide waste-capsule systems and methods, wherein each such waste-capsule may have a load capacity of at least one (1) metric ton (2,200 pounds [lbs.]).

It is another objective of the present invention to provide such waste-capsule systems and methods such that the waste-capsule may accommodate various different types of SNF assemblies (or portions thereof) having different cross-sectional geometries/shapes (such as, but not limited to, round, circular, rectangular, square, or hexagonal in shape with respect to a cross-section of the given SNF assembly [or portion thereof]).

It is another objective of the present invention to provide such waste-capsule systems and methods such that the waste-capsule may simultaneously accommodate (receive) various different SNF assemblies (or portions thereof) with respect to SNF assembly (or portion thereof) lengths, SNF assembly (or portion thereof) diameters, and/or SNF assembly (or portion thereof) types.

It is another objective of the present invention to provide waste-capsule systems and methods such that inside the waste-capsule various different SNF assemblies (or portions thereof) with respect to SNF assembly (or portion thereof) lengths, SNF assembly (or portion thereof) diameters, and/or SNF assembly (or portion thereof) types may simultaneously co-reside, but may be separated by a system of structural partitions, within the waste-capsule's inner tube.

It is another objective of the present invention to provide waste-capsule systems and methods such that inside the waste-capsule (e.g., inside the inner tube), may be separators (e.g., partitions), that may be perforated by a series of axial running through holes (e.g., flow through apertures) or that may be non-perforated solid elements; wherein such separators may separate different combined-assembly-of-SNF-with-SLR-and-with-stop-collar(s) units from each other, within a given inner tube.

It is another objective of the present invention to provide waste-capsule systems and methods such that the various parts of the internal cavity/volume of the inner tube (e.g., one or more different combined-assembly-of-SNF-with-SLR-and-with-stop-collar(s) units), may be separated from each other by one or more separator(s) and wherein those various parts of the internal cavity/volume of the inner tube (e.g., one or more different combined-assembly-of-SNF-with-SLR-and-with-stop-collar(s) units), may be at least mostly (substantially) immersed within the protective/preventative medium by virtue of perforation(s)/hole(s) running through the one or more separator(s) to provide a continuous fluid pathway(s) in the axial direction of the given inner tube.

It is another objective of the present invention to provide waste-capsule systems and methods such that the waste-capsule axial (longitudinal) dimensions are within a range of (steel and copper) tubular systems that are currently and normally used in existing oilfield well drilling operations; such as, but not limited to, from ten (10) feet to thirty (30) feet long, and may thus be installed in and by, existing oilfield drilling systems (with some modification for radiation shielding in some embodiments).

It is another objective of the present invention to provide waste-capsule systems and methods such that the waste-capsule may be installed in existing oilfield type wellbore systems without major (significant) wellbore re-works.

It is another objective of the present invention to provide waste-capsule systems and methods such that the waste-capsule may be installed in existing oilfield type wellbore systems utilizing readily and currently available surface tools and other available remote controlled operating devices such as, but not limited to, a current automatic wellsite apparatus called an "Iron Roughneck." However, such existing oilfield equipment may be modified to include radiation shielding elements in some embodiments.

It is yet another objective of the present invention to provide waste-capsule systems and methods such that the components of the waste-capsule may be designed, manufactured, and/or delivered by relatively straightforward processes without the need for massive infusions of money and complex manufacturing systems.

Recapping, at least some of the above noted objectives, some embodiments may provide parts, components, devices, apparatus, assemblies, systems, methods, steps, means, and/or mechanisms for nuclear waste-capsules (with SLRs) for the storage and/or disposal of radioactive materials (e.g., HLW/SNF) within wellbore systems that terminate in repository geological formation(s).

These and other advantages and features of the present invention are described herein with specificity so as to make the present invention understandable to one of ordinary skill in the art, both with respect to how to practice the present invention and how to make the present invention.

The preceding and other steps, objects, and advantages of the present invention will become readily apparent upon further review of the following detailed description of the invention and as illustrated in the accompanying drawings.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. None of the figures are necessarily shown to scale.

REFERENCE NUMERAL SCHEDULE

Figure 1C:
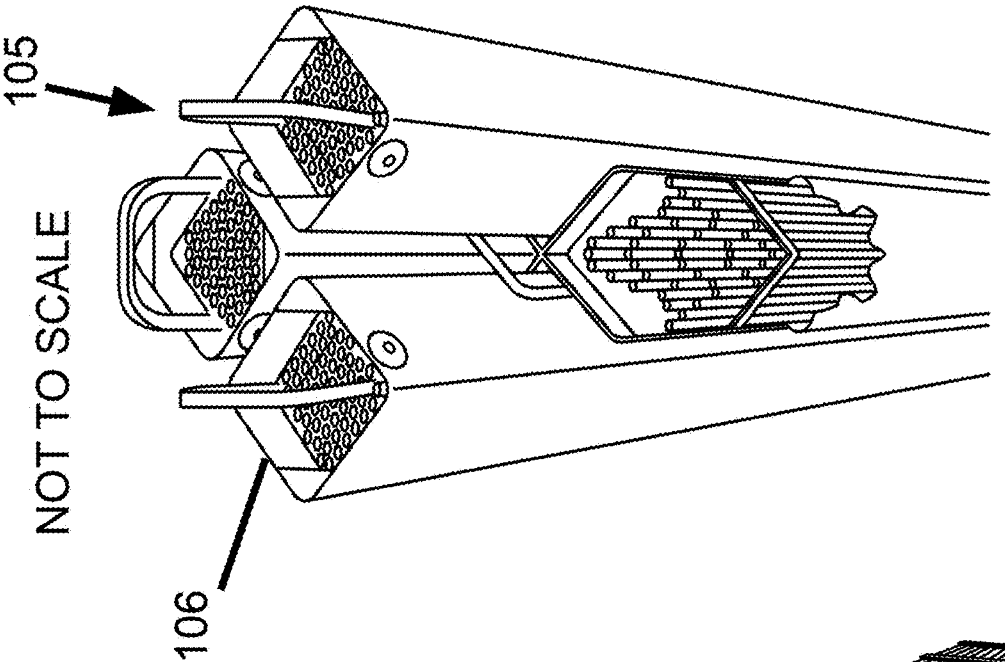
FIG. 1C (Prior Art)
FIG. 1C is a prior art figure that shows a type of spent nuclear fuel (SNF) assembly historically used in the United States (U.S.).

101 Canadian "CANDU" SNF assembly system 101
102 outer wall 102
103 Russian SNF assembly system 103
104 outer wall 104
105 U.S. (United States) SNF assembly system 105

106 outer wall 106
200 prior art Yucca Mountain capsule system 200
201 outer cylinder (prior art) 201
202 external collars (prior art) 202
203 inner tube (prior art) 203
204 interior cavity (prior art) 204
205 rings (prior art) 205 (for inner cylinder support)
206 SNF basket (prior art) 206
207 SNF assembly (prior art) 207
208 endplates (barriers) (prior art) 208
250 prior art Canadian capsule system 250
251 steel liner vessel (prior art) 251
252 copper shell (prior art) 252
253 SNF assembly basket (prior art) 253
254 steel lid (prior art) 254
255 vent points (prior art) 255
256 copper lid (prior art) 256
257 bentonite jacket (prior art) 257
300 waste disposal system 300
301 Earth (terrestrial) surface 301
302 nuclear powerplant 302
303 SNF surface storage/capsule assembly 303
304 drill rig system 304
305 vertical wellbore section 305
306 repository geological formation 306
307 primary lateral wellbore 307
308 secondary lateral wellbore 308
309 waste-capsule 309
310 overlain/underlain rock layer(s) 310
400 Spring Loaded Receptacle (SLR) 400
401 collar 401
402 spring bow 402
403 elongate linear spring element member 403
404 bore 404 (of SLR)
405 set screw(s) 405
500 combined-assembly-of-SNF-with-SLR-and-with-stop-collar(s) 500
501 SNF assembly (or portion thereof) 501
501*a* circular SNF assembly (or portion thereof) 501*a*
501*b* rectangular SNF assembly (or portion thereof) 501*b*
501*c* hexagonal SNF assembly (or portion thereof) 501*c*
502 stop-collar 502
503 gap 503 (between collar and stop-collar)
504 gap 504 (from stop-collar to SNF end)
505 axial/longitudinal centerline 505 (for reference)
601 outer shell 601
602 inner tube 602
603 internal cavity/volume 603 (of inner tube)
604 separator 604
605 perforation/hole 605
606 separator 606
607 cap 607
608 port 608
609 protective/preventative medium 609
610 support-pad 610
611 endplate 611
612 coupling 612
700 Spring Loaded Receptacle (SLR) 700
701 hinge 701
801 inside diameter 801
802 diameter 802
803 overall-length 803
804 length 804
805 length 805
806 length 806
1100 method of disposing of waste 1100
1101 method of preparing waste-capsule components 1101
1102 step of constructing of outer shell 1102
1103 step of forming outer shell to required dimensions 1103
1104 step of forming inner tube 1104
1105 step of passivating inner tube 1105
1106 step of constructing other waste-capsule components 1106
1107 step of assembling outer shell, inner tube, and components 1107
1120 method of preparing SNF with SLR assemblies for disposal 1120
1121 step of constructing SLRs 1121
1122 step of manufacturing SLR components 1122
1123 step of assembling SLR components to form SLR units 1123
1124 step of storing SNF assemblies 1124
1125 step of locating, selecting, and classifying SNF assemblies by size/geometry 1125
1126 step of disassembling of SNF assembly 1126
1127 step of installing SLR onto prepared SNF assembly 1127
1130 method of forming waste-capsules with SNF with SLR assemblies 1130
1131 step of inserting first separator & first SNF with SLR assembly into inner tube 1131
1132 step of inserting more separators & SNF with SLR assemblies into inner tube 1132
1133 step of capping and sealing the inner tube 1133
1134 step of injecting preventative medium into annular cavity of inner tube 1134
1135 step of installing support-pads & endplates to outer shell 1135
1136 step of installing couplings at end(s) of loaded waste-capsules 1136
1140 method of disposing of loaded waste-capsules into geologic disposal formation 1140
1141 step of preparing loaded waste-capsule for surface transport 1141
1142 step of inserting loaded waste capsules into wellbore (s) 1142
1143 step of shutting down loaded waste-capsule insertion operations 1143

DETAILED DESCRIPTION OF THE INVENTION

In this patent application HLW and SNF may be used interchangeably to describe the solid nuclear waste product (s).

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1A:
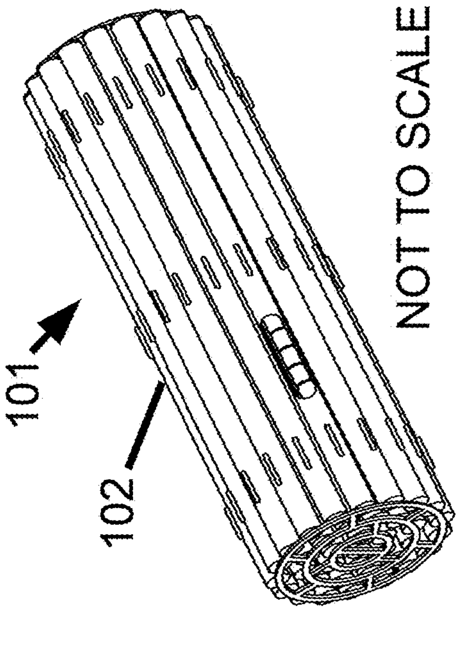
FIG. 1A (Prior Art)
FIG. 1A is a prior art figure that shows a type of spent nuclear fuel (SNF) assembly historically used in Canada.
Figure 1B:
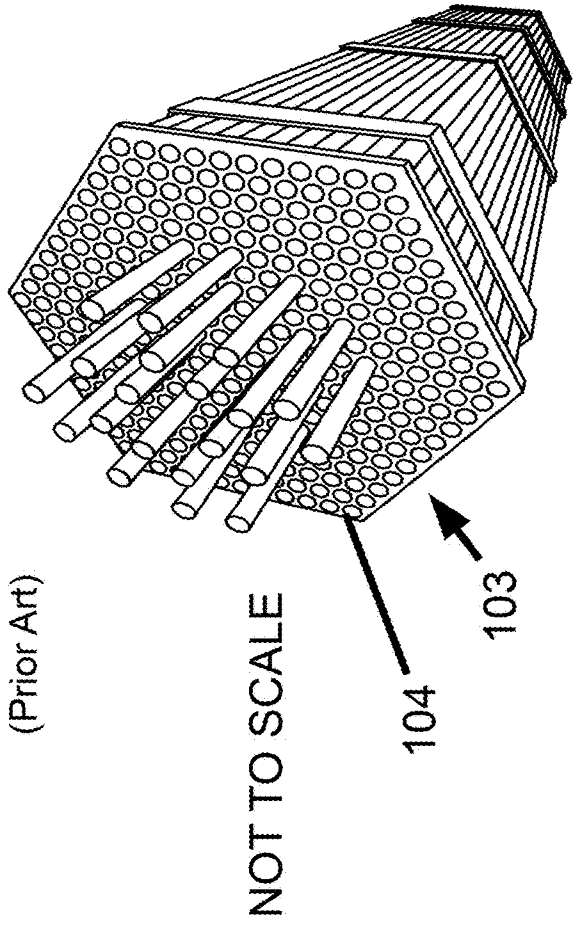
FIG. 1B (Prior Art)
FIG. 1B is a prior art figure that shows a type of spent nuclear fuel (SNF) assembly historically used in Russia.
Figure 3:
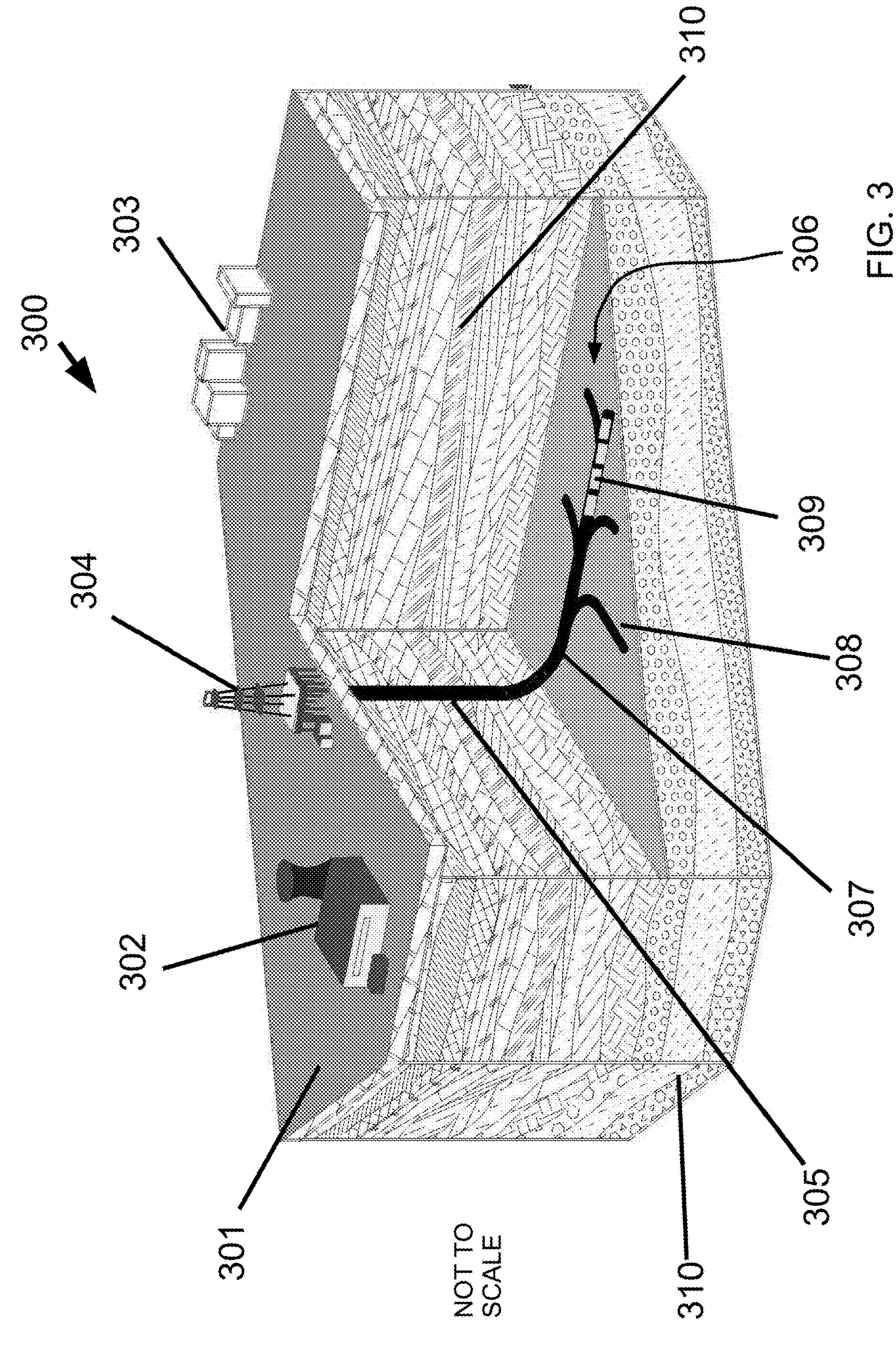
FIG. 3 illustrates an inclusive overview of a nuclear waste disposal system, that may utilize loaded waste-capsule(s) within wellbore(s), within deeply located repository geological formation(s), contemplated by at least one embodiment of the present invention.

FIG. 1A, FIG. 1B, and FIG. 1C illustrate different types of (spent) nuclear fuel (SNF) assemblies currently used and historically used in/at nuclear powerplant(s) (such as nuclear powerplant 302 shown in FIG. 3). FIG. 1A, FIG. 1B, and FIG. 1C are each prior art. FIG. 1A shows a perspective view of a Canadian “CANDU” SNF (spent nuclear fuel) assembly system 101. Canadian SNF assembly 101 has an outer wall 102. FIG. 1B shows a perspective view of a Russian SNF assembly system 103. Russian SNF assembly 103 has an outer wall 104. FIG. 1C shows a perspective view of a U.S. (United States) SNF assembly system 105. U.S. SNF assembly 105 has an outer wall 106. During and/or after use, nuclear fuel assemblies 101, 103, and/or 105 may contain HLW (high-level nuclear waste) and/or SNF (spent nuclear fuel). Note, this patent application is primarily concerned with nuclear fuel assemblies 101, 103, and/or 105 after their useful lives in nuclear powerplants, i.e., when the nuclear fuel assemblies 101, 103, and/or 105 are now SNF assemblies 101, 103, and/or 105.

Continuing discussing FIG. 1A, FIG. 1B, and FIG. 1C, these SNF assemblies 101, 103, and/or 105 vary in size, length, and shape in actual practice; but generally, have dimensions and geometries that are all fixed, finite, and known. Dimensions and geometries of SNF assemblies 101, 103, and/or 105 are precisely known and predetermined. In general practice today, SNF assemblies 101, 103, and/or 105 are largely circular, hexagonal, or square/rectangular in cross-section, respectively. Some nominal dimensions of SNF assemblies 101 and/or 105 are as follows: (a) nominal dimensions of the cylindrical fuel rod assemblies (e.g., SNF assemblies 101) are about 50 cm (centimeters) long and about 10 cm in cross-section; and (b) the square or rectilinear types (e.g., SNF assemblies 105) are usually between 4 meters (m) to 5 m in length and about 14 cm to 22 cm in cross-section.

At least one objective of the present invention and this patent application may be with respect to storing (disposing) of SNF assemblies 101, 103, and/or 105 (and/or portions thereof) that contain HLW and/or SNF, into waste-capsule(s) 309; wherein these HLW/SNF containing waste-capsule(s) 309 are placed (located) into wellbores (e.g., 305, 307, and/or 308) that are located within repository geological formation(s) 306. See e.g., FIG. 3 for repository geological formation 306, vertical wellbore 305, primary lateral wellbore 307, secondary lateral wellbore 308, and/or waste-capsule(s) 309.

Figure 2A:
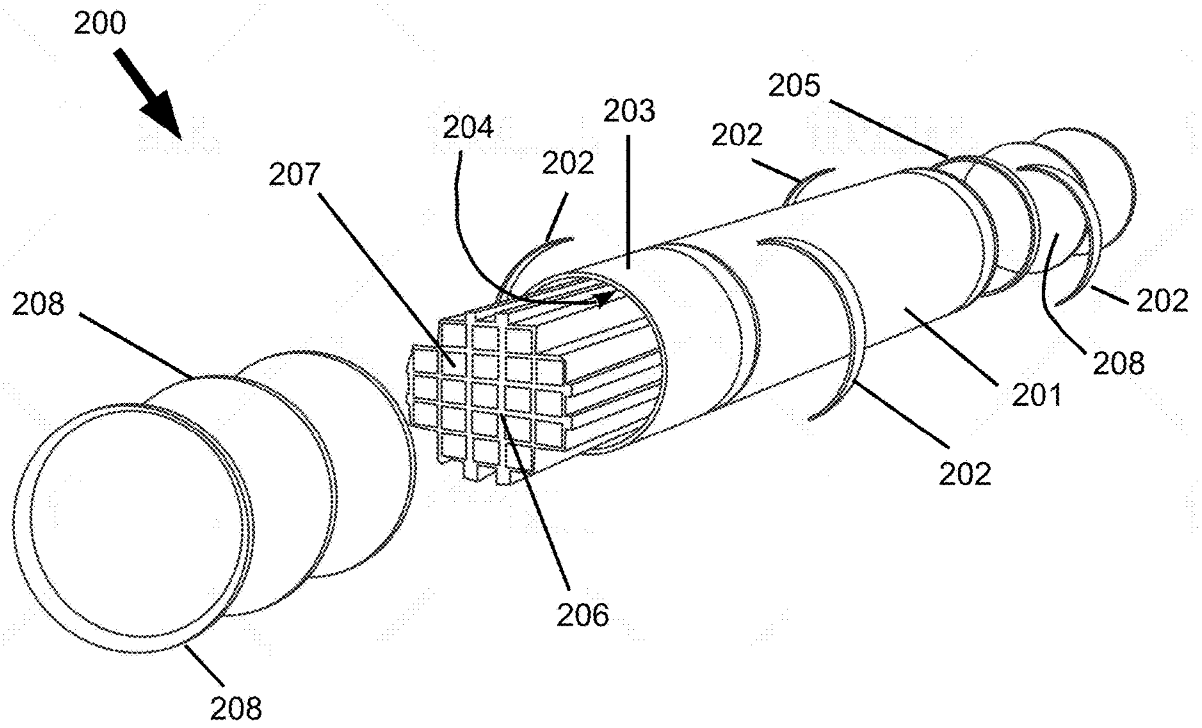
FIG. 2A (Prior Art)
FIG. 2A illustrates a prior art nuclear waste disposal system proposed to be used in the U.S. to store high-level nuclear waste (HLW) and spent nuclear fuel (SNF) assemblies in Yucca Mountain (Mt.).

FIG. 2A represents a prior art nuclear waste capsule system 200 designed for the disposal of HLW inside of the Yucca Mountain repository, in the U.S. In this prior art embodiment, an outer cylinder 201 with surrounding exterior collars 202 protect an inner tube 203 which has an interior cavity 204. The inner tube 203 has interior ring supports 205. Inside this interior cavity 204 is provided a honeycomb basket 206 capable of holding the SNF assemblies 207. The ends of the capsule 200 are protected by multiple endplates 208. This capsule 200 system is typically twenty (20) feet or more long by four (4) feet or more in diameter.

In addition, because the HLW loaded capsules 200 are to be located in shallow, near surface and/or shallow mines/tunnels, disposal locations inside of Yucca Mountain, the FIG. 2A prior art embodiment contemplates a massive set of very expensive and very large shields made of titanium metal to provide literal "umbrellas" to protect the inevitable groundwater percolation from HLW materials and/or radioactivity being leached into such proximate groundwater. This expensive titanium "umbrella" system may be installed years after the HLW has been initially stored in the repository, which leaves that groundwater unprotected until the titanium "umbrella" shield system is installed, and assuming that the titanium "umbrella" shield system will even work once installed.

In contrast, the embodiments of the present application utilize very deep disposal in rocks (repository geological formation 306) thousands of feet deep below any groundwater zones, in order to protect groundwater from radioactivity leaching into the groundwater from the waste-capsules 309.

Figure 2B:
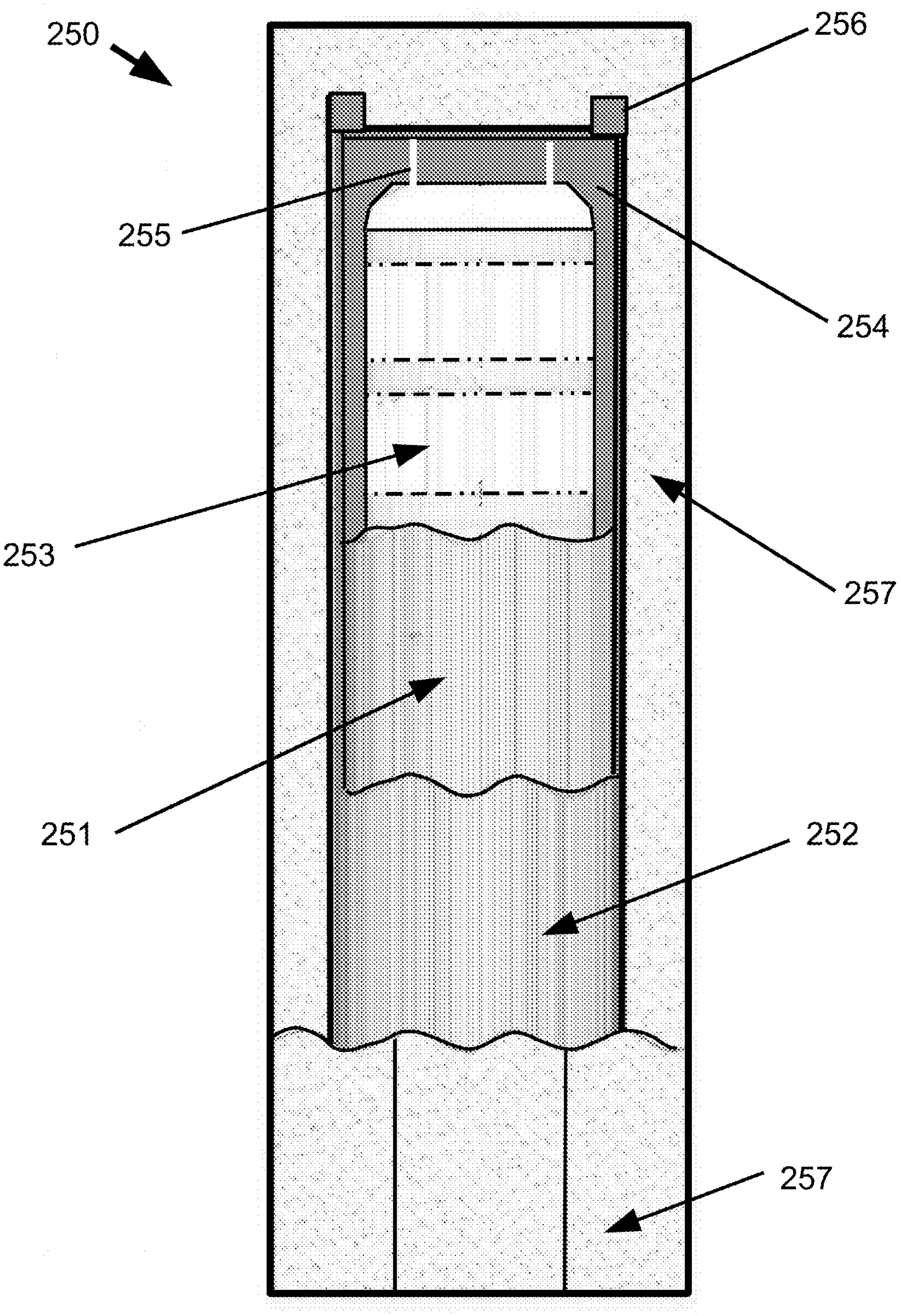
FIG. 2B (Prior art)
FIG. 2B illustrates a prior art nuclear waste disposal system proposed to be used in Canada and in some European countries to store SNF assemblies inside mines or similar underground systems which are carved out of rock formations that are at about 1,500 feet deep below the Earth's surface.

FIG. 2B illustrates a prior art waste capsule embodiment 250, typically used in Canada and in some European countries. This capsule apparatus 250 is designed to stand vertically in a hole carved or mined in the ground preferably in a mined or similar cavity implemented several hundred feet, up to 1,500 feet underground. In this FIG. 2B, a steel liner vessel 251 forms the structural basis of the waste capsule apparatus 250. Externally disposed to this steel liner 251 is a copper shell 252 which provides the corrosion protection of the waste capsule system 250, potentially for up to 10,000 years. Inside the copper shell 252 is a SNF assembly basket 253 containing the spent nuclear fuel assemblies 101. At the top of the capsule structure an inner steel lid 254 is positioned and secured in place. Drilled into the top of the steel lid 254 are vertical vent holes 255 to allow gases to leave the capsule. Finally, a copper lid 256 is fixed to the vertical copper shell 252. The whole system 250 is then placed underground and then "back filled" with granular bentonite material 257 around and above the unit. So, the granular bentonite material 257 is only contained by the hole in the ground that has the given capsule 250 installed therein. The granular bentonite material 257 is in direct physical contact with the exterior of the capsule 250 (i.e., the coper shell 252) and the interior of the formation structure that the hole was made out of.

FIG. 3 may illustrate an inclusive overview of a deep geologic nuclear waste disposal system 300 contemplated by at least one embodiment of the present invention. In some embodiments, located on Earth's surface 301 (terrestrial surface 301) may be one or more of: nuclear powerplant(s) 302, SNF (spent nuclear fuel) surface storage/waste capsule assembly location(s)/facilities 303, drill rig system 304, combinations thereof, portions thereof, and/or the like. In some embodiments, nuclear powerplant 302 may or may not be part of waste disposal system 300. In some embodiments, reference numeral 303 may be associated with just SNF surface storage facilities. Whereas, in some other embodiments, reference numeral 303 may be associated with SNF surface storage facilities that are combined with facilities for assembling waste-capsules 309 as taught and contemplated herein. Whereas, in some other embodiments, reference numeral 303 may be associated with just facilities for assembling waste-capsules 309 as taught and contemplated herein. In some embodiments, SNF storage/capsule assembly location(s) 303 may or may not be part of waste disposal system 300.

Continuing discussing FIG. 3, in some embodiments, drill rig system 304 may or may not be part of waste disposal system 300. In some embodiments, surface drill rig system 304 may be apparatus that drills, forms, and/or carves outs various wellbores, such as, but not limited to, vertical wellbore 305, primary lateral wellbore 307, secondary lateral wellbore 308, deep geological man-made caverns (not shown), combinations thereof, portions thereof, and/or the like. In some embodiments, surface drill rig system 304 may be used to place (locate) wellbores into repository geological formation 306, particularly primary lateral wellbore 307; and as needed or desired, secondary lateral wellbore(s) 308. In some embodiments, surface drill rig system 304 may also be used to insert (or withdraw) waste-capsule(s) 309 in the drilled-out (formed) wellbores 305, 307, and/or 308. In some embodiments, a goal may be to place (locate) waste-capsule(s) 309, with HLW/SNF, into repository geological formation 306 for long-term disposal/storage.

Continuing discussing FIG. 3, in some embodiments, repository geological formation 306 may be located substantially from about 5,000 feet to about 30,000 feet below terrestrial surface 301, plus or minus 1,000 feet. Note, as used herein, repository geological formation 306 may be used interchangeably with deep-geological-formation 306, repository rock formation 306, host rock 306, or the like. In some embodiments, repository geological formation 306 may be a rock formation and/or of substantially a rock formation. In some embodiments, repository geological formation 306 may have geologic properties that make storing nuclear materials (e.g., HLW/SNF) therein relatively (sufficiently) safe. For example, and without limiting the scope of the present invention, in some embodiments, repository geological formation 306 may have one or more of the following geologic properties: structural closure, stratigraphically varied, low porosity, low permeability, low water saturation, reasonable clay content, combinations thereof, portions thereof, and/or the like. In some embodiments, repository geological formation 306 may be below one or more overlain/underlain rock layer(s) 310. In some embodiments, repository geological formation 306 may be above one or more overlain/underlain rock layer(s) 310. In some embodiments, vertical wellbore 305 may extent from terrestrial surface 301 and to and/or into repository geological formation 306. In some embodiments, primary lateral wellbore 307 may be located a predetermined depth below the (terrestrial) surface 301 and within repository geological formation 306. For example, and without limiting the scope of the present invention, in some embodiments, primary lateral wellbore 307 may be located a predetermined depth of at least 10,000 feet below the (terrestrial) surface 301 and within repository geological formation 306.

Continuing discussing FIG. 3, in some embodiments, waste-capsule 309 may store (e.g., contain) HLW (high-level solid waste) and/or SNF (spent nuclear fuel). In some embodiments, associated usually, but normally at distant remote locations, may be one or more nuclear powerplant(s) 302; and/or one or more surface-storage-location(s) 303 for nuclear waste storage and/or for waste-capsule 309 assembly. In some embodiments, both nuclear powerplant(s) 302 and/or surface-storage-location(s) 303 may be located on a terrestrial surface 301. In some embodiments, surface drill rig system 304 may be substantially similar as to a drilling rig used in the oil-well drilling industry but with several updated modifications and features to allow safe handling of the radioactive waste (such as, HLW and/or SNF). In some embodiments, a single loaded waste-capsule 309 may weigh a metric ton (2,200 pounds [lbs]) or more. In some embodiments, waste-capsule 309 may have a load capacity of at least one (1) metric ton (2,200 pounds [lbs.]. In some embodiments, a lift capacity of available heavy duty drill rig system 304, may be up to one million pounds (1,000,000 lbs.). In some embodiments, a lift capacity of 304 may allow as many as fifty (50) or more waste-capsules 309 to be loaded simultaneously into the wellbore systems described herein with very little effort and within accepted lift safety margins.

Continuing discussing FIG. 3, in some embodiments, while at least some portions of vertical wellbore 305 may be substantially vertical with respect to above located terrestrial surface 301 of the Earth, at least some portions of primary lateral wellbore 307 may be substantially horizontal. In some embodiments, one or more primary lateral wellbores 307 may emanate (e.g., derive/branch off) from vertical wellbore 305. In some embodiments, one or more secondary lateral wellbores 308 may emanate (e.g., derive/branch off) from primary lateral wellbores 307. In some embodiments, one or more waste-capsules 309 (with HLW and/or SNF) may be located, placed, and/or stored in one or more of primary lateral wellbores 307, secondary lateral wellbores 308, and/or vertical wellbores 305. In some embodiments, surface drill rig system 304 may be used to form one or more of vertical wellbores 305, primary lateral wellbores 307, secondary lateral wellbores 308, combinations thereof, portions thereof, and/or the like.

In some embodiments, one or more of vertical wellbores 305, primary lateral wellbores 307, and/or secondary lateral wellbores 308 may have predetermined (outside) diameters. For example, and without limiting the scope of the present invention, in some embodiments such wellbore diameters may be selected from the range of substantially ten (10) inches to substantially forty-eight (48) inches, plus or minus one (1) inch.

In some embodiments, one or more of vertical wellbores 305, primary lateral wellbores 307, and/or secondary lateral wellbores 308 may have predetermined lengths. For example, and without limiting the scope of the present invention, in some embodiments such lengths may be selected from the range of substantially one thousand feet to substantially twenty-five thousand feet, plus or minus one hundred feet.

Some embodiments of the present invention may be focused on utilizing the most effective, most economical, lean manufacturing, and/or most rapidly deployable means, in moving HLW and/or SNF, within waste-capsule(s) 309, from nuclear powerplant(s) 302 to wellbores 305, 307, and/or 308 within repository geological formation 306; and/or from surface-storage-location(s) 303 to wellbores 305, 307, and/or 308 within repository geological formation 306.

Continuing discussing FIG. 3, in some embodiments, waste disposal system 300 may comprise one or more of: vertical wellbore 305, primary lateral wellbore 307, secondary lateral wellbore 308, waste-capsule(s) 309, drill rig system 304, combinations thereof, portions thereof, and/or the like.

Continuing discussing FIG. 3, in some embodiments, waste disposal system 300 may comprise one or more of: vertical wellbore 305, primary lateral wellbore 307, secondary lateral wellbore 308, waste-capsule(s) 309, drill rig system 304, SNF storage/capsule assembly 303, nuclear powerplant 302, combinations thereof, portions thereof, and/or the like.

Figure 4:
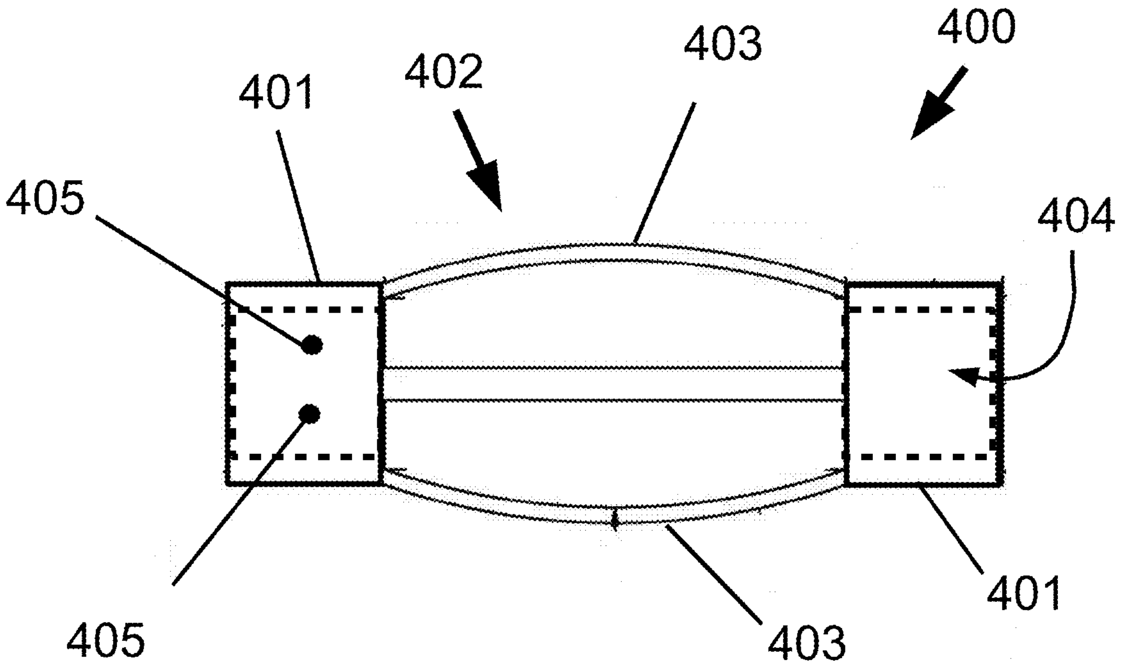
FIG. 4 is a lengthwise side schematic view of a spring-loaded receptacle (SLR) for use in various embodiments described herein.

FIG. 4 is a lengthwise side schematic view of a spring-loaded receptacle 400 for use in various embodiments described herein. Note, "spring-loaded receptacle 400" may be abbreviated as "SLR 400" herein, wherein "SLR" stands for "spring-loaded receptacle." In some embodiments, SLR 400 may be a part and/or a component of a given waste-capsule 309. In some embodiments, a given SLR 400 may be disposed on an outside of SNF assembly 501 (or portion thereof) (see e.g., FIG. 5A). In some embodiments, a given SLR 400 may cradle and/or structurally support SNF assembly 501 (or portion thereof) (see e.g., FIG. 5A and/or FIG. 6). Continuing discussing FIG. 4, in some embodiments, SLR 400 may comprise two collars 401, one spring bow 402, and at least one set screw 405 (for at least one of two collars 401). In some embodiments, SLR 400 may comprise a pair of oppositely disposed collars 401 and a spring bow 402 that may be disposed between and in physical communication with the two of oppositely disposed collars 401. In some embodiments, capped on either oppositely disposed end of spring bow 402 may be a collar 401. In some embodiments, from end to end of a given SLR 400, with respect to an overall length of the given SLR 400, may be a first collar 401, then spring bow 402, and then a second collar 401. In some embodiments, a given SLR 400 unit's two oppositely disposed collars 401 may be integral with spring bow 402 disposed between. In some embodiments, the two oppositely disposed collars 401 may structurally provide load carrying means to the given SLR 400; and which may allow spring bow 402 to physically support SNF assembly 501 (or portion thereof) inside the cavity of waste-capsule 309 (e.g., within the cavity of inner tube 602 of waste-capsule 309). Note, see FIG. 5A for SNF assembly 501; and see FIG. 6 for inner tube 602 of waste-capsule 309.

Continuing discussing FIG. 4, in some embodiments, a connection/attachment between an end of a given collar 401 and an end of its adjacent spring bow 402 may be by one or more of: weld, mechanical fastener (such as, but not limited to, bolts, rivets, screws, pins, rods, nails, etc.), adhesive, glue, epoxy, cement, integrally formed from a same stock material, combinations thereof, portions thereof, and/or the like.

Continuing discussing FIG. 4, in some embodiments, spring bow 402 may be comprised of three, four, or more elongate linear spring element members 403. In some embodiments, these elongate linear spring element members 403 of a given spring bow 402 may be substantially parallel with each other, but spatially separated from each other. In some embodiments, these elongate linear spring element members 403 of a given spring bow 402 may be arranged around an outside portion of a SNF assembly 501 (or portion thereof). In some embodiments, these elongate linear spring element members 403 of a given spring bow 402 separate the two oppositely disposed collars 401 from each other of a given SLR 400. Note, see FIG. 5A for SNF assembly 501. In some embodiments, the elongate linear spring element members 403 of a given spring bow 402 may be circumferentially disposed and equally spaced around the SNF assembly 501 (or portion thereof), and these elongate linear spring element members 403 may provide a restorative force which maintains the SNF assembly 501 (or portion thereof) at a (predetermined and/or desired) stand-off distance from an inside/interior surface wall of inner tube 602. In some embodiments, these elongate linear spring element members 403 may support and/or keep the SNF assembly 501 (or portion thereof) rigidly and/or centrally located inside inner tube 602 while still allowing the SNF assembly 501 (or portion thereof) to be moved axially (laterally) inside of inner tube 602 if desired and/or if needed. See e.g., FIG. 5A and FIG. 6.

Continuing discussing FIG. 4, in some embodiments, SLR 400 may be an elongate member with an overall hollow bore 404. In some embodiments, an inside diameter of collar(s) 401 may be bore 404. In some embodiments, spring bow 402 may be arranged around bore 404. In some embodiments, a diameter or a transverse width of spring bow 402 may be the same or larger than a dimension of bore 404. In some embodiments, bore 404 may run from the end of the first collar 401, across a length of spring bow 402, and to the end of the second collar 401. In some embodiments, bore 404 may be sized to receive SNF assembly 501 (or portion thereof). In some embodiments, an outside diameter (or an outside transverse width) of SNF assembly 501 (or portion thereof) may be smaller than the size of bore 404. In some embodiments, SNF assembly 501 (or portion thereof) may be inserted into bore 404 of a given SLR 400. In some embodiments, SNF assembly 501 (or portion thereof) may be slidably installed into and/or reside within bore 404 of a given SLR 400.

Note, in some embodiments, bore 404 may be non-circular in transverse width cross-section; for example, when a transverse cross-section through SNF assembly 501 (or a portion thereof) may be non-circular (e.g., with rectangular SNF assembly 501*b* (or a portion thereof) and/or hexagonal SNF assembly 501*c*).

Continuing discussing FIG. 4, in some embodiments, at least one of two collars 401 may comprise at least one set screw 405. In some embodiments, a given set screw 405 may be configured to frictionally attach SNF assembly 501 (or portion thereof) to the given collar 401. In some embodiments, set screw 405 may generate a holding (frictional) force to keep collar 401 from sliding on SNF assembly 501 (or portion thereof). In some embodiments, set screws 405 may be implemented mostly (substantially) evenly spaced around the circumference of a given collar 401. In some embodiments, a given collar 401 may receive six set screws 405. In some embodiments, collar 401 may comprise one, two, three, four, five, six, or more set screws 405 (and through holes in the given collar 401 to receive such set screw 405). In some embodiments, only one of the two collars 401 may have associated set screw(s) 405 (as such a configuration may permit the collar 401 without set screws 405 to maintain some freedom of movement between that collar 401 and a portion of SNF 501 located within that collar 401 bore 404). In some other embodiments, both of the two collars 401 may have associated set screw(s) 405.

Continuing discussing FIG. 4, in some embodiments, one of the two collars 401 of a given SLR 400 may have no set screws 405 (or other hold-down means) and this asymmetrical hold-down feature permits that one collar 401, without the hold-down means, to move axially (laterally); and specifically, permitting its attached spring bow 402 to flex and extend, relax, or contract in length and/or diameter as that SLR 400 may be pushed/installed into inner tube 602 when inserting the combined-assembly-of-SNF-with-SLR-and-with-stop-collar(s) 500 assemblies into inner tube 602. In some embodiments, this asymmetrical hold-down embodiment may permit the SLR 400 to increase or decrease in total length (length 804); and thus, a space or gap 503, not shown in FIG. 4, may be needed to accommodate these physical changes. Note, gap 503 discussed in a discussion of FIG. 5A below.

Note, in some embodiments, set screws 405 may also be associated with stop-collars 502 and serve a same function/purpose as set screws 405 with collars 401. See e.g., FIG. 5A for stop-collars 502.

Continuing discussing FIG. 4, in some embodiments, SLR 400 may be substantially (e.g., at least mostly) constructed from one or more predetermined metals, alloys, combinations thereof, portions thereof, and/or the like. In some embodiments, SLR 400 and/or its components may be made from ductile metal(s) or alloy(s), such as, but not limited to, steel. In some embodiments, SLR 400 may be substantially (e.g., at least mostly) constructed from one or more steels. In some embodiments, SLR 400 may be substantially (e.g., at least mostly) constructed from one or more steels with sufficient tensile strength and compressive strength to support the expected loads from supporting SNF assembly 501 (or portions thereof) and/or from inner tube 602 (as spring bow 402 may be in physical contact with inner tube 602). In some embodiments, SLR 400 may be substantially (e.g., at least mostly) constructed from one or more steel alloys, such that no (or sufficiently minimal)

electrochemical interactions may occur between spring bow 402 and inner tube 602 material (e.g., passivated copper) which may lead to corrosion or to deterioration of the waste-capsule 309 material(s). In some embodiments, spring bow 402 may comprise a steel material that allows for spring-like bending under predetermined load and restoration of the spring bow 402 during relaxation (no or minimal load). In some embodiments, a protective coating may then be applied to surface(s) of SLR 400 and/or its components. In some embodiments, set screws 405 may be constructed of steel alloys.

Continuing discussing FIG. 4, in some embodiments, SLR 400 may be of one-piece construction or multiple-piece construction. In some embodiments, SLR 400 may be formed in a variety of mechanical ways. Generally available mechanical and engineering operations that are present in the industry today are sufficient to manufacture a given SLR 400. No new techniques, technologies or breakthroughs are needed to construct and implement a given SLR 400. Equipment and processes like computerized numerical control (CNC) machines, laser cutters, plasma cutters, water jet cutters, stampers, benders, formers, combinations thereof, portions thereof, and/or the like, are readily available and relatively inexpensive to operate to construct the components of a given SLR 400 (and its waste-capsule 309 system). Compared to other prior art systems which require special metals like titanium, special metal welding processes and dedicated assembly operations these embodiments herein are less onerous and more practical.

Figure 5A:
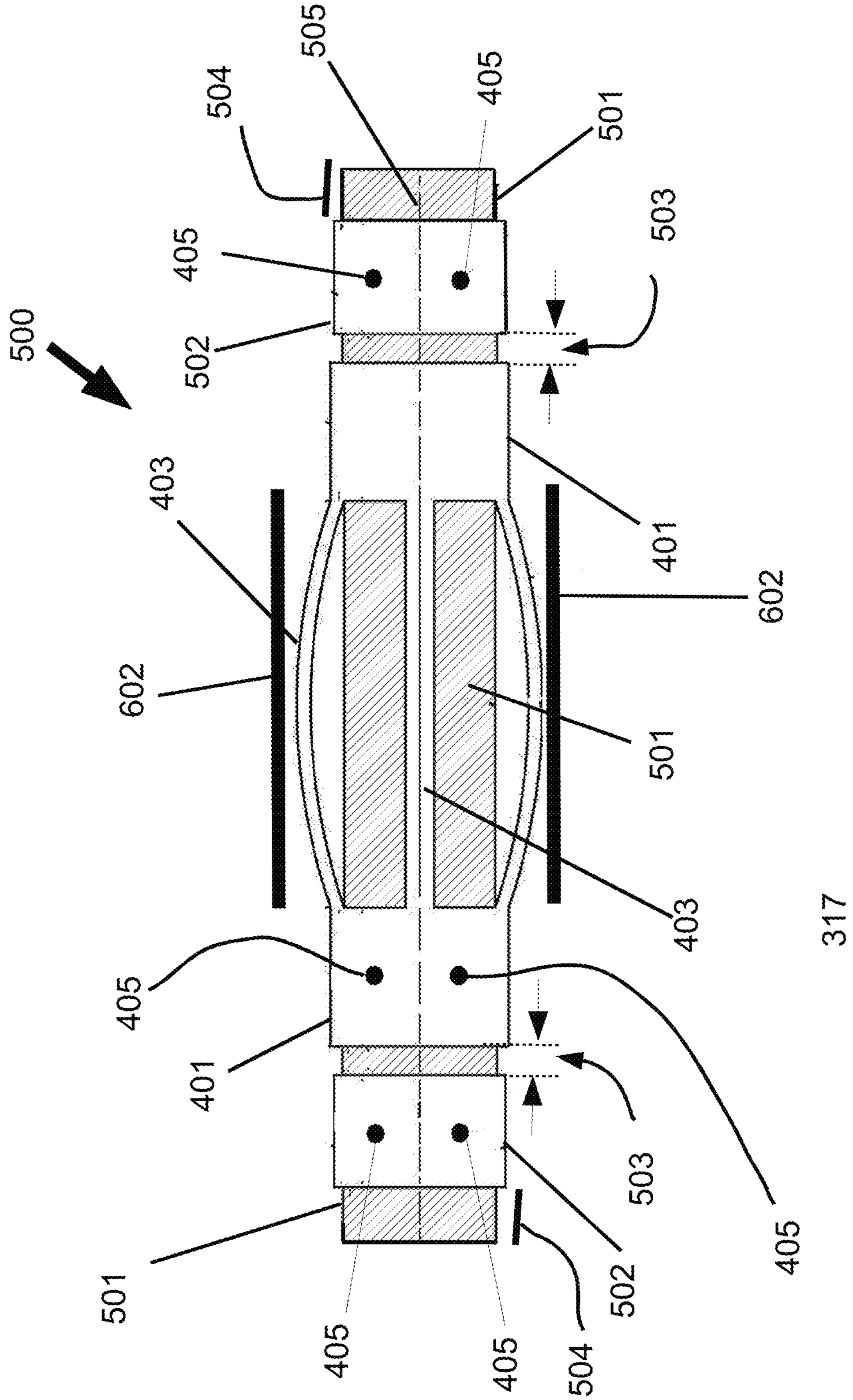
FIG. 5A is a lengthwise side schematic view of a SLR circumferentially attached to a SNF assembly (or portion thereof).

FIG. 5A is a lengthwise side schematic view of SLR 400 attached to SNF assembly 501 (or portion thereof). FIG. 5A is a lengthwise side schematic view of a combined assembly of SNF with SLR and with stop-collar(s), wherein this overall combined assembly is assigned reference numeral 500. In some embodiments, a given combined-assembly-of-SNF-with-SLR-and-with-stop-collar(s) 500 may comprise at least one SNF assembly 501 (or portion thereof), at least one SLR 400 (attached to the at least one SNF assembly 501 (or portion thereof)), and at least one stop-collar 502 (also attached to the at least one SNF assembly 501 (or portion thereof)). FIG. 5A also shows that the SLR 400 is residing within inner tube 602. Note in FIG. 5A, only portions of inner tube 602 are shown; a full length of inner tube 602 would extend beyond a length of SLR 400 and/or of a length of SNF assembly 501 (or portion thereof) that are both located within inner tube 602. FIG. 5A also shows that on either end of SLR 400, and also attached to SNF assembly 501 (or portion thereof), are a pair of oppositely disposed stop-collars 502. In some embodiments, SLR 400 and two oppositely disposed stop-collars 502 may be implemented on (attached to) SNF assembly 501 (or portion thereof). FIG. 5A also may show that one or more of the elongate linear spring element members 403 of spring bow 402 may removably and/or slidably physically contact interior wall surfaces of inner tube 602. In some embodiments, multiple SLR 400 units may be attached to a single larger SNF assembly 501 unit (or portion thereof).

Continuing discussing FIG. 5A, in some embodiments, disposed on either end of a given SLR 400 may be a stop-collar 502. In some embodiments a given installed stop-collar 502 may limit (stop) axial (lateral) movement of an installed SLR 400, with respect to a given SNF assembly 501 (or portion thereof). In some embodiments, a given stop-collar 502 may be substantially similar to a collar 401, except that stop-collar 502 may not be attached to spring box 402. In some embodiments, stop-collar 502 may have similar and/or the same materials of construction, shapes, sizes, geometry, contours, dimensions, combinations thereof, portions thereof, and/or the like, as compared to collar 401, except that stop-collar 502 may not be touching nor attached to spring bow 402. In some embodiments, stop-collar 502 may comprise bore 404, just a collar 402 does. In some embodiments, bore 404 of stop-collar 502 may removably slide along an exterior of a portion of SNF assembly 501 (or portion thereof). In some embodiments, stop-collar 502 may comprise one or more set screws 405. In some embodiments, set screw(s) 405 of stop-collar 502 may be used (tightened) to prevent slippage of stop-collar 502 and SNF assembly 501 (or portion thereof).

Continuing discussing FIG. 5A, in some embodiments, gap 503 may be a gap between a terminal end of collar 401 of SLR 400 and an end of stop-collar 502. In some embodiments, this gap 503 may allow an unfixed SLR 400 collar 401 to move axially (lengthwise) along the length of SNF assembly 501 (or portion thereof) outer (exterior) surface during insertion of the combined SLR 400, SNF assembly 501 (or portion thereof), and stop-collars 502 assembly (i.e., the combined-assembly-of-SNF-with-SLR-and-with-stop-collar(s) 500) into inner tube 602. In some embodiments, the two stop-collars 502 when fixed onto SNF assembly 501 (or portion thereof) may limit the lateral (axial) movement of SLR 400 with respect to SNF assembly 501 (or portion thereof) that may be within bores 404. In some embodiments, once a given stop-collar 502 is affixed to SNF assembly 501 (or portion thereof), e.g., via one or more set screws 405, and once a given collar 401 is affixed to that SNF assembly 501 (or portion thereof), e.g., via one or more set screws 405, then gap 503 may be fixed. In some embodiments, gap 503 may be nominally between one (1) inch and three (3) inches, plus or minus (+/−) one half inch (½) inch. In some embodiments, gap 503 may be nominally between one (1) inch and four (4) inches, plus or minus (+/−) one half inch (½) inch.

Continuing discussing FIG. 5A, in some embodiments, gap 504 may be a gap between an outside end of stop-collar terminal 502 and a terminal end of SNF assembly 501 (or portion thereof). In some embodiments, gap 504 may indicate a distance between an axial terminal end of a given stop-collar 502 and an adjacent/nearest axial terminal end of the given SNF assembly 501 (or portion thereof) that is also residing within that given stop-collar 502. In some embodiments, once a given stop-collar 502 is affixed to SNF assembly 501 (or portion thereof), e.g., via one or more set screws 405, then gap 504 may be fixed. In some embodiments, gap 504 may measure about one (1) inch to about three (3) inches, plus or minus (+/−) one half (½) inch.

In some embodiments however, especially when several SLR 400 units may be implemented (attached) on a larger (longer) SNF assembly 501, like U.S. SNF assembly 501*b* units or Russian SNF assembly 501*c* units, this gap 504 may not be the distance to a terminal end of the SNF assembly 501; but rather, gap 504 may be the distance between two adjacent and different stop-collars 502 on the same larger SNF assembly 501 unit.

Note as shown in FIG. 5A one of two collars 401 of SLR 400 has set screws 405 while the other collar 401 does not have any set screws 405.

Continuing discussing FIG. 5A, in some embodiments, at least some of outer exterior surfaces of the elongate linear spring element members 403 of the given spring bow 402 may sometimes rest firmly on the inner/interior surface of inner tube 602. In some embodiments, the elongate linear spring element members 403 of the given spring bow 402 may be biased such that at least some of the elongate linear spring element members 403 press firmly on/against inner/interior surface of inner tube 602. In some embodiments, spring bow 402 may develop a restorative force and when compressed behave in such a manner that SNF assembly 501 (or portion thereof) may remain fixed inside the inner cavity of inner tube 602 while still allowing SNF assembly 501 (or portion thereof) to move axially during the SNF loading sequence along the length of inner tube 602.

Continuing discussing FIG. 5A, in some embodiments, when a given SLR 400 may be installed on SNF assembly 501 (or portion thereof), that SLR 400 may support the SNF assembly 501 (or portion thereof) within an inside cavity of waste-capsule 309 (e.g., within inner tube 602 of waste-capsule 309). In some embodiments, the elongate linear spring element members 403 of spring bow 402 may prevent exterior portions of SNF assembly 501 (or portion thereof) from physically contacting (touching) interior portions of waste-capsule 309 (such as, interiors of inner tube 602 of waste-capsule 309). In some embodiments, the elongate linear spring element members 403 of spring bow 402 may allow exterior portions of SNF assembly 501 (or portion thereof) to physically stand off from interior walls of waste-capsule 309 (e.g., interior walls of inner tube 602 of waste-capsule 309). See also FIG. 6.

Continuing discussing FIG. 5A, in some embodiments, a total quantity of SLR 400 units used on a specific/particular SNF assembly 501 (or portion thereof) may vary with SNF assembly 501 (or portion thereof) size (dimensions), such as, but not limited to, length of SNF assembly 501 (or portion thereof). In some embodiments, a total quantity of SLR 400 units used on a specific/particular SNF assembly 501 (or portion thereof) may vary from one (1) SLR 400 unit to five (5) SLR 400 units. In some embodiments, shorter SNF assembly 501 (or portion thereof) may receive one SLR 400 unit. In some embodiments, longer SNF assembly 501 (or portion thereof) may receive two or more SLR 400 units.

Continuing discussing FIG. 5A, in some embodiments, the elongate linear spring element members 403 of a given spring bow 402 of a given SLR 400 may provide a biassing (spring) force such that the SNF assembly 501 (or portion thereof) may be supported and suspended inside centrally within the operating internal cavity/volume 603 (of inner tube 602). In some embodiments, the spring bow 402 structures of the elongate linear spring element members 403 may provide support to the held SNF assembly 501 (or portion thereof) and which may allow the held SNF assembly 501 (or portion thereof) to also standoff from the inside/interior copper walls of inner tube 602; but in addition, the elongate linear spring element members 403 may provide suspension, shock absorption, and/or damping action like a "leaf spring" which may allow the held SNF assembly 501 (or portion thereof) to be cushioned from impact and/or other disruptive loads that may occur during the packaging, transport, and/or disposal process of a given combined-assembly-of-SNF-with-SLR-and-with-stop-collar(s) 500 unit. Other prior art systems have rigid fixed supports on the SNF assembly 101/103/105 cores and do not allow this suspension action to occur and by so doing subject the SNF assembly 101/103/105 cores to a variety of lateral, circumferential, and translational forces during movement of the SNF assembly 101/103/105 cores, which may be dangerous and/or damaging to the safe operations of nuclear waste disposal. In contrast, SLR 400 units operate like a shock absorber system within the waste-capsule 309 system.

In some prior art oilfield drilling operations, the use of spring loaded systems called "centralizers" have been widely used usually during cementing operations, where an inner cylinder apparatus e.g., a casing string, was required to be centered or to stand off from an outer concentrically located casing string. These oilfield centralizers are on the outside of the given casing string. Whereas, in some embodiments, SLR 400 units are located on an inside of inner tube 602 of a given waste-capsule 309 and not on an outside of the given waste-capsule 309. Additionally, the SLR 400 units may slide in the axial direction (back and/or forth) within inner tube 602, but only within a relatively small finite length may such sliding occur, as such sliding may be limited by the length of the given inner tube 602 and by the presence of other SLR 400 units, and/or separator(s) 604/606 installed within that same inner tube 602. For example, and without limiting the scope of the present invention, a first inserted SLR 400 unit into a given inner tube 602 may slide more in that inner tube 602 as compared to subsequently inserted SLR 400 units into that same inner tube 602.

In some embodiments, upon loading of a given combined-assembly-of-SNF-with-SLR-and-with-stop-collar(s) 500 within a given inner tube 602, but before sealing/closing of that inner tube 602, sliding of at least one SLR 400 of the given combined-assembly-of-SNF-with-SLR-and-with-stop-collar(s) 500, may slide on the order of feet within that given inner tube 602; whereas, upon sealing/closing of that inner tube 602, sliding of at least one SLR 400 of the given combined-assembly-of-SNF-with-SLR-and-with-stop-collar(s) 500, may slide on the order of millimeters (mm) or less within that given inner tube 602. In some embodiments, after the sealing/closing of that inner tube 602, the relatively small amount of sliding translation may be because of heat, vibrations, and/or flexing in elongate linear spring element member 403 of spring bow(s) 402. In some embodiments, additional spring-bow(s) 402, collar(s) 401, stop-collar(s) 502, separator(s) 604, separator(s) 606, caps(s) 607, protective/preventative medium 609, support-pad(s) 610, endplate(s) 611, coupling(s) 612, portions thereof, combinations thereof, and/or the like may limit sliding translation of SLR(s) 400 within a given sealed/closed inner tube 602.

In some nuclear waste prior art, e.g., U.S. Pat. No. 10,878,972, a canister centralizer was used on the outside of a waste canister to "center" the waste canister during deployment on a wireline device. This prior art further teaches that the externally applied centralizers to the waste canister may act as a friction brake during a free-fall operation of the waste canister in the wellbore. This type of prior art application wherein a spring loaded, friction-generating centralizer is used on the outside of the nuclear waste capsule is not contemplated in this present patent applications and the embodiments disclosed and discussed herein. In contrast, in some embodiments, SLR 400 units are located on an inside of inner tube 602 of a given waste-capsule 309 and not on an outside of the given waste-capsule 309. Additionally, the SLR 400 units may slide in the axial direction (back and/or forth) within inner tube 602, but only within a relatively small finite length may such sliding occur, as such sliding may be limited by the length of the given inner tube 602 and by the presence of other SLR 400 units, and/or separator(s) 604/606 installed within that same inner tube 602.

In addition, implementing the SLR 400 units on the inside of inner tube 602 of the waste-capsule 309 system may be operationally and mechanically superior compared to the prior art systems. It should be noted that the elongate linear spring element members 403 of spring bow(s) 402 are not as robust as the exterior structural steel outer shell 601 of the waste-capsule 309. Internal SLR 400 implementation (i.e., inside of inner tube 602) may provide for a higher degree of safety compared to the prior art that externally mounts the relatively fragile centralizers, which may be easily broken or "knocked off" when moving a relatively heavy (e.g., one (1) metric ton or more) waste capsule full of HLW. Furthermore, internal SLR 400 mounting (installation) allows for efficiency of operations including easier waste-capsule 309 packing and easier waste-capsule 309 transport, since the waste-capsule 309 system in this patent application is fully ready for insertion and disposal into the vertical and lateral wellbores 305/307/308 once the combined-assembly-of-SNF-with-SLR-and-with-stop-collar(s) 500 unit(s) are inserted into the given inner tube 602 (and sealed). There are no obstructive external appendages/geometry hanging onto the outside surface of the given loaded waste-capsule 309.

An additional novel feature of the internal use of SLR(s) 400 is that there is no need to change the SLR 400 unit sizes regardless of the type or size of wellbores 305/307/308 being used for disposal. The SLR 400 embodiment provides a "one size fits all" for possible operational situation variations. A given SLR 400 being internal (e.g., within inner tube 602), means the SLR 400 never needs to contact the inside wall of the wellbore 305/307/308 casing(s) and as such, regardless of wellbore 305/307/308 diameter this SLR 400 device functions effectively. In the externally applied centralizer case of the prior art, several different diameter sizes of external centralizers may be needed to allow the externally applied waste capsule system to touch and adequately stand-off from the different wellbore diameters and wall sizes in a given well. This increases operations difficulty and is prone to human error in simultaneously selecting and installing a variety of different external centralizers on location. Furthermore, a single mass-produced item (e.g., SLRs 400) for disposal use is considerably cheaper than designing and producing multiple items as required in external centralizer operations.

Finally, a significant economic driver in HLW disposal operations is the extreme cost of the high-performance drill rig required. A working rig charges may run from $25,000 to $100,000 per day. It is therefore necessary that the time on location be minimized to optimize and control HLW disposal costs. In the HLW operations contemplated today in the nuclear waste disposal industry, one cannot pack, transport, and store the HLW at a site and wait to "load and dispose" as one may be prone to do with non-radioactive materials. This HLW is dangerously radioactive. The HLW has to be put underground as soon as possible, because of this radioactivity. Internally implemented SLR(s) 400 waste-capsule 309 systems have smooth, streamlined tubes, with non-obtrusive external surfaces, and are ready for disposal as soon as they are packaged/loaded with the HLW/SNF. There is no need to waste time, on location, adding external centralizers to the delivered waste capsule's body. External centralizer systems still may be pre-packed at the central packaging location, then carefully transported with protruding externally obstructive external centralizers, complicating the handling and transportation operations; and may still need significant inspection on-site to prevent mishaps in loading different multiple external centralizer unit sizes into the well. The embodiments contemplated in this application provide for comparatively rapid "daywork" cost-saving operations at the disposal sites where hundreds of waste-capsules 309 may need disposal costing hundreds of thousands of dollars/week.

Prior art of U.S. published patent application number 2019/0295735 (patent application Ser. No. 15/936,245) discloses a fixed external support on a SNF core inside of a waste capsule carrier tube. That prior art fixed external support device is not slidable and that does not provide any shock absorbing suspension functionality; whereas, in some embodiments, SLR 400 units may be axially slidable within inner tube 602 (wherein such slidability may be confined within a relatively short distance). Further, in some embodiments, SLR 400 units may have variable (changeable) diameters 802 (and/or variable transverse width cross-section 802); whereas, the fixed external support on a SNF core (of prior art patent application Ser. No. 15/936,245) have a fixed and non-variable diameter. In some embodiments, SLR 400 units may have variable (changeable) diameters 802 (and/or variable transverse widths 802) because as the elongate linear spring element members 403 are compressed that diameter 802 (transverse width 802) may increase; or as the elongate linear spring element members 403 are put under tension that diameter 802 (transverse width 802) may decrease. Additionally, prior art patent application. Ser. No. 15/936,245 has no SLR 400 structures or the like.

Prior art published patent application U.S. 2021/0174980 (patent application Ser. No. 16/709,701) discloses an external support of a SNF core that is not slidable and that does not provide any shock absorbing suspension functionality.

Figure 5B:
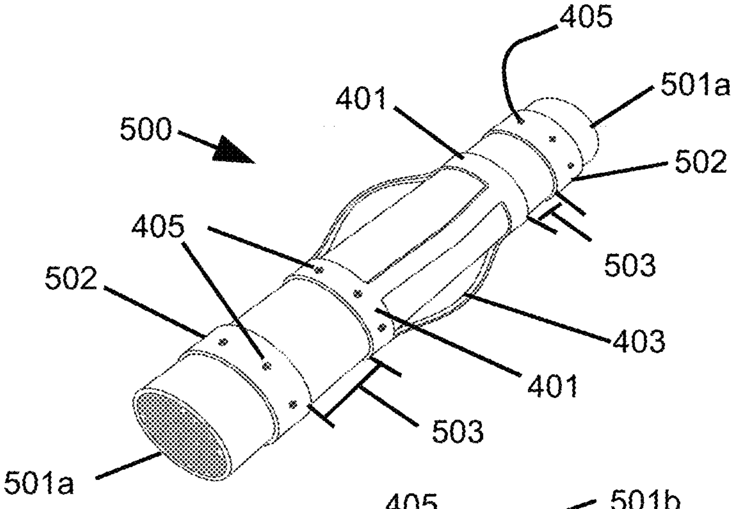
FIG. 5B shows a perspective (isometric) view of a given combined-assembly-of-SNF-with-SLR-and-with-stop-collar(s) unit, with a specific type of SNF assembly (or portion thereof) depicted, a circular (Canadian) SNF assembly (or portion thereof).
Figure 5C:
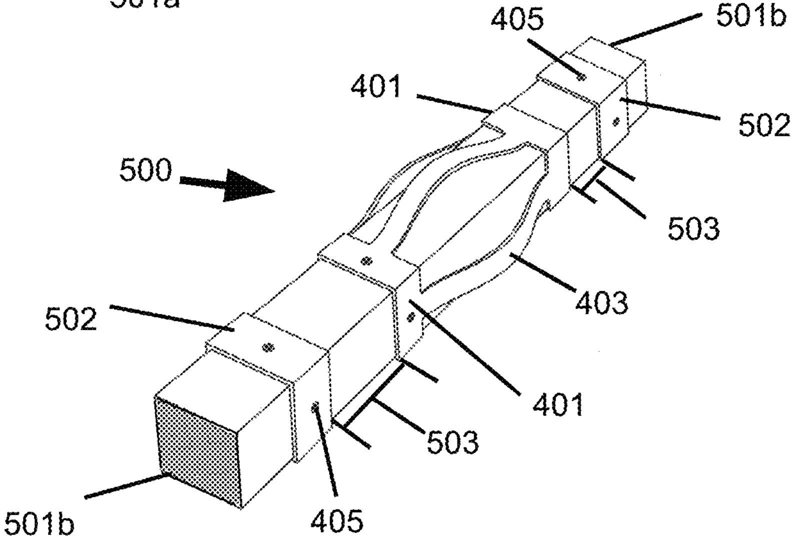
FIG. 5C shows a perspective (isometric) view of a given combined-assembly-of-SNF-with-SLR-and-with-stop-collar(s) unit, with a specific type of SNF assembly (or portion thereof) depicted, a rectangular (square) (U.S.) SNF assembly (or portion thereof).
Figure 5D:
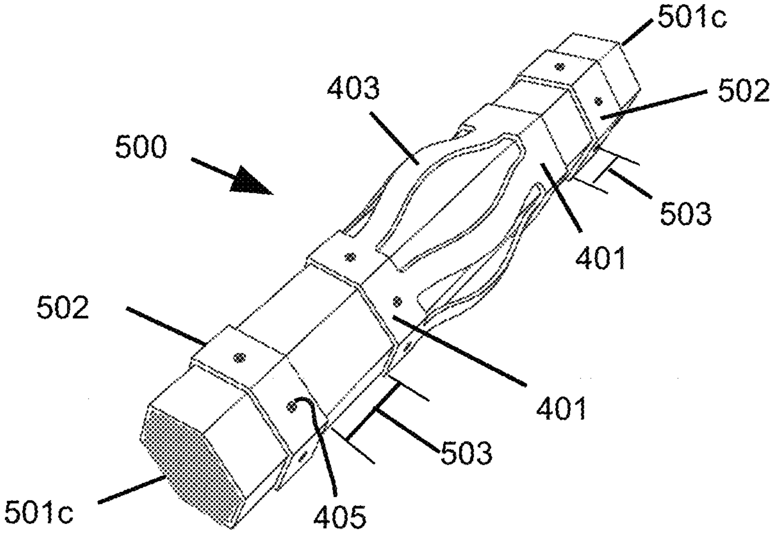
FIG. 5D shows a perspective (isometric) view of a given combined-assembly-of-SNF-with-SLR-and-with-stop-collar(s) unit, with a specific type of SNF assembly (or portion thereof) depicted, a hexagonal (Russian) SNF assembly (or portion thereof).

FIG. 5B, FIG. 5C, and FIG. 5D each shows a perspective (isometric) view of a given combined-assembly-of-SNF-with-SLR-and-with-stop-collar(s) 500, but with a specific and different type of SNF assembly 501 (or portion thereof) depicted. In FIG. 5B the depicted SNF assembly 501 (or portion thereof) may be a circular SNF assembly 501*a* (or portion thereof). In FIG. 5C the depicted SNF assembly 501 (or portion thereof) may be a rectangular SNF assembly 501*b* (or portion thereof). In FIG. 5D the depicted SNF assembly 501 (or portion thereof) may be a hexagonal SNF assembly 501*c* (or portion thereof). Note, when "SNF assembly 501" may be used herein, reference numeral "501" could refer to reference numerals "501*a*," "501*b*," and/or to "501*c*." That is, "501*a*," "501*b*," or to "501*c*" are subsets of "501."

Continuing discussing FIG. 5B, FIG. 5C, and FIG. 5D, in some embodiments, circular SNF assembly 501*a* (or portion thereof) may be Canadian "CANDU" SNF assembly system 101 (or a portion thereof) (see e.g., FIG. 5B). In some embodiments, rectangular SNF assembly 501*b* (or portion thereof) may be U.S. SNF assembly system 105 (or a portion thereof) (see e.g., FIG. 5C). In some embodiments, hexagonal SNF assembly 501*c* (or portion thereof) may be Russian SNF assembly system 103 (or a portion thereof) (see e.g., FIG. 5D).

Continuing discussing FIG. 5B, FIG. 5C, and FIG. 5D, in some embodiments, circular SNF assembly 501*a* (or portion thereof) may be small SNF assembly 501*a* (or portion thereof). In some embodiments, rectangular SNF assembly 501*b* (or portion thereof) may be medium SNF assembly 501*b* (or portion thereof). In some embodiments, hexagonal SNF assembly 501*c* (or portion thereof) may be large SNF assembly 501*c* (or portion thereof).

In FIG. 5B, the SLR 400 and/or the stop-collars 502 may have substantially circular cross-sections to accommodate fitting (slidingly) over an exterior of circular SNF assembly 501*a* (or portion thereof).

In FIG. 5C, the SLR 400 and/or the stop-collars 502 may have substantially rectangular cross-sections to accommodate fitting (slidingly) over an exterior of rectangular SNF assembly 501*b* (or portion thereof).

In FIG. 5D, the SLR 400 and/or the stop-collars 502 may have substantially hexagonal cross-sections to accommodate fitting (slidingly) over an exterior of hexagonal SNF assembly 501*c* (or portion thereof).

Continuing discussing FIG. 5B, FIG. 5C, and FIG. 5D, in some embodiments, an interior shape of a transverse width cross-section through a length of SLR 400 may be shaped as one or more of: circular cross-section, round cross-section, curved cross-section, oval cross-section, triangular cross-section, square cross-section, rectangular cross-section, hexagonal cross-sections, polygonal cross-section, combinations thereof, portions thereof, and/or the like. In some embodiments, an interior shape of a transverse width cross-section through a length of SLR 400 may be shaped to slidably fit over an exterior shape of a transverse width cross-section through a length of SNF assembly 501 (or portion thereof). See e.g., FIG. 5B, FIG. 5C, and FIG. 5D.

For example, and without limiting the scope of the present invention, a transverse width cross-section through a length of circular SNF assembly 501*a* (or portion thereof) may be substantially circular and as such, the transverse width cross-section through the length of SLR 400 may also be substantially circular, but with a larger diameter to slidingly fit over the exterior diameter of circular SNF assembly 501*a* (or portion thereof). See e.g., FIG. 5B.

For example, and without limiting the scope of the present invention, a transverse width cross-section through a length of rectangular SNF assembly 501*b* (or portion thereof) may be substantially rectangular and as such, the transverse width cross-section through the length of SLR 400 may also be substantially rectangular, but with a larger transverse width dimension to slidingly fit over the exterior transverse width dimension of rectangular SNF assembly 501*b* (or portion thereof). See e.g., FIG. 5C.

For example, and without limiting the scope of the present invention, a transverse width cross-section through a length of hexagonal SNF assembly 501*c* (or portion thereof) may be substantially hexagonal and as such, the transverse width cross-section through the length of SLR 400 may also be substantially hexagonal, but with a larger transverse width dimension to slidingly fit over the exterior transverse width dimension of hexagonal SNF assembly 501*c* (or portion thereof). See e.g., FIG. 5D.

Figure 5E:
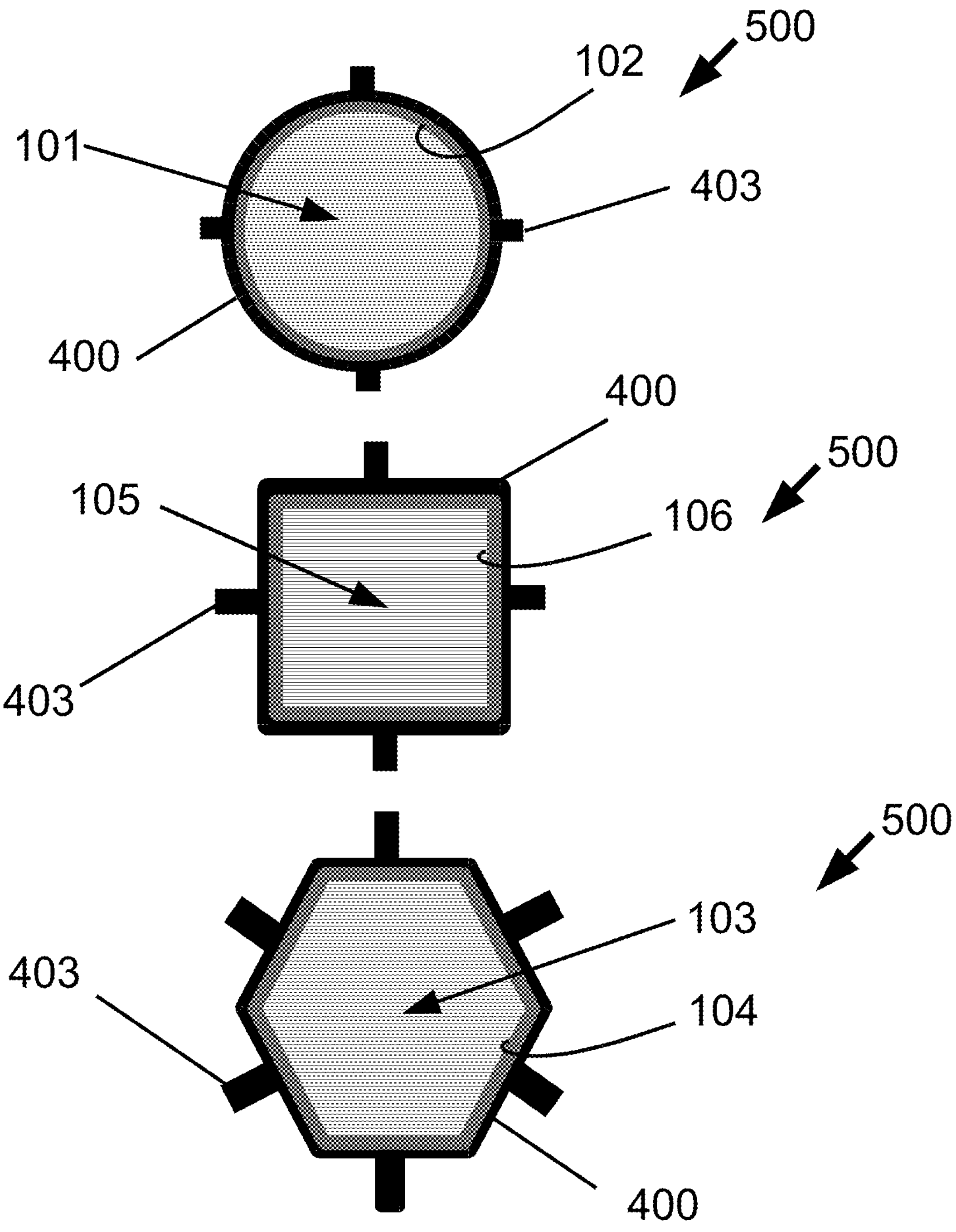
FIG. 5E may show three different transverse width/diameter cross-sectional views through three different SLRs of various combined-assembly-of-SNF-with-SLR-and-with-stop-collar(s) units per various different types of SNF assemblies (or portions thereof).

FIG. 5E may show three different transverse width/diameter cross-sectional views through three different SLRs 400 of various combined-assembly-of-SNF-with-SLR-and-with-stop-collar(s) 500 units per various different types of SNF assemblies 501 (e.g., 501*a*, 501*b*, and 501*c*) (or portions thereof). In some embodiments, these different (shaped) SLR 400 units may have differing cross-sectional shapes and dimensions and overall different linear (longitudinal) sizes. For example, typical SLR 400 units shown may be: circular in cross-section in the case of the Canadian SNF 101 systems; rectangular in cross-section in the case of the U.S. SNF 105 systems; and/or hexagonal in cross-section in the case of the Russian SNF 103 systems.

Figure 6:
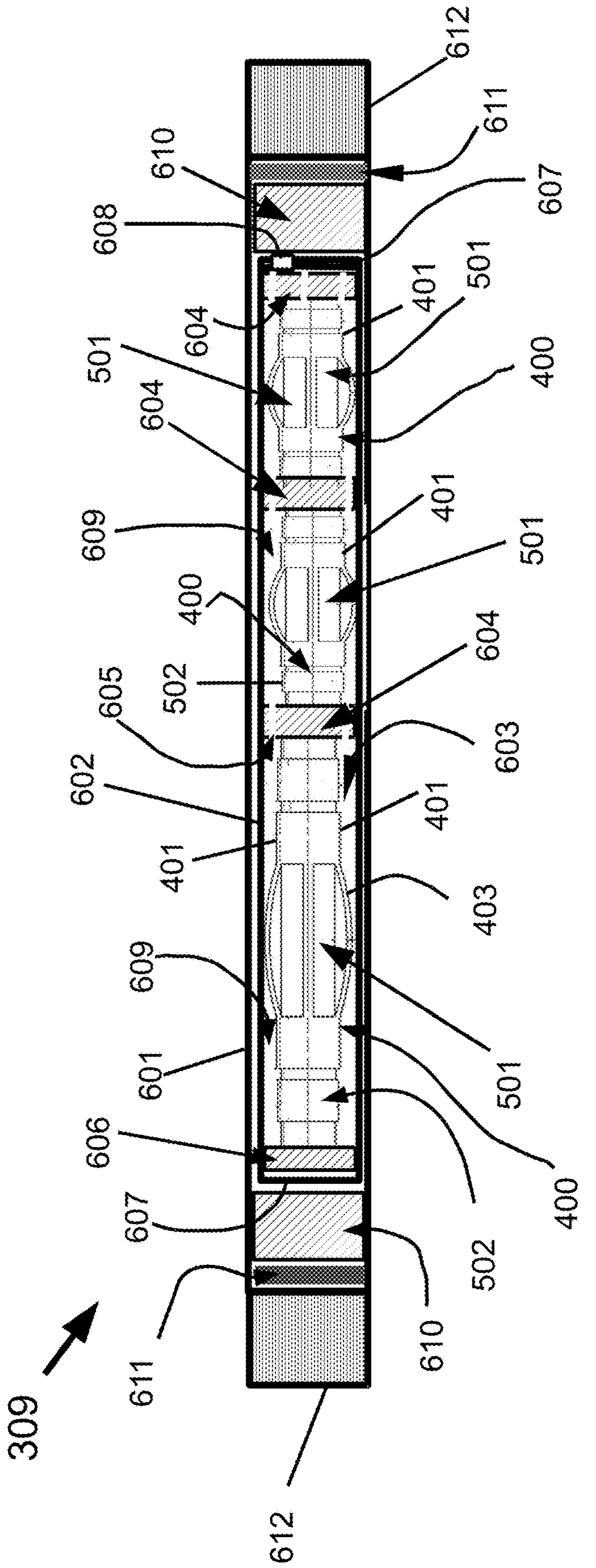
FIG. 6 is a lengthwise cut-away side view (or a lengthwise cross-sectional view) of a fully loaded waste-capsule system (e.g., loaded with three combined-assembly-of-SNF-with-SLR-and-with-stop-collar(s) units).

FIG. 6 is a lengthwise cut-away side view (or a lengthwise cross-sectional view) of a fully loaded waste-capsule 309 system (e.g., loaded with three combined-assembly-of-SNF-with-SLR-and-with-stop-collar(s) 500). Note, FIG. 10 may be a close up (detailed) view of a left portion of FIG. 6. So, at least some of the FIG. 6 discussion may be applicable to FIG. 10. Continuing discussing FIG. 6, in some embodiments, a single waste-capsule 309 may contain one or more different SNF 501 assemblies (or portions thereof). In some embodiments, the one or more different SNF 501 assemblies (or portions thereof) contained within the single waste-capsule 309 may be of the same type and/or of different types (e.g., 501*a*, 501*b*, and/or 501*c*). In some embodiments, each of the one or more different SNF 501 assemblies (or portions thereof) contained within the single waste-capsule 309 may be loaded lengthwise, end-to-end, within that single waste-capsule 309 (and in some embodiments, with separators 604/606 in between the different SNF 501 assemblies (or portions thereof)). In some embodiments, each such SNF assembly 501 (or portion thereof) within the single waste-capsule 309 may have at least one SLR 400 attached to that SNF assembly 501 (or portion thereof). In some embodiments, each such SNF assembly 501 (or portion thereof) within the single waste-capsule 309 may have at least two stop-collars 502 attached to that SNF assembly 501 (or portion thereof).

Continuing discussing FIG. 6, in some embodiments, a single waste-capsule 309 may contain one or more different combined-assembly-of-SNF-with-SLR-and-with-stop-collar(s) 500. In some embodiments, the one or more different combined-assembly-of-SNF-with-SLR-and-with-stop-collar(s) 500 contained within the single waste-capsule 309 may be of the same type and/or of different types (e.g., 501*a*, 501*b*, and/or 501*c*). In some embodiments, each of the one or more different combined-assembly-of-SNF-with-SLR-and-with-stop-collar(s) 500 contained within the single waste-capsule 309 may be loaded lengthwise, end-to-end, within that single waste-capsule 309 (and in some embodiments, with separators 604/606 in between the different combined-assembly-of-SNF-with-SLR-and-with-stop-collar(s) 500).

Continuing discussing FIG. 6 (and/or FIG. 10), in some embodiments, for orientation purposes, a given waste-capsule 309 may initially be considered to have an "open end" (or loading end) and an oppositely disposed "closed end." In some embodiments, the closed end may be closed/sealed. In some embodiments, the open end (loading end) may be initially open for HLW/SNF loading operations. In some embodiments, the closed end may be disposed oppositely away from the open end (loading end), into which the HLW/SNF material may be loaded. For example, in FIG. 6 and in FIG. 10, the left side of the given figure may be the closed end. In some embodiments, the closed end may have an inner tube 602 with a first in time cap 607 attached to one axial terminal end of that inner tube 602 as compared to the other axial terminal end of that inner tube 602. In some embodiments, the closed end may be the end into which the HLW/SNF materials are pushed, inserted, and/or loaded into internal cavity/volume 603 of inner tube 602.

Continuing discussing FIG. 6, in some embodiments, endplate 611, support-pad 610, and cap 607 shown on the left side of FIG. 6 may be referred to/designated as first (initial) endplate 611, first (initial) support-pad 610, and first (initial) cap 607; whereas, endplate 611, support-pad 610, and cap 607 shown on the opposing right side of FIG. 6 may be referred to/designated as second (final) endplate 611, second (final) support-pad 610, and second (final) cap 607. In some embodiments, first (initial) endplate 611, first (initial) support-pad 610, and first (initial) cap 607 may be associated with the closed end. In some embodiments, second (final) endplate 611, second (final) support-pad 610, and second (final) cap 607 may be associated with the open end (loading end); however, note that the open end (loading end) will become closed as well once loading of that inner tube 602 may be complete.

Continuing discussing FIG. 6, in some embodiments, as an example, there may be three separate SNF assemblies 501 (or portions thereof) of different lengths and sizes installed (loaded) inside of the passivated copper inner tube 602. In some embodiments, on a (first) closed terminal end of inner tube 602, inside of cap 607 may be solid separator 606, which may separate the left most SNF assembly 501 (or portion thereof) from that closed end wall cap 607 of the copper inner tube 602. In some embodiments, a similar solid, but perforated, separator 604 may be installed on the opposite end of the copper inner tube 602. In some embodiments, this perforated separator 604 may allow protective/preventative medium 609 to move freely within internal cavity/volume 603 of the copper inner tube 602. In some embodiments, inside of inner tube 602, between each adjacent pair of combined-assembly-of-SNF-with-SLR-and-with-stop-collar(s) 500, may be implemented a perforated separator 604. In this FIG. 6, two such perforated separators 604 between two different combined-assembly-of-SNF-with-SLR-and-with-stop-collar(s) 500 may be illustrated. In some embodiments, separator 604 may have fluid communication holes (ports) 605 (also shown in FIG. 10) which may allow injected protective/preventative medium 609 into and/or through internal cavity/volume 603 of copper inner tube 602 to be dispersed in and be communicated axially (laterally) to fill the irregular annular internal cavity/volume 603 inside the copper inner tube 602 around the combined-assembly-of-SNF-with-SLR-and-with-stop-collar(s) 500 and inside of the copper inner tube 602 walls. In some embodiments, this protective/preventative medium 609 may completely cover the combined-assembly-of-SNF-with-SLR-and-with-stop-collar(s) 500 externally and may provide a long-term last line of corrosive protection for the HLW after the external systems of steel outer shell 601 and copper inner tube 602 may have been corroded or sequentially deteriorated over geologic time.

Continuing discussing FIG. 6, in some embodiments, a single unloaded waste-capsule 309 may comprise one or more of: outer shell 601, inner tube 602, internal cavity/volume 603, separator 604, perforation/hole 605, separator 606, cap 607, port 608, protective/preventative medium 609, support-pad 610, endplate 611, coupling 612, combinations thereof, portions thereof, and/or the like.

Continuing discussing FIG. 6, in some embodiments, a single loaded waste-capsule 309 may comprise one or more of: outer shell 601, inner tube 602, internal cavity/volume 603, at least one SNF assembly 501 (or portion thereof), at least one SLR 400, at least one stop-collar 502, set screw 405, separator 604, perforation/hole 605, separator 606, cap 607, port 608, protective/preventative medium 609, support-pad 610, endplate 611, coupling 612, combinations thereof, portions thereof, and/or the like.

Continuing discussing FIG. 6, in some embodiments, a single loaded waste-capsule 309 may comprise one or more of: outer shell 601, inner tube 602, internal cavity/volume 603, at least one combined-assembly-of-SNF-with-SLR-and-with-stop-collar(s) 500, separator 604, perforation/hole 605, separator 606, cap 607, port 608, protective/preventative medium 609, support-pad 610, endplate 611, coupling 612, combinations thereof, portions thereof, and/or the like.

Continuing discussing FIG. 6, in some embodiments, with respect to a single loaded waste-capsule 309, and with further respect to a SNF assembly 501 (or portion thereof) loaded inside that waste-capsule 309 and moving in a radial direction from that SNF assembly 501 (or portion thereof) to an exterior environment of the waste-capsule 309, outside of the SNF assembly 501 (or portion thereof), may first be internal cavity/volume 603, then inner tube 602, then outer shell 601, and then the outside exterior environment outside of that waste-capsule 309. And in some embodiments, internal cavity/volume 603 may contain protective/preventative medium 609 that mostly/substantially surrounds the SNF assembly 501 (or portion thereof) within internal cavity/volume 603.

Continuing discussing FIG. 6, in some embodiments, with respect to a single loaded waste-capsule 309, and with further respect to a combined-assembly-of-SNF-with-SLR-and-with-stop-collar(s) 500 loaded inside of that waste-capsule 309 and moving in a radial direction from that combined-assembly-of-SNF-with-SLR-and-with-stop-collar(s) 500 to an exterior environment of the waste-capsule 309, outside of the combined-assembly-of-SNF-with-SLR-and-with-stop-collar(s) 500, may first be internal cavity/volume 603, then inner tube 602, then outer shell 601, and then the outside exterior environment outside of that waste-capsule 309. And in some embodiments, internal cavity/volume 603 may contain protective/preventative medium 609 that mostly/substantially surrounds the combined-assembly-of-SNF-with-SLR-and-with-stop-collar(s) 500 within internal cavity/volume 603.

Continuing discussing FIG. 6, in some embodiments, with respect to an axial direction (lengthwise direction) of a single loaded waste-capsule 309, beginning on the outside exterior environment outside of that waste-capsule 309 and moving axially inwards and then back out (e.g., a right to left direction of FIG. 6), a first coupling 612 is first encountered, then a first endplate 611, then a first support-pad 610, then a cap 607, then a separator 604, then a first combined-assembly-of-SNF-with-SLR-and-with-stop-collar(s) 500, then another (second) separator 604, then a second combined-assembly-of-SNF-with-SLR-and-with-stop-collar(s) 500, then another (third) separator 604, then a third combined-assembly-of-SNF-with-SLR-and-with-stop-collar(s) 500, then a separator 606, then a second cap 607, then a second support-pad 610, then a second endplate 611, and finally a second coupling 612.

Note while FIG. 6 shows three different combined-assembly-of-SNF-with-SLR-and-with-stop-collar(s) 500 loaded within waste-capsule 309, a given loaded waste-capsule 309 may contain fewer or more combined-assembly-of-SNF-with-SLR-and-with-stop-collar(s) 500. In some embodiments, one or more middle located combined-assembly-of-SNF-with-SLR-and-with-stop-collar(s) 500 may be separated from each other by at least one separator 604. In some embodiments, a middle located combined-assembly-of-SNF-with-SLR-and-with-stop-collar(s) 500, may be a combined-assembly-of-SNF-with-SLR-and-with-stop-collar(s) 500 that is not located closest to a cap 607. Note, FIG. 6 only show one such middle located combined-assembly-of-SNF-with-SLR-and-with-stop-collar(s) 500. In some embodiments, combined-assembly-of-SNF-with-SLR-and-with-stop-collar(s) 500 located closest to a cap 607 may be abutted up against a separator 604 or up against a separator 606.

Continuing discussing FIG. 6, in some embodiments, separator 604 may be located in between adjacent combined-assembly-of-SNF-with-SLR-and-with-stop-collar(s) 500 and/or near cap 607 that is associated with open end of inner tube 602 that is closed last. In some embodiments, separator 606 may be located adjacent to cap 607 that is associated with closed end of inner tube 602 that is closed first.

Continuing discussing FIG. 6, in some embodiments, the following may be oppositely disposed lengthwise with respect to a given waste-capsule 309: the pair of couplings 612, the pair of endplates 611, the pair of support-pads 610, the pair of caps 607, and an outermost separator 604 with an outermost separator 606. In some embodiments, the oppositely disposed endplates 611 may be nestled inside of the oppositely disposed couplings 612. In some embodiments, the oppositely disposed support-pads 610 may be nestled inside of the oppositely disposed endplates 611. In some embodiments, the oppositely disposed caps 607 may be nestled inside of the oppositely disposed support-pads 610. In some embodiments, the outermost separator 604 and the outermost separator 606 may be nestled inside of the oppositely disposed caps 607. In some embodiments, the one or more different combined-assembly-of-SNF-with-SLR-and-with-stop-collar(s) 500 may be nested inside of the outermost separator 604 and the outermost separator 606 within inner tube 602 (with separator(s) 604 disposed in between).

Continuing discussing FIG. 6, in some embodiments waste-capsule 309 may comprise at least one outer shell 601. In some embodiments outer shell 601 may be one or more of: a substantially cylindrical hollow member; a substantially hollow elongate member; a rigid member; a structural member; substantially constructed from at least one predetermined metal; substantially constructed of a steel alloy; combinations thereof; portions thereof; and/or the like. In some embodiments, an interior volume of outer shell 601 may be configured to receive inner tube 602. In some embodiments, at least one terminal end of outer shell 601 may be initially open (e.g., to receive inner tube 602). In some embodiments, an initially open terminal end of outer shell 601 may be closed by capping that open terminal end with an endplate 611. In some embodiments, with respect to an exterior overall length of waste-capsule 309, that exterior overall length may be an exterior of outer shell 601. In some embodiments, outer shell 601 may provide structural support and/or protection for all of waste-capsule 309 contents. In some embodiments, this outer shell 601 may also provide an operating volume enclosing the elements and components of waste-capsule 309. It is contemplated in these embodiments that this outer shell 601 may be constructed from available high strength type steel tube or casings of the type normally used in deep wellbore high temperature, high pressure oilfield operations. In that industry, steel tubular goods with 120,000 psi (pounds per square inch) to 150,000 psi, or more, tensile strength may be readily available and provide a supply source which may be inexpensively utilized by the nuclear industry in fabricating these outer shells 601 as taught herein without having to invent or source expensive new durable materials. In some embodiments, outer shell 601 may be ten (10) feet to thirty (30) feet long.

Continuing discussing FIG. 6, in some embodiments waste-capsule 309 may comprise at least one inner tube 602. In some embodiments inner tube 602 may be one or more of: a substantially cylindrical hollow member; a substantially hollow elongate member; a rigid member; substantially constructed from at least one predetermined metal; substantially constructed of copper; substantially constructed of passivated copper; may be passivated; combinations thereof; portions thereof; and/or the like. In some embodiments, inner tube 602 may be ten (10) feet to thirty (30) feet long. In some embodiments, inner tube 602 may be shorter than its outer shell inner tube 602. In some embodiments, an interior volume of inner tube 602 may be internal cavity/volume 603. In some embodiments, at least one terminal end of inner tube 602 may be initially open (e.g., for loading purposes). In some embodiments, an initially open terminal end of inner tube 602 may be closed by capping with cap 607. In some embodiments, at least one terminal end of inner tube 602 may be initially closed, via cap 607. In some embodiments, inner tube 602 may be configured to receive one or more of: the one or more different SNF assemblies 501 (or portions thereof); the one or more different combined-assembly-of-SNF-with-SLR-and-with-stop-collar(s) 500; separators 604; separator 606; protective/preventative medium 609; combinations thereof; portions thereof; and/or the like.

Continuing discussing FIG. 6, in some embodiments, surfaces of inner tube 602 may be treated with a self-assembled monolayer (SAM). In some embodiments, the SAM layer(s) may provide added corrosion and/or deterioration protection to the (passivated) copper metal of inner tube 602. In some embodiments, inner tube 602 may be open on one end and closed at the other end. In some embodiments, the open end of inner tube 602 may be closed after its HLW/SNF contents are fully loaded therein. In some embodiments, the open end may be later closed by a cap 607 secured to the end of inner tube 602.

Prior art published patent application U.S. 2021/0174980 (patent application Ser. No. 16/709,701) teaches a corrosion protection medium outside of a preventative medium; whereas, copper inner tube 602 may be fully passivated internally and externally to prevent corrosion, such that protective/preventative medium 609 may be physical contact with a passivated layer of interior/inside wall surfaces of copper inner tube 602.

Continuing discussing FIG. 6, in some embodiments, inner tube 602 may comprise internal cavity/volume 603. In some embodiments, internal cavity/volume 603 may be the internal volume of inner tube 602. In some embodiments, internal cavity/volume 603 may house the one or more different SNF assemblies 501 (or portion thereof) and most of any remaining void space of internal cavity/volume 603 may be filled with protective/preventative medium 609. In some embodiments, internal cavity/volume 603 may house the one or more different combined-assembly-of-SNF-with-SLR-and-with-stop-collar(s) 500 and most of any remaining void space of internal cavity/volume 603 may be filled with protective/preventative medium 609.

Prior art published patent application of U.S. 2020/0027605 (patent application Ser. No. 16/191,390) discloses a granite capsule with a copper lining. This prior art copper liner is not in any way similar to the copper inner tube 602. The copper inner tube 602 is a combined structural, protective, and operational system. Inner tube 602 differs from the copper liners of prior art systems because copper inner tube 602 is much thicker, copper inner tube 602 may be up to two (2.0) inches wall thickness, plus or minus (+/−) one-half (½) inch. And even though copper is not as strong as steel, copper's compressive strength is adequate, copper's ductility also allows, as used herein, the waste-capsule 309 to contain HLW material without buckling or collapsing. On the other hand, prior art copper liners are thin lamellar-like constructs which are solely capable of providing minimal to no structural support and physical separation, but that may provide some corrosion resistance and separation of waste from the waste capsule walls. Further the copper inner tube 602 is passivated internally and externally and thus provides capsule protective measures as noted herein.

Continuing discussing FIG. 6, in some embodiments, separator 604 may be configured to separate: two different SNF assemblies 501 (or portions thereof) from each other; two different combined-assembly-of-SNF-with-SLR-and-with-stop-collar(s) 500 from each other; a SNF assembly 501 (or portion thereof) from a nearest cap 607; a combined-assembly-of-SNF-with-SLR-and-with-stop-collar(s) 500 from a nearest cap 607; combinations thereof; portions thereof; and/or the like. In some embodiments, separator 604 may be configured for passage of protective/preventative medium 609 through the separator 604. In some embodiments, separator 604 may be substantially disc (disk) shaped.

Continuing discussing FIG. 6, in some embodiments, a given separator 604 may comprise one or more perforation (s)/hole(s) 605. In some embodiments, a given perforation/hole 605 may be configured to permit movement and/or passage of protective/preventative medium 609 through the given perforation/hole 605. In some embodiments, a given perforation/hole 605 may be a through hole, passing entirely through a portion of separator 604.

Continuing discussing FIG. 6, in some embodiments, separator 606 may be configured to separate: two different SNF assemblies 501 (or portions thereof) from each other; two different combined-assembly-of-SNF-with-SLR-and-with-stop-collar(s) 500 from each other; a SNF assembly 501 (or portion thereof) from a nearest cap 607; a combined-assembly-of-SNF-with-SLR-and-with-stop-collar(s) 500 from a nearest cap 607; combinations thereof; portions thereof; and/or the like. In some embodiments, separator 606 may be substantially solid and/or substantially free of through holes/perforations. In some embodiments, separator 606 may not have any through holes/perforations. In some embodiments, separator 606 may not have any perforations/holes 605. In some embodiments, separator 606 may be located closest to cap 607 of inner tube 602 that is associated with the closed end of inner tube 602. In some embodiments, separator 606 may be substantially disc (disk) shaped.

In some embodiments, separators 604/606 may be structural members. In some embodiments, separators 604/606 may be constructed from a metal foam composite (MFC) or some similar structurally competent material. In some embodiments, the MFC may provide some mitigation of radionuclide absorption in addition to structural strength.

Continuing discussing FIG. 6, in some embodiments, cap 607 may be attached to an open terminal end of inner tube 602 to seal off (close off) that terminal end of the inner tube 602. In some embodiments, inner tube 602 may comprise two oppositely disposed caps 607. In some embodiments, the two oppositely disposed caps 607 may be attached to inner tube 602 terminal ends at different times. In some embodiments, before SNF assembly 501 (or portion thereof) loading into inner tube 602, a first terminal end of inner tube 602 may be closed off with a first cap 607; and then that inner tube 602 may be loaded until full or until so desired; and then the remaining open terminal end may be closed off by another/different cap 607. In alternative embodiments, inner tube 602 may be initially formed with a closed end and an open end, in such a scenario, that initial closed end may still be referred to as a cap 607 and the open end may be sealed off by attaching a (different) cap 607 thereto. In some embodiments, cap 607 may be of a same or of a substantially same material(s) of construction as of inner tube 602. In some embodiments, cap 607 may be made of copper, of copper and passivated, and/or of passivated copper. In some embodiments, cap 607 may be attached to an open terminal end of inner tube 602 by one or more of the following attachment means: welding, mechanical fasteners (e.g., bolts, rivets, screws, nails, pins, rods, etc.), threading (threaded connection), friction fit, compression fit, snap fit, adhesive, glue, epoxy, combinations thereof, portions thereof, and/or the like.

Continuing discussing FIG. 6, in some embodiments, cap 607 may comprise at least one port 608. In some embodiments, cap 607 may comprise one or more ports 608. In some embodiments, only one cap 607 (of a given waste-capsule 309) may comprise at least one port 608; while the other cap 607 may not have such a port 608. In some embodiments, the cap 607 without a port 608 may be the cap 607 associated with terminal end of inner tube 602 that was closed first. In some embodiments, port 608 may be a fill port. In some embodiments, port 608 may be an injector port. In some embodiments, port 608 may be in a form of an injector valve. In some embodiments, port 608 may be configured for facilitate passage of protective/preventative medium 609 into internal cavity/volume 603. In some embodiments, port 608 may be implemented in cap 607 of inner tube 602. In some embodiments, port 608 may allow the injection of protective/preventative medium 609 into internal cavity/volume 603 inside of inner tube 602 during the SNF assembly 501 (or portion thereof) loading process of inner tube 602. After injection of protective/preventative medium 609, port 608 may be closed. In some embodiments, port 608 may be closeable and/or sealable after use. In some embodiments, port 608 may be closeable and/or sealable via a plug and/or a cap.

Continuing discussing FIG. 6, in some embodiments, protective/preventative medium 609 may be one or more (flowable) mediums configured to protect waste-capsule 309 and/or its components/parts from deterioration arising from radiation and/or radionucleotide exposure from the SNF/HLW located within inner tube 602. In some embodiments, protective/preventative medium 609 may also be configured to facilitate heat transfer away from SNF/HLW (e.g., 500/501) located within inner tube 602 towards and to inner tube 602. In some embodiments, protective/preventative medium 609 may be one or more of bitumen, tar, and/or similar heavy hydrocarbon systems that have demonstrated longevity in preserving materials from deterioration over geologic time periods. It has been reported by petrophysical and paleontological analysis that tar sands like the Athabasca tar sands in Canada have fully preserved fossil material dating back to the Cretaceous Period, sixty (60) million to 145 million years ago. In some embodiments, this type of protective/preventative medium 609 may provide desired long-term protection for the HLW/SNF materials that may be immersed within protective/preventative medium 609 inside of inner tube 602. In some embodiments, SNF assembly 501 (or portion thereof) that are immersed in protective/preventative medium 609 inside of inner tube 602 may essentially become an artificial fossil within repository geological formation 306.

Continuing discussing FIG. 6, in some embodiments, oppositely disposed on both ends of inner tube 602 (that is caped with caps 607) may be a support-pad 610. In some embodiments, outside of each cap 607, in the axial direction, may be a support-pad 610. In some embodiments, interiorly disposed to endplate 611 may be a support-pad 610 which may be disposed between endplate 611 and the terminal end or base (cap 607) of inner tube 602. In some embodiments, support-pads 610 may be located within outer shell 601. In some embodiments, support-pad 610 may be substantially constructed of a predetermined metallic foam material or some similar type of structural material which provides axial support and may also provide, a level of emission protection from the SNF assembly 501 (or portion thereof) emitted radiation. In some embodiments, a given support-pad 610 may be configured to provide some cushioning (shock absorption) to the given waste-capsule 309 from exterior forces moving in the axial direction. In some embodiments, a given support-pad 610 may be substantially constructed from one or more elastic materials of construction, including but not limited to, of a predetermined metallic foam material.

Continuing discussing FIG. 6, in some embodiments, outside of each support-pad 610, in the axial direction, may be an endplate 611. In some embodiments, endplate 611 providing internal, circumferential, and/or lateral support to outer shell 601, may be implemented at each terminal end of outer shell 601. In some embodiments, a given endplate 611 may be substantially disc (disk) shaped. In some embodiments, a given endplate 611 may be substantially solid and without any void spaces. In some embodiments, endplate 611 may be made substantially of a predetermined metal, such as, but not limited to, a steel alloy. In some embodiments, endplate 611 may be manufactured from one or more predetermined steel alloys. In some embodiments, endplate 611 may be manufactured from the same material(s) as outer shell 601. In some embodiments, each terminal end of outer shell 601 may be a sealed (closed off) with an attached endplate 611. In some embodiments, a given endplate 611 may be configured to be attached to an open terminal end of outer shell 601. In some embodiments, outer shell 601 may comprise two oppositely disposed endplates 611. In some embodiments, the two oppositely disposed endplates 611 may be attached to outer shell 601 terminal ends at different times. In some embodiments, endplate 611 may be of a same or of a substantially same material(s) of construction as of outer shell 601. In some embodiments, endplate 611 may be made of a predetermined metal, such as, but not limited to, a steel alloy. In some embodiments, endplates 611 may be mechanically held in place inside and/or attached to their respective outer shell 601 axial terminal ends by welding and/or other mechanical means. In some embodiments, endplate 611 may be attached to an open terminal end of outer shell 601 by one or more of the following attachment means: welding, mechanical fasteners (e.g., bolts, rivets, screws, nails, pins, rods, etc.), threading (threaded connection), friction fit, compression fit, snap fit, adhesive, glue, epoxy, combinations thereof, portions thereof, and/or the like. In some embodiments, endplate 611 may have a diameter equal to the internal diameter of outer shell 601 and this endplate 611 may be welded to the inner side of outer shell 601.

Continuing discussing FIG. 6, in some embodiments, disposed on an outside of endplate 611 may be a coupling 612. In some embodiments, outer shell 601 may have a first coupling 612 on/at one terminal end and a second similar coupling 612 on the other oppositely disposed terminal end. In some embodiments, these couplings 612 may be threaded fittings connected on the outside terminal ends of the outer shell 601. In some embodiments, coupling 612 may be attached to a terminal end of outer shell 601 (or attached to endplate 611) by one or more of the following attachment means: welding, mechanical fasteners (e.g., bolts, rivets, screws, nails, pins, rods, etc.), threading (threaded connection), friction fit, compression fit, snap fit, adhesive, glue, epoxy, combinations thereof, portions thereof, and/or the like. In some embodiments, coupling 612 may be made substantially of a predetermined metal, such as, but not limited to, a steel alloy.

In some embodiments, waste-capsule 309 coupling(s) 612 may be flush joints for the coupling(s) 612 with high-performance premium threads. In some embodiments, flush joints of coupling(s) 612 with steel outer shell 601, may be mean that externally the given loaded waste-capsule 309 may be mostly (substantially) smooth, including where coupling(s) 612 are attached to steel outer shell 601. In some embodiments, this type of flush coupling 612 (with high-performance premium threading) may allow for easier wellbore insertion, especially into the horizontal or lateral sections of the wellbore(s) 307/308. In some embodiments, this type of flush coupling 612 (with high-performance premium threading) may also be designed to offer improved tensile capacity, ease of makeup, and/or superior hydraulic sealing (no leaks). In some embodiments, this quality of coupling 612 may provide a higher degree of safety when working with HLW product disposal.

In some embodiments, a coupling 612 of one waste-capsule 309 may be configured to be attached to a coupling 612 of another (different) waste-capsule 309, such that these now attached two different waste-capsules 309 are attached end to end via their respective adjacent couplings 612. In such a manner, a string (plurality) of such attached waste-capsules 309 may be formed/implemented. In some embodiments, (threaded) coupling 612, may be installed on each opposing axially terminal end of the given loaded waste-capsule 309. In some embodiments, (threaded) coupling 612, may allow multiple waste-capsules 309 to be coupled (joined) into a "waste-capsule string" to allow for more rapid insertion of many (e.g., hundreds) of loaded waste-capsules 309 into the wellbore(s) 305, 307, and/or 308 and into repository geological formation 306 of the system 300 shown in FIG. 3. In some embodiments, a given string of loaded waste-capsules 309 may comprise up to fifty (50) individually coupled loaded waste-capsules 309 (by use of couplings 612). In some embodiments, a nature of attachment between two different and adjacent couplings 612 may be intended as a permanent attachment. In some embodiments, a nature of attachment between two different and adjacent couplings 612 may be intended as a removable attachment. In some embodiments, a given coupling 612 may be configured to be attached to predetermined downhole tool(s) operated by drill rig system 304. In some embodiments, a given coupling 612 may be configured to be removably attached to predetermined downhole tool(s) operated by drill rig system 304.

In some embodiments, the lengths of: the single waste-capsule 309; the one or more different SNF 501 assemblies (or portions thereof) contained within the single waste-capsule 309; the SLR 400 units contained within the single waste-capsule 309; the outer shell 601; and the inner tube 602 may all be substantially parallel with each other.

Figure 7:
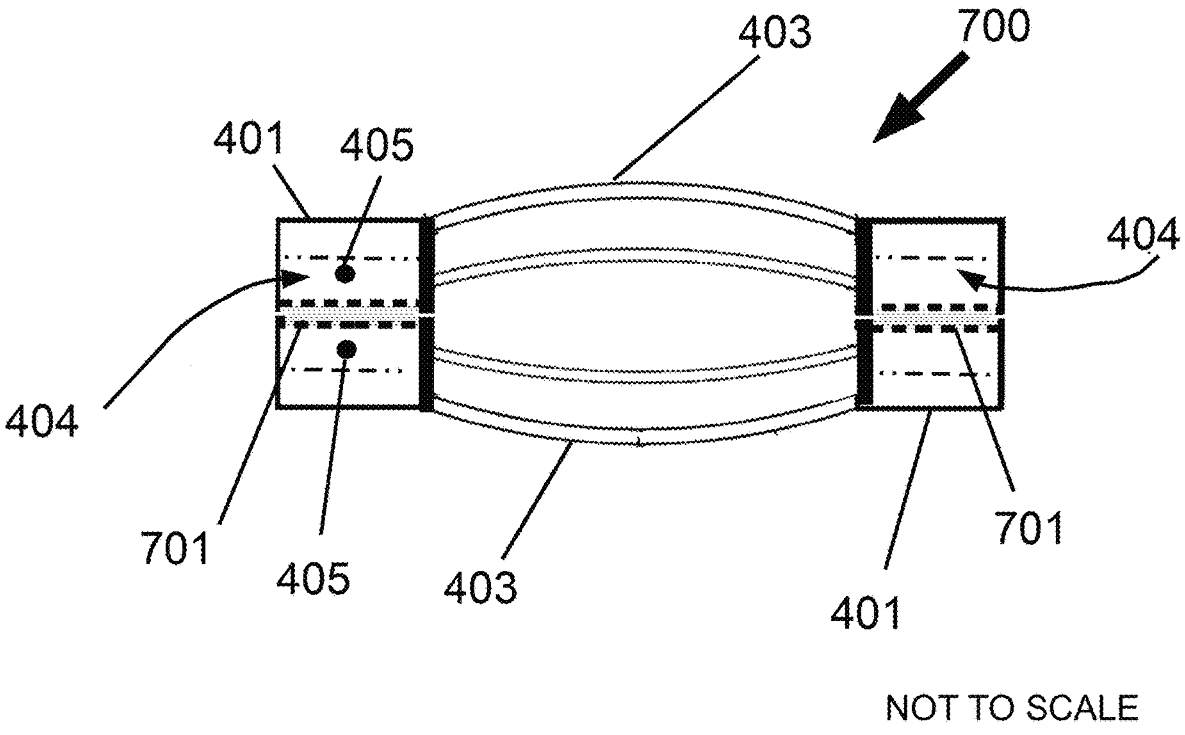
FIG. 7 is a lengthwise side schematic view of a hinged SLR for use in various embodiments described herein.

FIG. 7 is a lengthwise side schematic view of a SLR 700 for use in various embodiments described herein. FIG. 7 may be substantially similar FIG. 4; except SLR 700 may have collar(s) 401 with hinge(s) 701. In some embodiments, SLR 700 may be substantially similar to SLR 400, except in SLR 700 its collar(s) 401 may have hinge(s) 701. In some embodiments, SLR 700 may comprise at least one spring bow 402, and two oppositely disposed collars 401 attached to both opposite ends of spring bow 402. In some embodiments, collar 401 of SLR 700 may comprise at least one hinge 701. In some embodiments, hinge 701 may be configured to open and/or close collar 401 in a radial direction. In some embodiments, hinge 701 may open and close in a direction perpendicular to an axial direction of SLR 700. In some embodiments, hinges 701 may permit attaching a given SNF assembly 501 (or portion thereof) to a given SLR 700. In some embodiments, SLR 400 may be replaced with SLR 700.

Note, any place SLR 400 may be referenced herein, may be replaced with SLR 700.

Figure 8:
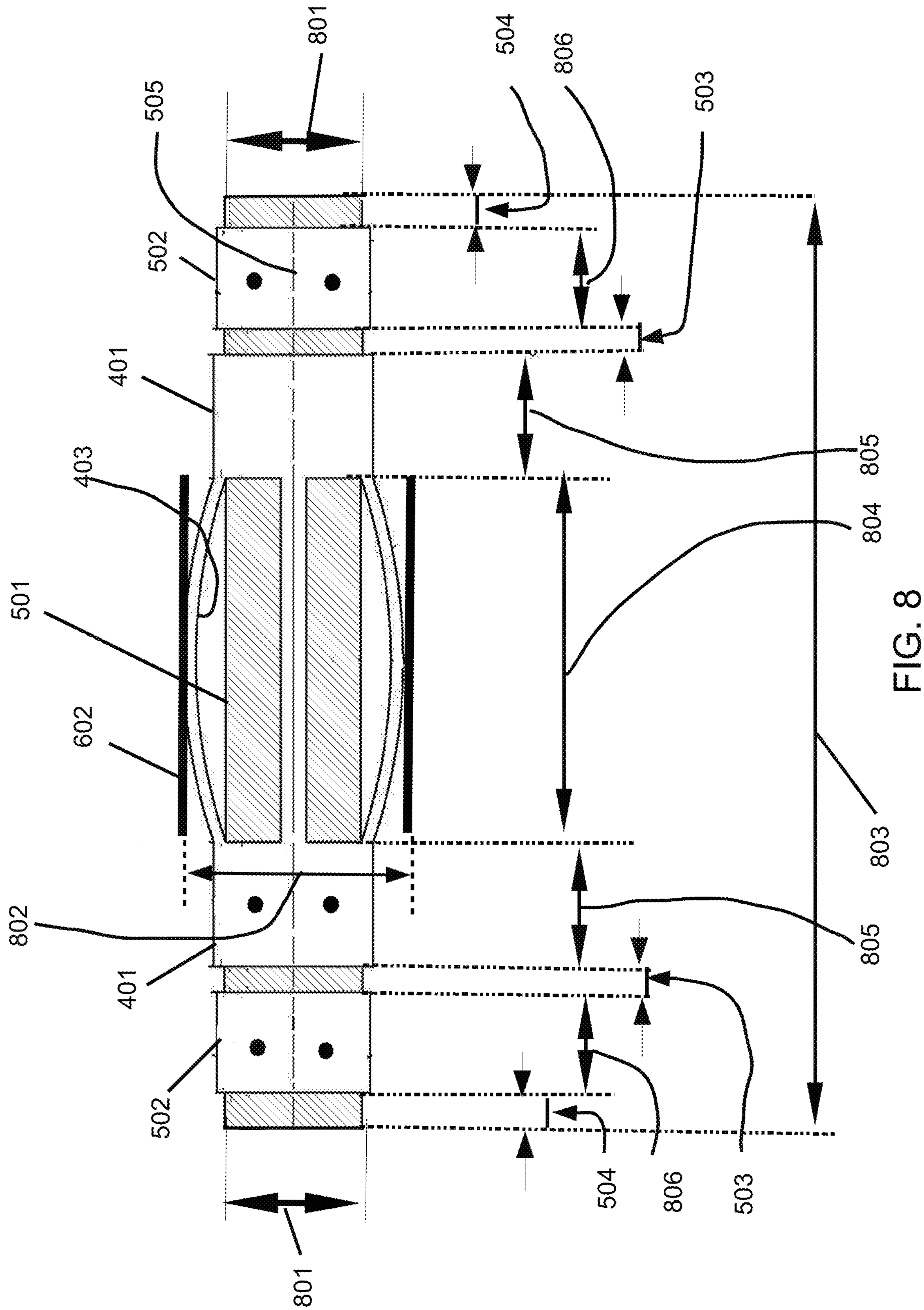
FIG. 8 is a lengthwise side schematic view of a combined-assembly-of-SNF-with-SLR-and-with-stop-collar(s) unit and showing various dimensions and/or dimensional relationships of that combined-assembly-of-SNF-with-SLR-and-with-stop-collar(s) unit.

FIG. 8 is a lengthwise side schematic view of SLR 400 attached to SNF assembly 501 (or portion thereof). FIG. 8 is a lengthwise side schematic view of a combined assembly of SNF with SLR and with stop-collar(s), wherein this overall combined assembly is assigned reference numeral 500. FIG.

8 may be a same or a substantially same view as FIG. 5A, except in FIG. 8 various dimensions and dimensional relationships may be depicted. For example, and without limiting the scope of the present invention, FIG. 8 may show: gap 503 (e.g., between collar 401 and an adjacent stop-collar 502); gap 504 (e.g., from SNF 501 end to an adjacent stop-collar 502); inside diameter 801 (of collar 401, stop-collar 502, and/or of bore 404); diameter 802 (e.g., outside diameter of bow spring 402); overall-length 803 (of SLR w/SNF 500 and/or of SNF 501); length 804 (of bow spring 402); length 805 (of collar 401); length 806 (of stop-collar 502); and/or the like. Gap 503 and gap 504 are discussed above in the FIG. 5A discussion sections.

Note, with respect to the spatial dimensions and/or dimensional relationships depicted in FIG. 8, it should be noted that these spatial dimensions and/or dimensional relationships are generally symmetric across the vertical centerline (with respect to a radial direction) of the elements shown in FIG. 8.

Continuing discussing FIG. 8, in some embodiments, inside diameter 801 may be an inside diameter of collar 401, stop-collar 502, and/or of bore 404. In some embodiments, an outside diameter of SNF assembly 501 (or a portion thereof) may be smaller than inside diameter 801. In some embodiments, inside diameter 801 may be sized to receive the outside diameter of SNF assembly 501 (or a portion thereof). In some embodiments, inside diameter 801 may be sized such that the outside diameter of SNF assembly 501 (or a portion thereof) may freely slide back and forth axially within inside diameter 801.

Note, in some embodiments, inside diameter 801 may be an inside transverse width 801 of collar 401, stop-collar 502, and/or of bore 404; for example, when a transverse cross-section through SNF assembly 501 (or a portion thereof) may be non-circular (e.g., with rectangular SNF assembly 501*b* (or a portion thereof) and/or hexagonal SNF assembly 501*c*).

Continuing discussing FIG. 8, in some embodiments, diameter 802 may be an outside outermost diameter of the elongate linear spring element members 403 of a given spring bow 402. In some embodiments, diameter 802 may be sized to frictionally fit and/or interference fit against an inside diameter of inner tube 602. In some embodiments, diameter 802 may slide back and forth axially along a length of the inside diameter of inner tube 602, but with some friction. In some embodiments, inside diameter 801 may be smaller than diameter 802. In some embodiments, diameter 802 may be larger than inside diameter 801.

Continuing discussing FIG. 8, in some embodiments, SLR 400 units (specifically, the elongate linear spring element members 403 of a given spring bow 402) may have variable (changeable) diameters 802 (and/or variable transverse widths 802) because as the elongate linear spring element members 403 are compressed that diameter 802 (transverse width 802) may increase; or as the elongate linear spring element members 403 are put under tension that diameter 802 (transverse width 802) may decrease.

Note, in some embodiments, diameter 802 may be an outside outermost transverse width 802 of the elongate linear spring element members 403 of a given spring bow 402; for example, when a transverse cross-section through SNF assembly 501 (or a portion thereof) may be non-circular (e.g., with rectangular SNF assembly 501*b* (or a portion thereof) and/or hexagonal SNF assembly 501*c*).

Continuing discussing FIG. 8, in some embodiments, overall-length 803 may be a total and/or an overall length of a given SNF assembly 501 (or portion thereof). In some embodiments, overall-length 803 may be a total and/or an overall length of a given combined-assembly-of-SNF-with-SLR-and-with-stop-collar(s) 500 (or portion thereof). In some embodiments, overall-length 803 may be parallel with the axial direction of a given SNF assembly 501 (or portion thereof). In some embodiments, overall-length 803 may be parallel with the axial direction of a given combined-assembly-of-SNF-with-SLR-and-with-stop-collar(s) 500 (or portion thereof). In some embodiments, overall-length 803 may run from one terminal end to an opposing terminal end of a given SNF assembly 501 (or portion thereof). In some embodiments, overall-length 803 may run from one terminal end to an opposing terminal end of a given combined-assembly-of-SNF-with-SLR-and-with-stop-collar(s) 500 (or portion thereof).

Continuing discussing FIG. 8, in some embodiments, length 804 may be an overall/total length of a given bow spring 402. In some embodiments, length 804 may be parallel with the axial direction of a given bow spring 402. In some embodiments, length 804 may run from one terminal end to an opposing terminal end of a given bow spring 402. In some embodiments, length 804 may be less than (shorter than) overall-length 803. In some embodiments, overall-length 803 may be greater than (longer than) length 804. In some embodiments, length 804 may be fixed, non-variable, and predetermined (aside from shrinkage/expansion properties of the materials of construction for bow spring 402). In some embodiments, length 804 may be variable because one of the two collars 401 of that spring bow 402 may be without hold-down means (e.g., without set screws 405). In some embodiments, length 804 may be from four (4) inches to twenty (20) inches, plus or minus (+/−) one (1) inch.

Continuing discussing FIG. 8, in some embodiments, length 805 may be an overall/total length of a given collar 401. In some embodiments, length 805 may be parallel with the axial direction of a given collar 401. In some embodiments, length 805 may run from one terminal end to an opposing terminal end of a given collar 401. In some embodiments, length 805 may be less than (shorter than) length 804. In some embodiments, length 804 may be greater than (longer than) length 805. In some embodiments, length 805 may be fixed, non-variable, and predetermined (aside from shrinkage/expansion properties of the materials of construction for collar 401). In some embodiments, length 805 may be from two (2) inches to four (4) inches, plus or minus (+/−) one half (½) inch.

Continuing discussing FIG. 8, in some embodiments, length 806 may be an overall/total length of a given stop-collar 502. In some embodiments, length 806 may be parallel with the axial direction of a given stop-collar 502. In some embodiments, length 806 may run from one terminal end to an opposing terminal end of a given stop-collar 502. In some embodiments, length 806 may be less than (shorter than) length 805. In some embodiments, length 805 may be greater than (longer than) length 806. In some embodiments, length 805 and length 806 may be about the same. In some embodiments, length 806 may be fixed, non-variable, and predetermined (aside from shrinkage/expansion properties of the materials of construction for stop-collar 502). In some embodiments, length 806 may be about two (2) inches to about four (4) inches, plus or minus (+/−) one half (½) inch.

In some embodiments, with respect to a given at least partially loaded single waste-capsule 309, the length of the single waste-capsule 309; the length of outer shell 601; the length of inner tube 602; overall-length 803; length 804;

length 805; length 806; the length of gap 503; the length of gap 504; the length (height) of separator 604; the length of perforation/hole 605; the length (height) of separator 606; the length (height) of cap 607; the length (height) of support-pad 610; and the length (height) of endplate 611 may all be substantially parallel with each other in a shared common axial direction. See e.g., FIG. 5A, FIG. 6, and FIG. 8.

Currently, there are three major/main SNF assembly 501 categories/types worldwide. Canada utilizes the CANDU 101/501*a* system. The CANDU assembly 101/501*a* is circular in cross-section, about nineteen and one half (19.5) inches long, with a diameter of four (4.0) inches and weighs about twenty (20) kilograms (kg) (or about forty-four (44) pounds [lbs]). See e.g., FIG. 1A. The U.S. has two types of SNF assemblies 501. There are the pressurized water reactor (PWR) fuel assemblies 105/501*b* that are square sided with widths of about eight and one half (8.5) inches and a length of about 160 inches and weighing about 666 kg (or about 1,500 lbs). Also in the U.S., there are the boiling water reactor (BWR) fuel assemblies 105/501*b* that are square sided with widths of about five and one half (5.5) inches and a length of about 176 inches and weighing about 297 kg (or about 650 lbs). See e.g., FIG. 1C. Russian assemblies 103/501*c* are hexagonal in cross-section and vary in size from five point seven (5.7) inches to nine point three (9.3) inches in cross-sectional width, have a length of about 127 inches to about 180 inches, and weighing from about 119 kg (or about 260 lbs) to about 430 kg (or about 950 lbs). See e.g., FIG. 1B. Based on sizes and weights, Canadian SNF assembly 101/501*a* may use at least one SLR 400; the U.S. SNF assembly 105/501*b* may use up to four (4) individual/different SLR 400 units per assembly 500. The Russian SNF assembly 103/501*c* may use up to four (4) individual/different SLR 400 units per assembly 500.

Figure 9:
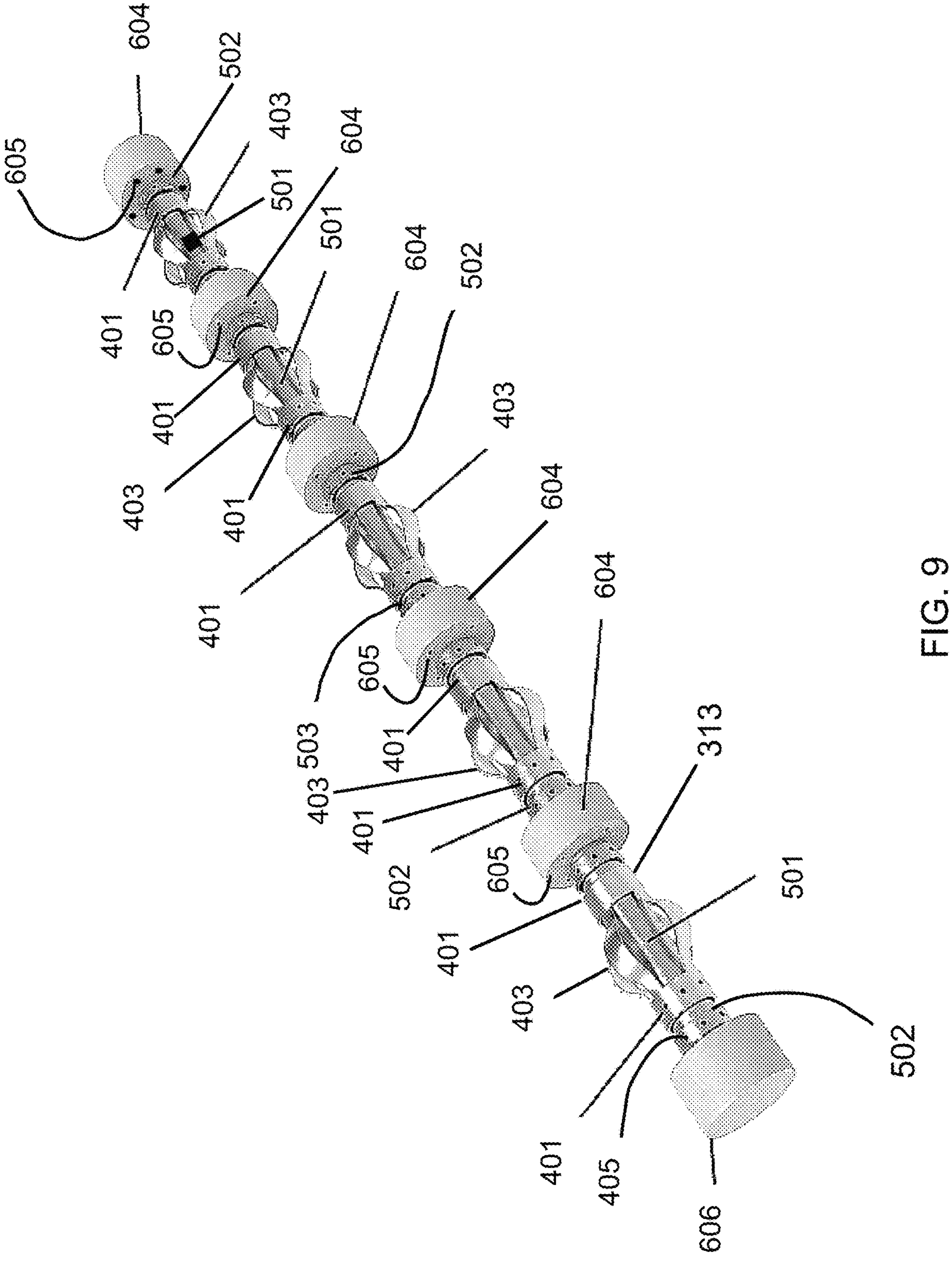
FIG. 9 may illustrate an isometric/perspective view of at least a portion of a waste-capsule system in which multiple (e.g., five) SNF assemblies (or portions thereof) may be positioned and configured, prior to loading into an inner tube. Note, the inner tube (and the outer shell) are omitted in FIG. 9.

FIG. 9 may illustrate an isometric/perspective view of at least a portion of a waste-capsule 309 system in which multiple (e.g., five) SNF assemblies 501 (or portions thereof) may be positioned and configured, prior to loading into an inner tube 602. While five SNF assemblies 501 (or portions thereof) are shown in FIG. 9, in other embodiments fewer or more SNF assemblies 501 (or portions thereof) could be implemented as a single stack for installment within a single waste-capsule 309. In this specific FIG. 9 example, the SNF assemblies 501 (or portions thereof) shown are circular in cross-section, such as, but not limited to, circular SNF assembly 501*a* (or portion thereof). Note, the single stack of multiple SNF assemblies 501 (or portions thereof) (e.g., as depicted in FIG. 9) for installment into a single waste-capsule 309, may be of identical types, different types, other types, and/or mixed types of SNF assemblies 501 (or portions thereof) (e.g., 501*a*, 501*b*, 501*c*, portions thereof, combinations thereof, and/or the like). Note, for clarity, inner tube 602 and outer shell 601 are not shown in FIG. 9. In some embodiments, the five SNF assemblies 501 (or portions thereof) are shown in a linear stack (arranged end to end) as may be later positioned (loaded) inside of inner tube 602. In some embodiments, circumferentially disposed on each such SNF assembly 501 (or portion thereof) may be at least one SLR 400 and two opposing stop-collars 502, e.g., as shown and discussed for FIG. 5A, FIG. 5B, FIG. 5C, and/or FIG. 5D.

Continuing discussing FIG. 9, in some embodiments, the stack of SNF assemblies 501 (or portions thereof) may comprise at least one separator 606 and one or more separators 604. In some embodiments, separating an outer most SNF assembly 501 (or portion thereof), of the stack, in the axial direction, and a cap 607 may be at least on separator 604/606. In some embodiments, separating a first outer most SNF assembly 501 (or portion thereof), of the stack, in the axial direction, and a first (installed) cap 607 may be at least one separator 606 (e.g., the left most separator in FIG. 9); and separating the other (oppositely disposed) outer most SNF assembly 501 (or portion thereof), of the stack, in the axial direction, and a second (last installed) cap 607 of the stack may be at least one separator 604 (e.g., the right most separator in FIG. 9). In some embodiments, with respect to the single stack of multiple SNF assemblies 501 (or portions thereof), separating each pair of adjacent SNF assemblies 501 (or portions thereof), may be at least one separator 604 (with at least one perforation/hole 605).

Figure 10:
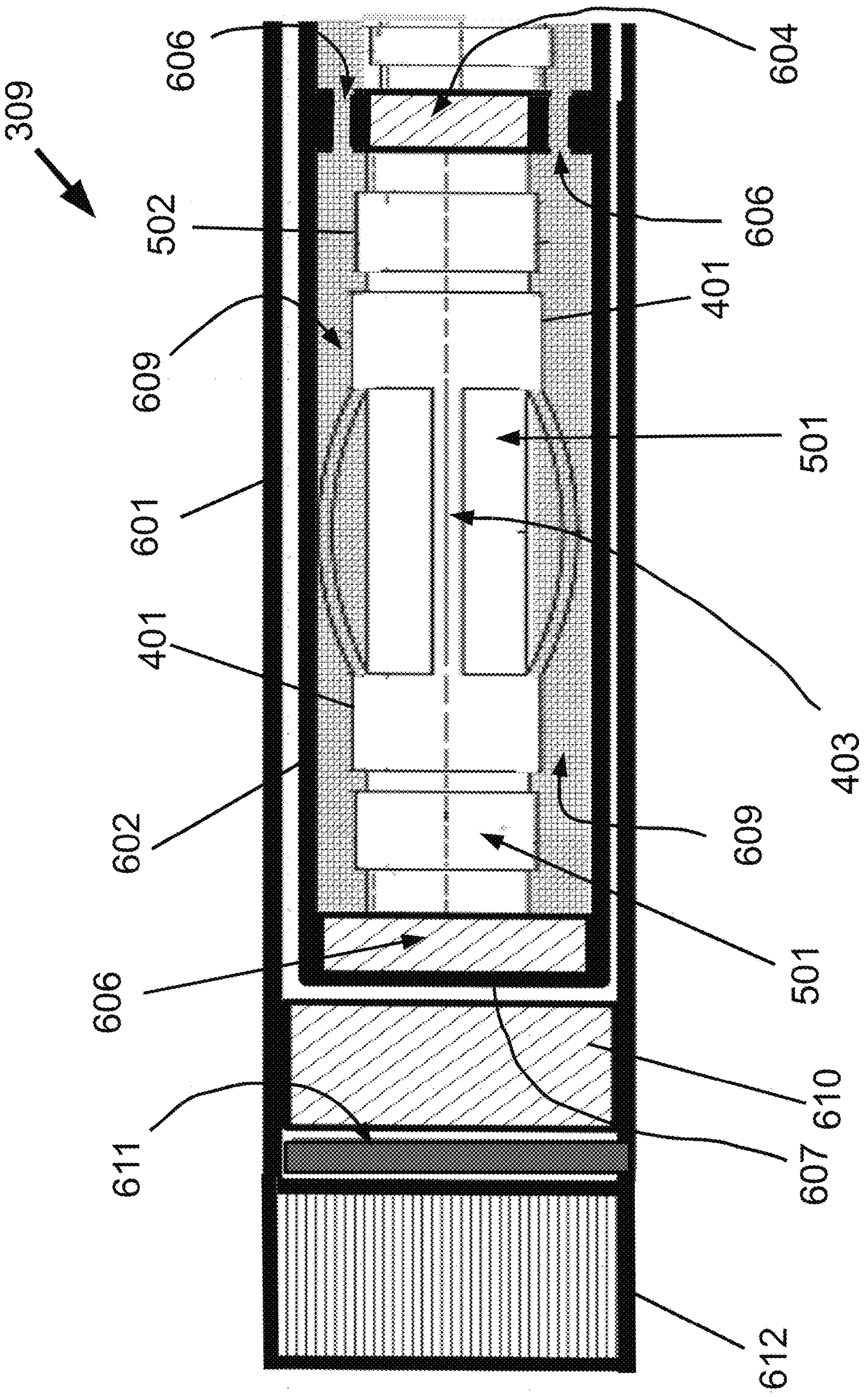
FIG. 10 may be a close up (detailed) view of a left portion (closed end portion) of FIG. 6.

FIG. 10 may be a close up (detailed) view of a left portion (closed end portion) of FIG. 6. FIG. 10 may be a partial lengthwise cut-away side view (or a lengthwise cross-sectional view) of at least a partially loaded waste-capsule 309 system (e.g., loaded with at least two combined-assembly-of-SNF-with-SLR-and-with-stop-collar(s) 500). For example, in FIG. 10 protective/preventative medium 609 may be seen, in internal cavity/volume 603 of inner tube 602, on both sides of separator 604, due to one or more perforations/holes 605 disposed through separator 604. In some embodiments, at least one separator 604, with at least one perforation/hole 605 therein, within inner tube 602, may permit initially flowable protective/preventative medium 609 to fill in and occupy otherwise void spaces of internal cavity/volume 603.

Figure 11:
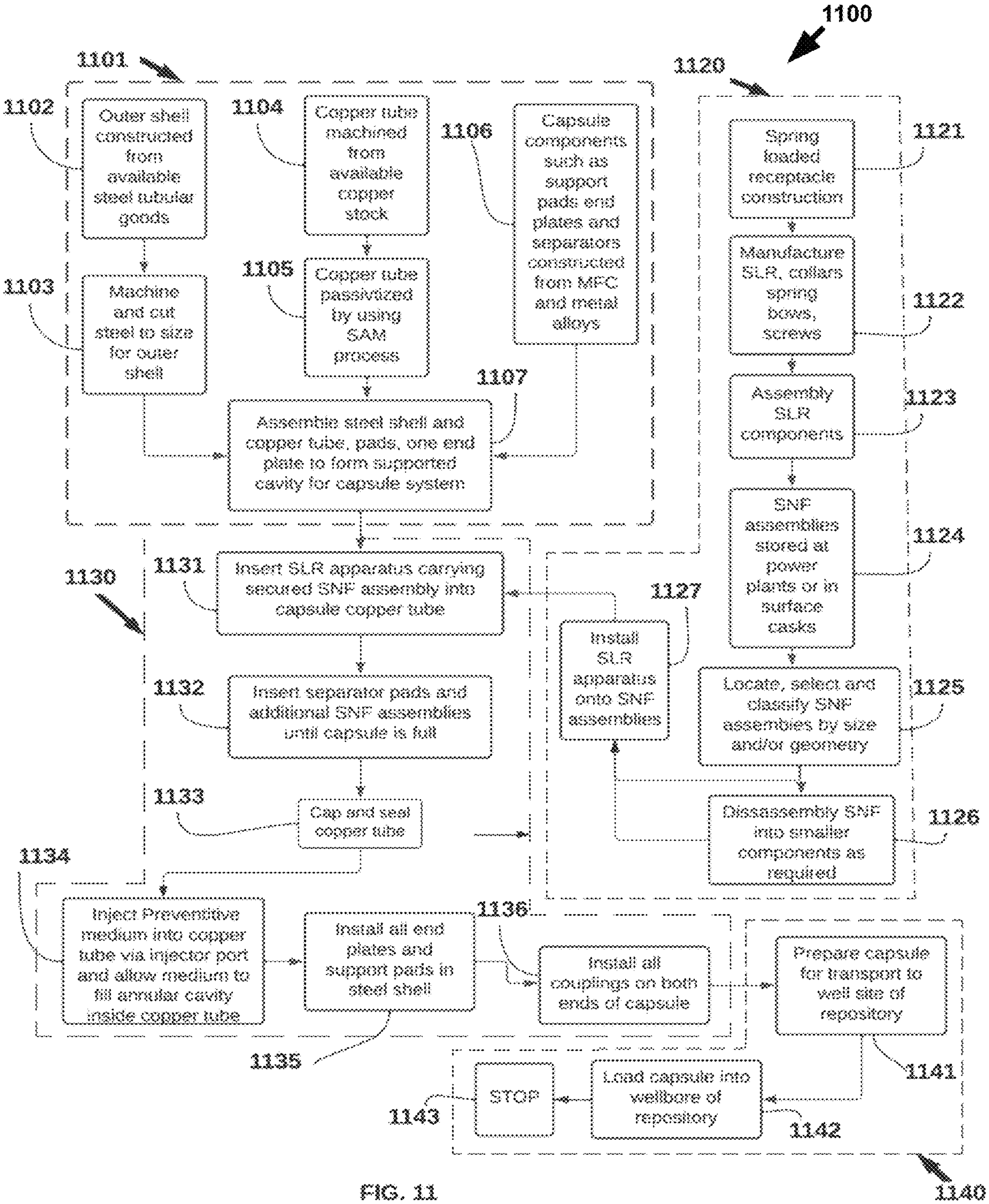
FIG. 11 may depict a flowchart of a method for disposal of loaded waste-capsule(s) inside of wellbores that are located inside of deeply located repository geological formation(s), wherein the waste-capsule(s) are loaded with HLW and/or SNF (e.g., in SNF assembly or portion thereof forma).

FIG. 11 may depict a flowchart of method 1100. In some embodiments, method 1100 may illustrate a method for disposal of loaded waste-capsule(s) 309 inside of wellbores 305/307/308 that are located inside of deep geological repositories (repository geological formations 306). In some embodiments, the loaded waste-capsule(s) 309 may be loaded with HLW/SNF; wherein the HLW/SNF may be in the form of one or more combined-assembly-of-SNF-with-SLR-and-with-stop-collar(s) 500 per each loaded waste-capsule 309. In some embodiments, method 1100 may be method of implementing system 300 shown in FIG. 3.

Continuing discussing FIG. 11, in some embodiments, method 1100 may comprise method 1101, method 1120, method 1130, and method 1140. In some embodiments, method 1101 may a method of preparing a given waste-capsule 309 components, aside from the one or more combined-assembly-of-SNF-with-SLR-and-with-stop-collar(s) 500, in preparation for receiving the one or more combined-assembly-of-SNF-with-SLR-and-with-stop-collar(s) 500, within at least one inner tube 602 with a close end. In some embodiments, method 1120 may be a method preparing the one or more combined-assembly-of-SNF-with-SLR-and-with-stop-collar(s) 500. In some embodiments, method 1130 may be a method of forming one or more loaded waste-capsules 309 (e.g., loading the one or more combined-assembly-of-SNF-with-SLR-and-with-stop-collar(s) 500 into inner tube(s) 602 and forming loaded waste-capsule(s) 309). In some embodiments, method 1140 may be a method of placing one or more loaded waste-capsules 309 into wellbore(s) 305/307/308 that are located within repository geological formation 306. In some embodiments, execution of at least some of method 1140 may require formation of the wellbore(s) 305/307/308 system, wherein at least some such wellbores are located inside of repository geological formation 306.

Continuing discussing FIG. 11, in some embodiments, method 1100 may comprise one or more steps of: 1102, 1103, 1104, 1105, 1106, 1107, 1121, 1122, 1123, 1124, 1125, 1126, 1127, 1131, 1132, 1133, 1134, 1135, 1136, 1141, 1142, 1143 portions thereof, combinations thereof, and/or the like. In some embodiments, method 1101 may comprise one or more steps of: 1102, 1103, 1104, 1105, 1106, 1107, portions thereof, combinations thereof, and/or the like. In some embodiments, method 1120 may comprise one or more steps of: 1121, 1122, 1123, 1124, 1125, 1126, 1127, portions thereof, combinations thereof, and/or the like. In some embodiments, method 1130 may comprise one or more steps of: 1131, 1132, 1133, 1134, 1135, 1136, portions thereof, combinations thereof, and/or the like. In some embodiments, method 1140 may comprise one or more steps of: 1141, 1142, 1143, portions thereof, combinations thereof, and/or the like.

In some embodiments, at least some of the steps of methods 1100, 1101, 1120, 1130, and/or 1140 may be mandatory, while other steps may be optional. In some cases, some steps may be done out of order of the sequence noted in FIG. 11.

Continuing discussing FIG. 11, in some embodiments, step 1102 may be a step of constructing outer shell(s) 601. In some embodiments, step 1102 may be a step of constructing outer shell(s) 601 from currently available steel tubular goods. See the above discussion of outer shell 601 in the discussion of FIG. 6. In some embodiments, step 1102 may be a step of selecting appropriate steel tubular goods from available steel materials for formation of the outer shell(s) 601 of the waste-capsule(s) 309. The availability of the high-strength steel alloys, with tensile strengths from 120,000 psi to 150,000 psi (or more) may make the waste-capsule's 309 outer shell 601 construction readily feasible at relatively inexpensive prices without sacrificing waste-capsule 309 structural effectiveness and durability. In some embodiments, this outer shell 601 may be a primary structural element of a given waste-capsule 309. In some embodiments, this outer shell 601 may provide rigidity, strength, protection, and/or relative corrosion resistance for a measurable period of time of several thousand years in the repository geological formation 306. It is at least one intent of this invention that may allow utilization of the waste-capsule 309 itself as a vehicle that allows transportation, storage, and sequestration of the HLW/SNF materials located inside of the given waste-capsule 309; wherein the HLW/SNF loaded waste-capsules 309 within the repository geological formations 306 become the lasting environmental protection mechanism over geological times measured in millions of years. In some embodiments, step 1102 may progress into step 1103.

Continuing discussing FIG. 11, in some embodiments, step 1103 may be a step of machining and/or cutting to size outer shell(s) 601. In some embodiments, step 1103 may be dependent upon how many combined-assembly-of-SNF-with-SLR-and-with-stop-collar(s) 500 may be intended for insertion into a given inner tube 602, as that will dictate an overall total length for an outer shell 601 to accommodate such an inner tube 602 with that quantity of combined-assembly-of-SNF-with-SLR-and-with-stop-collar(s) 500. In some embodiments, step 1103 may be a step of cutting, machining, and/or forming the selected steel tubular materials to dimensions for outer shell(s) 601. In some embodiments, in this step 1103, the steel outer shell(s) 601 may be threaded at both axially opposing terminal ends to facilitate the use of couplings 612 which may join (connect) separate loaded and closed waste-capsules 309 into a string of interconnected waste-capsules 309. In some embodiments, this step 1103 may economically take place at a machine shop, or a large scale manufacturing facility utilizing well-established modern robotic and computer controlled systems for working steel tubular materials. This type of computer controlled operations may provide economies of scale and lowering of costs and may allow the simultaneous production of thousands of HLW waste-capsule 309 bodies (outer shells 601) at multiple locations across a country, such as across the U.S. This cost benefit is a positive driver in utilizing the type of waste-capsule 309 system taught herein in these embodiments. In some embodiments, step 1103 may progress into step 1107.

Continuing discussing FIG. 11, in some embodiments, step 1104 may be a step of constructing inner tube(s) 602. In some embodiments, step 1104 may be a step of constructing inner tube(s) 602 from currently available copper stock. In some embodiments, step 1104 may be a step of constructing inner tube(s) 602 from currently available copper tubular goods. In some embodiments, determining an overall total length of a given inner tube 602 may be dependent upon how many combined-assembly-of-SNF-with-SLR-and-with-stop-collar(s) 500 may be intended for insertion into a given inner tube 602, which may yield overall-length 803, as overall-length 803 will dictate an overall total length for that inner tube 602 to accommodate such an inner tube 602 with that quantity of combined-assembly-of-SNF-with-SLR-and-with-stop-collar(s) 500. In some embodiments, step 1104 may be a step of selecting, cutting, machining, and/or forming selected copper material(s) to dimensions of inner tube(s) 602. In some embodiments, in this step 1104, the inner tube(s) 602 may be provided with an initial closed end (e.g., via first [initial] cap 607) and an axially opposing open end (loading end). In some embodiments, the axially opposing open end (loading end) of the copper inner tube(s) 602 facilitates the later placement, entry, and implementation of the one or more combined-assembly-of-SNF-with-SLR-and-with-stop-collar(s) 500 units and other components into internal cavity/volume 603 of the copper inner tube(s) 602. In some embodiments, step 1104 may progress into step 1105.

Continuing discussing FIG. 11, in some embodiments, step 1105 may be a step of passivating inner tube(s) 602. In some embodiments, step 1105 may be a step of passivating inner tube(s) 602 with a SAM (Self-Assembling Monolayer) process. In some embodiments, step 1105 may progress into step 1107.

Continuing discussing FIG. 11, in some embodiments, step 1105 may be a step of enhancing passivity of the copper inner tube(s) 602 material(s). In some embodiments, this material enhancement may be desired and as a result the enhancement process makes the copper inner tube(s) 602 better able to withstand and mitigate deterioration and corrosion for longer periods of time compared to non-passivated copper systems. Available methods like painting, surface metallic plating and other external techniques may provide some enhancement; however, the embodiments taught herein may allow more advanced (i.e., longer-lasting) protection of the copper inner tube(s) 602 to loss of material on the surface of the copper. In some embodiments, in step 1105 a self-assembled monolayer (SAM) may be implemented on one or more exterior surfaces of the copper inner tube(s) 602, both internally and externally, to provide a robust barrier of protection from deterioration. In some embodiments, alkanethiol compounds having a general formula of, R(CH2)nSH, where R represents methyl, carboxyl, hydroxyl, formyl, or amide; n is an integer in the range of 7 to 21 (e.g., in the range of 12 to 18) are utilized for SAM protection of the copper inner tube(s) 602.

Continuing discussing FIG. 11, in some embodiments, in step 1105, this of passivating the copper components with this SAM surface layering, may provide the copper inner tube(s) 602 with a greater protective capacity and inherent durability inside the waste-capsule 309 system and thus making a more effective longer-lived disposal system for SNF/HLW within the deep geological repository 306.

In some embodiments, the SAM process may be implemented in the subject embodiments by coating the copper inner tube(s) 602 surfaces by applying a solution containing an alkanethiol compound and a solvent to the copper inner tube(s) 602 surfaces; and then allowing the formation of a self-assembled monolayer (SAM) on the copper inner tube (s) 602 surfaces. In some embodiments, this SAM process may create a corrosion-resistant coating of a few nanometers (nm) thickness on the copper inner tube(s) 602 surfaces.

In some embodiments, an important parameter of the instant invention with respect to the SAM application process, may be the concentration of the alkanethiols in solution. In some embodiments, it may be necessary and/or desired to have a high enough concentration so that a close-packed monolayer is formed on the copper inner tube(s) 602 surfaces with a short immersion/dipping time (e.g., on the order of seconds and/or less than a minute). In some embodiments, a minimum concentration of the alkanethiols required may be about one (1) mM (millimolar) to about 500 mM of the alkanethiols. In some embodiments, a one (1) millimolar (mM) solution may contain 1 millimole per litre (1 mmol/l). In some embodiments, there may be no advantages to increasing the concentration to around 500 mM. In some embodiments, the alkanethiol concentration may in the range of twenty (20) mM to fifty (50) mM.

In some embodiments, the alkanethiol compounds may have a general formula of, R(CH2)nSH, where R represents methyl, carboxyl, hydroxyl, formyl, or amide; n is an integer in the range of 7 to 21 (e.g., in the range of 12 to 18). In some embodiments, the solubility of some alkanethiols varies depending on the molecular structure, solvents, and temperature. In some embodiments, solvents for these embodiments may be mostly (substantially) nontoxic, inexpensive, and easy to handle/work with. In some embodiments, solvents may include, but not necessarily limited to, alcohols, glycols, acetone, toluene, ethyl acetate, hexane, furan, tetrahydrofuran (THF), methylene chloride, ethers, formic acid, formamide, N,N-dimethyl formamide, acetonitrile, alkanes, turpentine, benzene, ethyl or butyl acetate, petroleum ester, xylene, carbon tetrachloride, mineral spirits, water, portions thereof, combinations thereof, and/or the like. In some embodiments, solvents containing straight hydrocarbon chains may be used, as straight hydrocarbon chains based solvents are less disruptive than those with cyclic or branched hydrocarbons in creating SAMs of alkanethiols on metallic substrates.

In some embodiments, the alkanethiol solutions of the present invention may be applied to a metallic surface (e.g., surfaces of inner tubes 602) by any known coating technique, such as, but not limited to, spraying, painting, immersion, submersion, dipping, roll coating, flow coating techniques, portions thereof, combinations thereof, and/or the like. In some embodiments, immersion, submersion, dipping, portions thereof, combinations thereof, and/or the like may be used because such coating techniques may allow for formation of SAMs with no to minimal mechanical disturbance.

Continuing discussing FIG. 11, in some embodiments, the metallic copper inner tube(s) 602 surfaces may need to be cleaned and mostly (substantially) free of surface contamination prior to SAM application(s). It may be necessary to remove any grease, oil, and/or dirt from the copper inner tube(s) 602 surfaces. Surface oxidation of the copper inner tube(s) 602 surfaces due to prolonged exposure to air, salts, and/or moisture may be detrimental to the formation of robust SAMs of alkanethiols. Therefore, in some embodiments, it may be desirable to coat the copper inner tube(s) 602 surfaces as soon as it is produced and/or as soon as cleaned. In some embodiments, operationally, in step 1105 surfaces of copper inner tube(s) 602 may be first cleaned (e.g., made mostly [substantially] free of dirt, grease, surface impurities, portions thereof, combinations thereof, and/or the like). In some embodiments, then the cleaned inner tube(s) 602 may be immersed in a solution containing an alkanethiol dissolved in a preferred organic solvent for a period of time up to twenty (20) seconds, allowing the molecular processes to form a close-packed SAM on the copper inner tube(s) 602 surfaces. In some embodiments, then the coated copper inner tube(s) 602 surfaces may then be dried in air either at room or elevated temperature to drive-off the solvent and consolidate the organic coating. In some embodiments, this short dipping time of seconds may allow for rapid construction, assembling, and/or manufacturing throughput of the waste-capsule 309 systems. Various processes and chemicals may be used to create the SAM protective system on the copper inner tube(s) 602 surfaces.

Continuing discussing FIG. 11, in some embodiments, step 1106 may be a step of constructing, forming, and/or securing other waste-capsule 309 components (besides outer shells 601 and inner tubes 602) to make available for use, such as, but not limited to, one or more of: separator(s) 604, separator(s) 606, cap(s) 607, port(s) 608, protective/preventative medium 609, support-pad(s) 610, endplate(s) 611, coupling(s) 612, port(s) 608 closure means, portions thereof, combinations thereof, and/or the like. In some embodiments, step 1106 may be a step in constructing the ancillary components needed for providing the waste-capsule 309 system with internal support and/or for its functioning. In some embodiments, these ancillary components may include, but may not be limited to, separator(s) 604, separator(s) 606, cap(s) 607, port(s) 608, protective/preventative medium 609, support-pad(s) 610, endplate(s) 611, coupling (s) 612, port(s) 608 closure means, portions thereof, combinations thereof, and/or the like. In some embodiments, these ancillary waste-capsule 309 components may be constructed with dimensions such that they fit inside the respective diameters of the copper inner tube 602 or the steel outer shell 601, as indicated by FIG. 6 and FIG. 10. In some embodiments, step 1106 may progress into step 1107.

Continuing discussing FIG. 11, in some embodiments, step 1107 may be a step of forming partially assembled waste-capsule(s) 309 from the various earlier fabricated components of the waste-capsule(s) 309 system (e.g., steps 1102 to 1106), such that the partially assembled waste-capsule(s) 309 may be ready for insertion of the one or more combined-assembly-of-SNF-with-SLR-and-with-stop-collar(s) 500 and the separator(s) 604 via the axially opposite open end (loading end) of the partially assembled waste-capsule(s) 309. In some embodiments, step 1107 may be a step of assembling one or more of closed end inner tube(s) 602, with at least one cap 607 to form that closed end, and with an axially opposing open end (loading end), wherein each such closed end inner tube 602 may be inserted into an outer shell 601 with a closed end of an endplate 611 and a with a support-pad 610 disposed between that endplate 611 and the inserted closed-end inner tube 602. In some embodiments, opposing open ends (e.g., of inner tube(s) 602) (axially opposed away from the closed ends) may be configured to receive one or more combined-assembly-of-SNF-with-SLR-and-with-stop-collar(s) 500 from method 1120. In some embodiments, an end result (output) of step 1107 may be one or more partially constructed waste-capsules 309 with open ends and closed ends, that are ready for receiving one or more combined-assembly-of-SNF-with-SLR-and-with-stop-collar(s) 500 and separators 604/606. In some embodiments, in executing step 1107, initially, fixed to (attached to) one axial terminal end of the steel outer shell 601 may a first (initial) endplate 611, which may then form the closed end of that given steel outer shell 601. In some embodiments, first (initial) endplate 611 may be inserted into the steel outer shell 601 and mechanically held/attached in place. In some embodiments, first (initial) endplate 611 may be located inside and remain from between two (2) to three (3) inches, plus or minus (+/−) one-half (½) inch, from the axial terminal end (tip) of that given steel outer shell 601. In some embodiments, in executing step 1107, then a first (initial) support-pad 611 may be inserted into the closed end of that given steel outer shell 601 via the open end (loading end) of that given steel outer shell 601, and that inserted first (initial) support-pad 611 may rest in physical contact with the fixed first (initial) endplate 611. In some embodiments, in executing step 1107, then the closed end of a given inner tube 602 (after step 1105) may be inserted into the closed end of that given steel outer shell 601 via the open end (loading end) of that given steel outer shell 601, such that the closed end of inserted that inner tube 602 may rest physically against that inserted first (initial) support-pad 611; such that closed ends of the outer shell 601 and the inner tube 602 are grouped together towards one axial terminal end of that partially assembled waste-capsule 309; and the open ends of the outer shell 601 and the inner tube 602 are grouped together towards the other and opposing axial terminal end of that same partially assembled waste-capsule 309. In some embodiments, that partially assembled waste-capsule 309 may now be ready for insertion of the one or more combined-assembly-of-SNF-with-SLR-and-with-stop-collar(s) 500 and/or separator(s) 604/606. In some embodiments, step 1107 may progress into step 1131.

Continuing discussing FIG. 11, in some embodiments, step 1121 may be a step of constructing the one or more SLR 400 units. In some embodiments, a given SLR 400 unit may comprise at least two collars 401 and one spring bow 402 (see e.g., FIG. 4 and/or FIG. 7). In some embodiments, a given SLR 400 unit may comprise a spring bow 402, with the two collars 401 attached to opposite axial terminal ends of that spring bow 402. In some embodiments, the spring bow's 402 elongate linear spring element members 403 may be biased to provide a restorative force against inside surfaces of the copper inner tube 602 of a given waste-capsule 309 while cradling and supporting the one or more combined-assembly-of-SNF-with-SLR-and-with-stop-collar(s) 500 located within internal cavity/volume 603. In some embodiments, the restorative force (springiness/elasticity) provided by a given SLR 400 unit may be modified and/or calibrated by utilizing elongate linear spring element members 403 of varying tensile strength. In some embodiments, step 1121 may progress into step 1122.

Continuing discussing FIG. 11, in some embodiments, step 1122 may be a step of manufacturing, constructing, and/or securing so is/are available for use, one or more of: SLR 400 units, collars 401, spring bows 402, stop-collars 502, set screws 405, portions thereof, combinations thereof, and/or the like. In some embodiments, in step 1122, manufacturing and/or constructing of stop-collars 502, collars 401, spring bows 402, set screws 405, portions thereof, combinations thereof, and/or the like may progress. In some embodiments, step 1122 may be a step of constructing the one or more SLR 400 units from steel metal stock in assembly line operations or the like. In some embodiments, the steel stock may be high strength sheet steel and/or steel tube materials. In some embodiments, step 1122 manufacturing process(es) may be those which may provide large quantities of SLR 400 units, stop-collars 502, and/or set screws 405 rapidly and inexpensively, thus allowing waste-capsule 309 building operations to be accomplished at relatively low economic costs, but while maintaining a high throughput volume of desired quality. In some embodiments, step 1122 may progress into step 1123.

Prior art capsule building systems involving large, heavy, and complex capsule designs are comparatively difficult and costly to automate and to maintain high throughput capsule volumes at a time when hundreds of thousands of surface stored SNF assemblies need to be disposed of in deep geologic formations by the nuclear power industry.

Continuing discussing FIG. 11, in some embodiments, step 1123 may be a step of assembling the one or more SLR 400 units components such that each SLR 400 unit may comprise at least one spring bow 402, with two attached and axially oppositely disposed collars 401 (e.g., as shown in FIG. 4 and/or in FIG. 7); and wherein each assembled SLR 400 has two stop-collars 502 made available per each SLR 400 unit. In some embodiments, with respect to each assembled SLR 400, one of the two oppositely disposed collars 401 may have set screws 405, while the remaining collar 401 of that given SLR 400 may not (e.g., as shown in FIG. 4 and/or in FIG. 7). In some embodiments, step 1123 may be a step of assembling the one or more SLR 400 units from the component parts. In some embodiments, the SLR 400 units component parts may comprise one or more of: collars 401, spring bows 402, stop-collars 502, "hold-down" (attachment/friction) means such as, but not limited to, set screws 405, portions thereof, combinations thereof, and/or the like. In some embodiments, step 1123 may progress into step 1124.

Continuing discussing FIG. 11, in some embodiments, step 1124 may be a step of (temporarily) storing SNF assemblies 501, 501*a*, 501*b*, 501*c*, 101, 103, 105 (or portions thereof) at one or more of: nuclear powerplant(s) 302 locations, SNF surface storage 303 locations (e.g., cooling pools and/or near surface casks), drill rig systems 304 locations, portions thereof, combinations thereof, and/or the like. In some embodiments, step 1124 may be a step of organizing SNF assemblies 501, 501*a*, 501*b*, 501*c*, 101, 103, 105 (or portions thereof) stored nuclear powerplant(s) 302 locations or in surface casks (e.g., SNF surface storage 303 locations). In some embodiments, some SNF assemblies 501, 501*a*, 501*b*, 501*c*, 101, 103, 105 (or portions thereof) may still need (additional) storage time in the cooling ponds or the like to be sufficiently lowered in their intrinsic radioactivity and/or heat output before being reading for insertion into an inner tube 602 and/or waste-capsule 309. In some embodiments, these SNF assemblies would not be selected for disposal at this time. In some embodiments, step 1124 may fit into method 1120 at any point before step 1125. In some embodiments, step 1124 may progress into step 1125.

Continuing discussing FIG. 11, in some embodiments, step 1125 may be a step of locating, cataloging, classifying, and/or selecting SNF assemblies 501, 501*a*, 501*b*, 501*c*, 101, 103, 105 (or portions thereof) by type, size, and/or by geometry.

In some embodiments, step 1125 may be a step of locating, cataloging, classifying, and/or selecting SNF assemblies 501, 501*a*, 501*b*, 501*c*, 101, 103, 105 (or portions thereof) from different surface storage sites (e.g., SNF surface storage 303 locations). In some embodiments, it may be contemplated that different types and sizes of SNF assemblies 501, 501*a*, 501*b*, 501*c*, 101, 103, 105 (or portions thereof) may be available for disposal. In some embodiments, the various SNF assemblies 501, 501*a*, 501*b*, 501*c*, 101, 103, 105 (or portions thereof) geometries may require different types of SLR 400 units and/or stop-collars 502 (see e.g., FIG. 5B through FIG. 5D). In some embodiments, this step 1125 yield mostly (substantially) the error-free and future ease of operations by grouping and allowing identical (or similar) SNF assemblies geometries/types to be treated similarly and to minimize potential problems that may occur due to mixing and matching different geometries of SNF assemblies later in the disposal processes. In some embodiments, step 1125 may progress into step 1126 and/or into step 1127.

Continuing discussing FIG. 11, in some embodiments, step 1126 may be a step of dissembling SNF assemblies 501, 501*a*, 501*b*, 501*c*, 101, 103, 105 (or portions thereof) into smaller components, as desired and/or as needed based on availability and sizing of waste-capsule 309 components from methods 1101 and/or method 1120. In some embodiments, step 1126 may be a step of (optionally) disassembling the SNF assemblies 501, 501*a*, 501*b*, 501*c*, 101, 103, 105 (or portions thereof) into smaller components in some cases. In some cases, because of their physical size and/or the fact that their initial original cross-sections are larger than available for copper inner tube 602 diameters and as such may not fit in the available waste-capsules 309, SNF assembly (or portions thereof) disassembly may be needed and/or desired. In some embodiments, it may be desired and/or necessary to disassemble a given SNF assembly (or portion thereof) into smaller sub-assembly components. For example, the U.S. BWR SNF assembly 105 may be disassembled by removing the channel fasteners along two orthogonal planes into four smaller rectangular subassemblies. In some embodiments, these smaller sub-assemblies may be more manageable. In some embodiments, the generated smaller subassemblies may then more easily fit into a smaller and less expensive versions of the inner tube(s) 602 and/or the waste-capsule(s) 309. In some embodiments, step 1126 may be optional. In some embodiments, step 1126 may progress into step 1127.

Continuing discussing FIG. 11, in some embodiments, step 1127 may be a step of assembling the one or more combined-assembly-of-SNF-with-SLR-and-with-stop-collar(s) 500 units from the SLR 400 units, stop-collars 502, set screws 405, and the various SNF assemblies 501, 501*a*, 501*b*, 501*c*, 101, 103, 105 (or portions thereof). In some embodiments, step 1127 may be a step of installing SLR 400 units, with stop-collars 502, onto SNF assemblies 501, 501*a*, 501*b*, 501*c*, 101, 103, 105 (or portions thereof) to form the one or more combined-assembly-of-SNF-with-SLR-and-with-stop-collar(s) 500 units. In some embodiments, set screws 405 may be tightened against the outside exterior of SNF assemblies 501, 501*a*, 501*b*, 501*c*, 101, 103, 105 (or portions thereof) to prevent axial slippage (movement) of installed SLR 400 units and/or of stop-collars 502. In some embodiments, an output of step 1127 may be the one or more combined-assembly-of-SNF-with-SLR-and-with-stop-collar(s) 500 units. In some embodiments, a given combined-assembly-of-SNF-with-SLR-and-with-stop-collar(s) 500 unit may comprise at least one SNF assembly 501, 501*a*, 501*b*, 501*c*, 101, 103, 105 (or portion thereof), along with one or more SLR 400 units circumferentially attached to that given combined-assembly-of-SNF-with-SLR-and-with-stop-collar(s) 500, and two stop-collars 502 (per SLR 400) circumferentially attached to that given combined-assembly-of-SNF-with-SLR-and-with-stop-collar(s) 500. In some embodiments, step 1127 may be a step of assembling/attaching the SLR 400 unit(s), along with stop-collar(s) 502, and set screws 405 externally and circumferentially onto the SNF assemblies 501, 501*a*, 501*b*, 501*c*, 101, 103, 105 (or portions thereof) (e.g., from step(s) 1124, 1125, and/or 1126), to form composite 500 unit(s). See e.g., FIG. 5A, FIG. 5B, FIG. 5C, and/or FIG. 5D for examples of such completed composite 500 units. In some embodiments, step 1127 may progress into step 1131.

It is contemplated in these embodiments that this SLR 400 unit(s), stop-collars 502, and set screws 405 to SNF assemblies 501, 501*a*, 501*b*, 501*c*, 101, 103, 105 (or portions thereof) installation may safely occur with adequate control systems and equipment, inside of, and/or adjacent to the cooling ponds of the SNF surface storage location(s) 303. The inherent design of the SLR 400 unit(s), stop-collars 502, and set screws 405 in these embodiments may allow the SLR 400 unit(s), stop-collars 502, and set screws 405 to easily slide onto the exterior body of the selected SNF assemblies 501, 501*a*, 501*b*, 501*c*, 101, 103, 105 (or portions thereof). In some applications or cases, the SLR 700 may be a hinged system and can thus open and close over the exterior outside of the SNF assemblies 501, 501*a*, 501*b*, 501*c*, 101, 103, 105 (or portions thereof). In either case, the SLR 400/700 unit may be positioned and held fixedly in place on the exterior outside of the given SNF assembly 501, 501*a*, 501*b*, 501*c*, 101, 103, 105 (or portion thereof). In some embodiments, in some cases of short SNF assemblies 501, like Canadian SNF assembly 501*a*/101 units, only one SLR 400 may be needed per Canadian SNF assembly 501*a*/101; whereas, in other cases like with the U.S. SNF assemblies 501*b*/105 and/or the Russian SNF assemblies 501*c*/103, multiple SLR 400 units and their associated stop-collars 502 and set screws 405, may be installed in sequence, end to end, over the exterior outside of the given SNF assembly 501*a*/101 and/or 501*c*/103 unit (or portion thereof).

Continuing discussing FIG. 11, in some embodiments, step 1131 may be a step of first inserting a separator 606 into the closed end of a given inner tube 602, as prepared from step 1107; then inserting a first combined-assembly-of-SNF-with-SLR-and-with-stop-collar(s) 500 unit into that inner tube 602, towards separator 606; such that the separator 606 may be disposed between the closed end cap 607 and the first combined-assembly-of-SNF-with-SLR-and-with-stop-collar(s) 500 unit within that first inner tube 602. In some embodiments, separator 606 may protect that first (initial) cap 607. In some embodiments, the step 1131 insertions may be executed in sequence by first inserting separator 606 into the closed end of the copper inner tube 602 so that this separator 606 may be physically against first (initial) cap 607; and then slidably inserting into the copper inner tube 602 the first combined-assembly-of-SNF-with-SLR-and-with-stop-collar(s) 500 unit such that this first inserted combined-assembly-of-SNF-with-SLR-and-with-stop-collar(s) 500 unit may be physically against separator 606 that may be against first (initial) cap 607. In some embodiments, the first inserted combined-assembly-of-SNF-with-SLR-and-with-stop-collar(s) 500 unit may be held firmly in place, in the axial direction, by the restorative forces of the spring bow(s) 402 of the SLR 400 unit(s) acting on the inside/interior walls of the copper inner tube 602. In some embodiments, in step 1131 (or in step 1132), a (first) perforated separator 604 may be emplaced (inserted) inside of the copper inner tube 602 next to (and physically touching) the first inserted combined-assembly-of-SNF-with-SLR-and-with-stop-collar(s) 500 unit. In some embodiments, that first inserted combined-assembly-of-SNF-with-SLR-and-with-stop-collar(s) 500 unit may comprise at least one SNF assembly 501, 501*a*, 501*b*, 501*c*, 101, 103, 105 (or portion thereof), at least one SLR 400, at least two stop-collars 502, and a plurality of set screws 405. For example, FIG. 9 may show a portion of a combined-assembly-of-SNF-with-SLR-and-with-stop-collar(s) 500 unit of five (5) different/separate SNF assemblies 501, 501*a*, 501*b*, 501*c*, 101, 103, 105 (or portions thereof); wherein each such SNF assembly 501, 501*a*, 501*b*, 501*c*, 101, 103, 105 (or portion thereof) has one SLR 400 and two stop-collars 502 attached circumferentially. In some embodiments, each SLR 400 may be have two associated stop-collars 502 (e.g., as shown in FIG. 5A). In some embodiments, step 1131 may progress into step 1132.

Continuing discussing FIG. 11, in some embodiments, step 1132 may be a step of inserting a separator 604 inside the inner tube 602 (physically) against that already inserted first combined-assembly-of-SNF-with-SLR-and-with-stop-collar(s) 500 unit; and then inserting additional combined-assembly-of-SNF-with-SLR-and-with-stop-collar(s) 500 unit(s) and separator(s) 604, such that between any two adjacent combined-assembly-of-SNF-with-SLR-and-with-stop-collar(s) 500 units, within that inner tube 602, is at least one separator 604 (see e.g., FIG. 6). Continuing discussing FIG. 11, in some embodiments, step 1132 may be a step of completing the installation and packaging of the one or more combined-assembly-of-SNF-with-SLR-and-with-stop-collar(s) 500 unit(s) inside of the given inner tube 602. In some embodiments, in this step 1132 the one or more combined-assembly-of-SNF-with-SLR-and-with-stop-collar(s) 500 unit(s) may be slidably inserted inside of the given inner tube 602 to fill that given inner tube 602 to capacity, with at least one perforated separated 604 located between any two adjacent and inserted combined-assembly-of-SNF-with-SLR-and-with-stop-collar(s) 500 units. In some embodiments, once that given inner tube 602 may be full of inserted combined-assembly-of-SNF-with-SLR-and-with-stop-collar(s) 500 units and perforated separators 604, then a final perforated separator 604 may be installed (inserted) at the open end (loading end) of that given copper inner tube 602. In some embodiments, this installed final perforated separator 604 may be disposed between an outermost inserted combined-assembly-of-SNF-with-SLR-and-with-stop-collar(s) 500 unit and a second (final) cap 607 (this second (final) cap 607 may be installed in step 1133). In some embodiments, all of the installed (inserted) perforated separators 604 may facilitate injection of protective/preventative medium 609 into that given inner tube 602 during step 1134. In some embodiments, step 1132 may continue in such a fashion until that given inner tube 602 is full (and other inner tubes 602 may then be filled/loaded accordingly as noted above in steps 1131 and 1132). In some embodiments, as many combined-assembly-of-SNF-with-SLR-and-with-stop-collar(s) 500 units may be installed in a given inner tube 602 as may fit. In some embodiments, step 1132 may progress into step 1133.

Continuing discussing FIG. 11, in some embodiments, step 1133 may be a step of sealing and/or closing that now at least partially filled inner tube 602 with a final (second) cap 607, such that the formerly open end is now also a closed end of inner tube 602 by virtue of installing that final (second) cap 607 at the former open end of the inner tube 602. In some embodiments, the cap 607 used to close/seal the formerly open end of inner tube 602 may comprise at least one port 608 configured for protective/preventative medium 609 injection into internal cavity/volume 603 of that inner tube 602. In some embodiments, completion of step 1133 may result in at least one inner tube 602 that is loaded (fully or at least partially so) with HLW/SNF and that is fully closed/sealed (e.g., capped on both terminal ends with caps 607). In some embodiments, step 1133 may progress into step 1134.

Continuing discussing FIG. 11, in some embodiments, step 1134 may be a step of injecting protective/preventative medium 609 into internal cavity/volume 603 of the inner tube 602 that was filled with HLW/SNF according to step 1132. In some embodiments, step 1134 may be a step of injecting protective/preventative medium 609 into the annular region between the one or more inserted combined-assembly-of-SNF-with-SLR-and-with-stop-collar(s) 500 units and the interior/inside walls of the copper inner tube 602. In some embodiments, in this step 1134, protective/preventative medium 609 may be injected into internal cavity/volume 603 via the injection or fill port 608 on the second (final) cap 607 of the loaded and the sealed/closed copper inner tube 602. In some embodiments, the injected protective/preventative medium 609 may be inserted under sufficient pressure to move protective/preventative medium 609 through the holes 605 of the perforated separator(s) 604 and completely fill remaining void spaces of internal cavity/volume 603 of that given loaded and sealed/closed copper inner tube 602 and immerse and surround and the one or more combined-assembly-of-SNF-with-SLR-and-with-stop-collar(s) 500 units located within that given loaded and sealed/closed copper inner tube 602. In some embodiments, where two or more perforated separators 604 may have been installed in that given loaded and sealed/closed copper inner tube 602 (e.g., per step(s) 1131 and/or 1132), at least some of those installed perforated separators 604 may break up internal cavity/volume 603 into different zones separated by a given installed perforated separator 604. In some embodiments, the hole(s) 605 in those installed perforated separators 604 may permit filling of those different zones with protective/preventative medium 609. In some embodiments, protective/preventative medium 609 may be injected into internal cavity/volume 603 via port 608 in at least one of the caps 607 of that sealed/closed inner tube 602. In some embodiments, protective/preventative medium 609 may be injected into internal cavity/volume 603 until most of previous void spaces in internal cavity/volume 603 are now filled with protective/preventative medium 609. This may be done via monitoring pressure, flow, and/or time of protective/preventative medium 609 injection into internal cavity/volume 603 (via port 608). Further, protective/preventative medium 609 may fill these previous void spaces of internal cavity/volume 603 by virtue of perforations/holes 605 in separator(s) 604. In some embodiments, after filling remaining void spaces of internal cavity/volume 603 with protective/preventative medium 609, then fill port 608 may be sealed/closed to prevent loss of protective/preventative medium 609 from internal cavity/volume 603. In some embodiments, once internal cavity/volume 603 may be filled with protective/preventative medium 609, port 608 may be closed/sealed (e.g., via closing its valve, with a cap, with a plug, and/or by crimping port 608 closed). In some embodiments, the fill port 608 closure means, not shown in the figures, may be a plug or mechanical cap either screwed into or fitted directly into the fill port 608 opening. In some embodiments, step 1134 may progress into step 1135.

Note, in some embodiments, prior to step 1134, at least some of the initial void space of internal cavity/volume 603 may be occupied by the one or more combined-assembly-of-SNF-with-SLR-and-with-stop-collar(s) 500 and separators 604/606; and then execution of step 1134 may cause most of any remaining internal cavity/volume 603 void space to be filled with protective/preventative medium 609.

Continuing discussing FIG. 11, in some embodiments, step 1135 may be a step of sealing/closing the waste-capsule (s) 309 from step 1134. In some embodiments, step 1135 may be a step of installing second (final) support-pad(s) 610 and second (final) endplate(s) 611 to the open end(s) of outer shell(s) 601, to securely load and/or fix loaded and closed copper inner tube(s) 602 inside of the structural steel outer shell(s) 601. In some embodiments, step 1135 may be a step of installing a second (final) support-pad 610 outside of the second (final) cap 607 (which may be a cap 607 with port 608) in an axial direction; and then installing a second (final) endplate 611 to that formerly open end of outer shell 601, also in the axial direction, such that outer shell 601 is now fulling closed/sealed at both axial terminal ends with endplates 611. In some embodiments, second (final) support-pad 610 may be disposed between the second (final) cap 607 and the second (final) endplate 611. See e.g., the right end of loaded waste-capsule 309 shown in FIG. 6. In some embodiments, an end product (output) of step 1135 may be fully closed/sealed loaded waste-capsule 309. In some embodiments, step 1135 may progress into step 1136.

Continuing discussing FIG. 11, in some embodiments, step 1136 may be a step of installing coupling(s) 612 on at least one axial terminal end of the fully closed/sealed and loaded outer shell 601 from step 1135. In some embodiments, step 1136 may be a step of installing two oppositely disposed couplings 612 on the two axial terminal ends of the fully closed/sealed and loaded outer shell 601 from step 1135. In some embodiments, step 1136 may be a step of installing couplings 612 to each of the axial terminal ends of at least one loaded and closed/sealed waste-capsule 309. In some embodiments, couplings 612 may be attached by threaded means to the axial terminal ends a given steel outer shell 601. In some embodiments, couplings 612 may be selected such that couplings 612 possess a low and/or a smooth exterior cross-sectional profile with minimum offset (bulge) at the connections with the axial terminal ends the given steel outer shell 601; such that a smooth pathway and effortless insertion into the wellbore 305/307/308 (casings) may occur in step 1142. In other words, there is little possibly of exteriors of loaded and closed/sealed waste-capsules 309, with attached couplings 612, hanging up inside of the wellbore 305/307/308 (casings) because of the overall exterior smooth profile of loaded and closed/sealed waste-capsules 309, with attached couplings 612. In some embodiments, the end result (output) from step 1136 may be a closed and loaded waste-capsule 309, with one or two couplings 612, that is ready for emplacement into wellbore (s) 305, 307, and/or 308 within repository geological formation 306. In some embodiments, the end result (output) from step 1136 may be a closed and loaded waste-capsule 309, with two oppositely disposed couplings 612, that is ready for emplacement into wellbore(s) 305, 307, and/or 308 within repository geological formation 306. In some embodiments, step 1136 may progress into step 1141 and/or into step 1142.

Continuing discussing FIG. 11, in some embodiments, step 1141 may be a step of transporting the output of step 1136 (or of step 1135) to a given drill rig system 304 site that is located vertically above repository geological formation 306. If the output of step 1136 (or of step 1135) is already located at a given drill rig system 304 site that is located vertically above repository geological formation 306, then step 1141 may be optional and/or skipped. In some embodiments, the transportation of step 1141 may be surface transportation, such as, but not limited to, by truck and/or by rail (train). In some embodiments, step 1141 may be a step of preparing loaded and closed/sealed waste-capsule(s) 309, with attached couplings 612, for transport to one or more well site(s) (e.g., where drill rig system(s) 304 may be located/positioned) for disposal into the repository geological formation 306 wellbore(s) 305/307/308. In some embodiments, in this step 1141 the loaded and closed/sealed waste-capsule(s) 309, with attached couplings 612, may be packaged and fitted onto selected truck transport means and/or onto rail transport means. In some embodiments, step 1141 may progress into step 1142.

Because the size and weight of a loaded waste-capsule 309 may be approximately one (1) metric ton (with attached couplings 612); and because of the structural design of the various embodiments of the waste-capsule 309 in this patent application, it may be possible to transport the loaded and closed/sealed waste-capsule(s) 309, with attached couplings 612, in much smaller protective casks and also on smaller protected and shielded commercial truck vehicles as compared to the massive casks of the prior art capsule transport, weighing hundreds of thousands of pounds, and requiring special permitting for road travel and rail travel.

Continuing discussing FIG. 11, in some embodiments, step 1142 may be a step of loading, inserting, placing closed/sealed and loaded waste-capsule(s) 309 from step 1136, via drill rig system(s) 304, into wellbore(s) 305, 307, and/or 308; wherein these wellbore(s) are within repository geological formation 306. In some embodiments, step 1142 may be a step of loading the one or more loaded and closed/sealed waste-capsule(s) 309, with attached couplings 612, into the wellbore(s) 305/307/308 that may be located in repository geological formation 306 using drill rig system(s) 304. In some embodiments, in this step 1142 the one or more loaded and closed/sealed waste-capsule(s) 309, with attached couplings 612, may be loaded (inserted) into the wellbore(s) 305/307/308 system by using drill rig system(s) 304; which in some embodiments, may be remote controlled automatic systems, such as, but not limited to, an "Iron Roughneck." In some embodiments, during step 1142, the one or more loaded and closed/sealed waste-capsule(s) 309, with attached couplings 612, may be unloaded from the capsule transporter (e.g., of step 1141); and then remotely uploaded to the drill rig system 304 rig floor using typical wellsite automatic means and then manipulated by the "Iron Roughneck" to place and securely hold the one or more loaded and closed/sealed waste-capsule(s) 309, with attached couplings 612, mechanically into the wellbore opening on the rig floor. In some embodiments, a plurality of the two or more loaded and closed/sealed waste-capsule (s) 309, with attached couplings 612, may be joined together sequentially via the coupling(s) 612. For example, and without limiting the scope of the present invention, a first loaded and closed/sealed waste-capsule 309, with attached couplings 612, may be lowered a few feet below the rig floor and another/second loaded and closed/sealed waste-capsule 309, with attached couplings 612, may be connected via one of its coupling 612 to a coupling 612 of the first loaded and closed/sealed waste-capsule 309; and then this string of two loaded and closed/sealed waste-capsules 309, with attached couplings 612, may be lowered below the well floor. In some embodiments, such a process may be repeated to form a string of up to fifty (50) loaded and closed/sealed waste-capsules 309, with attached couplings 612; wherein this string may weigh about fifty (50) metric tons or so. In some embodiments, current rigs (such as, but not limited to, drill rig system 304) may easily/readily handle such a load. In some embodiments, step 1142 may progress into step 1143.

Continuing discussing FIG. 11, in some embodiments, step 1143 may be a step of shutting down loaded waste-capsule 309 insertion operations. In some embodiments, step 1143 may be a step of shutting down the disposal operations (e.g., stopping step 1142); and marking the disposal well-head on the surface 301. In some embodiments, step 1143 may occur if a given wellbore(s) 305, 307, and/or 308 within repository geological formation 306 may be full of loaded waste-capsules 309. In some embodiments, step 1143 may entail sealing and/or closing off one or more of wellbore(s) 305, 307, and/or 308. In some embodiments, such sealing and/or closing off may be accomplished by inserting and/or forming one or more concrete/cement plugs in wellbore(s) 305, 307, and/or 308. In some embodiments, execution of step 1143 may conclude method 1140 and/or method 1100.

Nuclear waste-capsule systems and methods of nuclear waste disposal have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A waste-capsule for housing and disposal of nuclear waste, the waste-capsule comprising:

a first spring-loaded receptacle that is an elongate hollow member; wherein the first spring-loaded receptacle is disposed circumferentially around a length of a first spent-nuclear-fuel assembly or portion thereof; wherein the first spring-loaded receptacle comprises a first spring bow and two first collars; wherein the first spring bow is disposed between and attached to both of the two first collars with the two first collars on both axial terminal ends of the first spring bow; wherein the first spring bow comprises at least three first elongate linear spring element members;

an inner tube that is a first elongate hollow cylindrical member with at least one initial open-end; wherein the first spring-loaded receptacle that is disposed circumferentially around the first spent-nuclear-fuel assembly or portion thereof is located within an internal cavity of the inner tube; wherein the first elongate linear spring element members of the first spring-loaded receptacle are in removable physical contact with interior wall portions of the inner tube; and an outer shell that is a second elongate hollow cylindrical member; wherein the inner tube with the first spring-loaded receptacle that is disposed circumferentially around the first spent-nuclear-fuel assembly or portion thereof are all disposed within the outer shell;

wherein lengths of the first spring-loaded receptacle, the inner tube, and the outer shell, are all substantially parallel with each other with respect to the waste-capsule in an assembled and loaded configuration.

2. The waste-capsule according to claim 1, wherein each of the two first collars is a hollow sleeve member with an open internal bore that is sized to fit therein an exterior diameter or an exterior cross-section of the first spent-nuclear-fuel assembly or portion thereof.

3. The waste-capsule according to claim 2, wherein one of the two first collars comprises at least one set screw and the remaining of the two first collars comprises no set screws, wherein the at least one set screw is configured to frictionally engage against an exterior of the first spent-nuclear-fuel assembly or portion thereof to prevent axial slippage between that first collar with the at least one set screw and the first spent-nuclear-fuel assembly or portion thereof and wherein the first collar with no set screws remains free to axially slide against exterior portions of the first spent-nuclear-fuel assembly or portion thereof.

4. The waste-capsule according to claim 1, wherein at least one of the two first collars comprises a hinge along a length of the at least one of the two first collars; wherein the hinge is configured to open and receive a region of the first spent-nuclear-fuel assembly or portion thereof.

5. The waste-capsule according to claim 1, wherein the first elongate linear spring element members of the first spring bow are configured to act as shock absorbing suspension means to the first spent-nuclear-fuel assembly or portion thereof that is disposed within the first spring-loaded receptacle.

6. The waste-capsule according to claim 1, wherein the first elongate linear spring element members of the first spring bow are configured to structurally support and centralize the first spent-nuclear-fuel assembly or portion thereof that is disposed within the first spring-loaded receptacle, with respect to the inner tube.

7. The waste-capsule according to claim 1, wherein an external diameter or an external transverse-width of the first elongate linear spring element members of the first spring bow is variable depending upon whether the first spent-nuclear-fuel assembly or portion thereof is under compression or under tension within the inner tube.

8. The waste-capsule according to claim 1, wherein each spring-loaded receptacle of the waste-capsule, including the first spring-loaded receptacle, has two stop-collars that are disposed on opposite axial terminal ends of each such spring-loaded receptacle; wherein each such stop-collar is a hollow sleeve member that is configured to receive a region of the first spent-nuclear-fuel assembly or portion thereof within the hollow sleeve member.

9. The waste-capsule according to claim 8, wherein each hollow sleeve member is configured to attach to the region of the first spent-nuclear-fuel assembly or portion thereof by use of at least one set screw, wherein each hollow sleeve member comprises the at least one set screw.

10. The waste-capsule according to claim 1, wherein the waste-capsules comprises at least one solid-separator; wherein the at least one solid-separator is located within the inner tube; wherein the at least one solid-separator is disposed between a closed-end of the inner tube and an axial terminal end of the first spent-nuclear-fuel assembly or portion thereof that is closest to the closed-end of the inner tube.

11. The waste-capsule according to claim 1, wherein the waste-capsule comprises second or more spring-loaded receptacles, where the first spring-loaded receptacle and the second or more spring-loaded receptacles are all circumferentially disposed around the length of the first spent-nuclear-fuel assembly or portion thereof; wherein the second or more spring-loaded receptacles and the first spent-nuclear-fuel assembly or portion thereof are all disposed within the inner tube.

12. The waste-capsule according to claim 1, wherein located within the inner tube is a second or more spent-nuclear-fuel assembly or portion thereof; wherein the waste-capsule comprises a second or more spring-loaded receptacle; wherein the second or more spring-loaded receptacle is disposed circumferentially around the second or more spent-nuclear-fuel assembly or portion thereof, such that each spent-nuclear-fuel assembly or portion thereof within the inner tube has at least one spring-loaded receptacle attached circumferentially thereto.

13. The waste-capsule according to claim 12, wherein the first spent-nuclear-fuel assembly or portion thereof and the second or more spent-nuclear-fuel assembly or portion thereof are located within the inner tube in an end-to-end fashion along a length of the inner tube.

14. The waste-capsule according to claim 12, wherein the waste-capsule comprises at least one perforated-separator; wherein disposed between any two adjacent spent-nuclear-fuel assemblies or portions thereof, including the first spent-nuclear-fuel assembly or portion thereof and the second or more spent-nuclear-fuel assembly or portion thereof, within the inner tube, is the at least one perforated-separator.

15. The waste-capsule according to claim 14, wherein the at least one perforated-separator is made substantially from at least one metal foam composite.

16. The waste-capsule according to claim 14, wherein the at least one perforated-separator comprises at least one through-hole; wherein the at least one through-hole is configured for passage of a protective/preventative medium.

17. The waste-capsule according to claim 1, wherein the waste-capsule comprises a first cap, a second cap, and at least one perforated-separator; wherein the first cap seals closed a closed-end of the inner tube that is axially disposed opposite from the at least one initial open-end of the inner tube; wherein the second cap seals closed the at least one initial open-end; wherein the at least one perforated-separator is located within the inner tube and is disposed between the second cap and an axial terminal end of a spent-nuclear-fuel assembly or portion thereof that is located closest to the second cap; wherein the spent-nuclear-fuel assembly or portion thereof is selected from the first spent-nuclear-fuel assembly or portion thereof or from other spent-nuclear-fuel assemblies or portions thereof located within the inner tube.

18. The waste-capsule according to claim 17, wherein the second cap comprises at least one injector port; wherein the at least one injector port is configured to receive and allow passage of a protective/preventative medium through at least one hole of the at least one perforated-separator and into the internal cavity of the inner tube.

19. The waste-capsule according to claim 18, wherein waste-capsule comprises the protective/preventative medium located within the inner tube.

20. The waste-capsule according to claim 1, wherein the waste-capsules comprises a pair of support-pads; wherein the pair of support-pads are located within the outer shell; wherein the pair of support-pads are oppositely disposed of each other, located at opposite axial terminal ends of the inner tube, such that the inner tube is bound on each of the axial terminal ends of the inner tube by one of the pair of support-pads.

21. The waste-capsule according to claim 20, wherein each of the pair of support-pads is disposed between an endplate of the outer shell and a cap of the inner tube.

22. The waste-capsule according to claim 1, wherein the waste-capsules comprises a pair of endplates; wherein the pair of endplates are oppositely disposed of each other with respect to a length of the outer shell; wherein each of the pair of endplates is attached to an axial terminal end of the outer shell to seal and close off that axial terminal end of the outer shell.

23. The waste-capsule according to claim 1, wherein the waste-capsules comprises a pair of couplings; wherein the pair of couplings are oppositely disposed of each other with respect to a length of the outer shell; wherein each of the pair of couplings is attached to an axial terminal end of the outer shell; wherein a coupling selected from the pair of couplings is configured to be attached to a different coupling of a different waste-capsule to form a string of two or more attached waste-capsules.

24. The waste-capsule according to claim 1, wherein the inner tube is made substantially from copper.

25. The waste-capsule according to claim 1, wherein at least some surfaces of the inner tube are passivated.

26. The waste-capsule according to claim 1, wherein surfaces of the inner tube are passivated by a self-assembling monolayer process that exposes the surfaces of the inner tube to at least one alkanethiol compound.

27. The waste-capsule according to claim 1, wherein a diameter or a transverse width cross-section of the first spent-nuclear-fuel assembly or portion thereof has a shape that is selected from: round, circular, rectangular, square, or hexagonal; and wherein the first spring-loaded receptacle has internal shapes that are complimentary for circumferentially receiving and holding the shape of the first spent-nuclear-fuel assembly or portion thereof within the first spring-loaded receptacle.

28. The waste-capsule according to claim 1, wherein the waste-capsule is configured for being received into a wellbore that is located within a repository geological formation; wherein the repository geological formation is a rock formation that is located at least five thousand feet below the Earth's surface.

* * * * *